US008412675B2

(12) United States Patent
Alvarado et al.

(10) Patent No.: US 8,412,675 B2
(45) Date of Patent: Apr. 2, 2013

(54) CONTEXT AWARE DATA PRESENTATION

(75) Inventors: Billy Alvarado, Redwood City, CA (US); Ido Ariel, Redwood City, CA (US); Robert Paul van Gent, Redwood City, CA (US)

(73) Assignee: Seven Networks, Inc., Redwood City, CA (US)

( * ) Notice: Subject to any disclaimer, the term of this patent is extended or adjusted under 35 U.S.C. 154(b) by 847 days.

(21) Appl. No.: 11/362,488

(22) Filed: Feb. 24, 2006

(65) Prior Publication Data
US 2007/0027920 A1 Feb. 1, 2007

Related U.S. Application Data

(63) Continuation of application No. 11/217,203, filed on Aug. 31, 2005, now Pat. No. 7,853, 563.

(60) Provisional application No. 60/704,781, filed on Aug. 1, 2005.

(51) Int. Cl.
*G06F 7/00* (2006.01)
*G06F 17/00* (2006.01)
(52) U.S. Cl. ........ 707/616; 707/627; 707/736; 707/737; 707/781
(58) Field of Classification Search .................... 707/104
See application file for complete search history.

(56) References Cited

U.S. PATENT DOCUMENTS

| 222,458 A | 12/1879 | Connolly et al. |
| 447,918 A | 3/1891 | Strowger |
| 4,200,770 A | 4/1980 | Hellman et al. |
| 4,255,796 A | 3/1981 | Gabbe et al. |
| 4,276,597 A | 6/1981 | Dissly et al. |
| 4,531,020 A | 7/1985 | Wechselberger et al. |
| 4,807,182 A | 2/1989 | Queen |
| 4,831,582 A | 5/1989 | Miller et al. |
| 4,875,159 A | 10/1989 | Cary et al. |
| 4,897,781 A | 1/1990 | Chang et al. |
| 4,972,457 A | 11/1990 | O'Sullivan |
| 5,008,853 A | 4/1991 | Bly et al. |

(Continued)

FOREIGN PATENT DOCUMENTS

| EP | 0772327 A2 | 5/1997 |
| EP | 0993165 A2 | 4/2000 |

(Continued)

OTHER PUBLICATIONS

Vivacqua et al., "Profiling and Matchmaking Strategies in Support of Opportunistic Collaboration", Conference on Cooperative Information Systems, Nov. 3-7, 2003.*

(Continued)

*Primary Examiner* — Jay Morrison
(74) *Attorney, Agent, or Firm* — Perkins Coie LLP

(57) ABSTRACT

A context aware data application presents information about a first user's contact means and methodologies. The application organizes, filters and present the information taking into account multiple inputs regarding the specific context and the relationship and preferred communication means between the first user and other users seeking to contact the first user. The information allows the users seeking to make contact to quickly take an action that is expected given the context of the first user as presenting the most relevant data allows the contacting users to take actions quickly and effectively.

22 Claims, 9 Drawing Sheets

U.S. PATENT DOCUMENTS

| | | |
|---|---|---|
| 5,159,624 A | 10/1992 | Makita |
| 5,220,657 A | 6/1993 | Bly et al. |
| 5,263,157 A | 11/1993 | Janis |
| 5,283,856 A | 2/1994 | Gross et al. |
| 5,357,431 A | 10/1994 | Nakada et al. |
| 5,384,892 A | 1/1995 | Strong |
| 5,386,564 A | 1/1995 | Shearer et al. |
| 5,392,390 A | 2/1995 | Crozier |
| 5,434,994 A | 7/1995 | Shaheen et al. |
| 5,436,960 A | 7/1995 | Campana, Jr. et al. |
| 5,438,611 A | 8/1995 | Campana, Jr. et al. |
| 5,479,472 A | 12/1995 | Campana, Jr. et al. |
| 5,487,100 A | 1/1996 | Kane |
| 5,491,703 A | 2/1996 | Barnaby et al. |
| 5,493,692 A | 2/1996 | Theimer et al. |
| 5,519,606 A | 5/1996 | Frid-Nielsen et al. |
| 5,555,376 A | 9/1996 | Theimer et al. |
| 5,559,800 A | 9/1996 | Mousseau et al. |
| 5,572,571 A | 11/1996 | Shirai |
| 5,572,643 A | 11/1996 | Judson |
| 5,574,859 A | 11/1996 | Yeh |
| 5,581,749 A | 12/1996 | Hossain et al. |
| 5,600,834 A | 2/1997 | Howard |
| 5,603,054 A | 2/1997 | Theimer et al. |
| 5,604,788 A | 2/1997 | Tett |
| 5,613,012 A | 3/1997 | Hoffman et al. |
| 5,619,507 A | 4/1997 | Tsuda |
| 5,619,648 A | 4/1997 | Canale et al. |
| 5,623,601 A | 4/1997 | Vu |
| 5,625,670 A | 4/1997 | Campana, Jr. et al. |
| 5,625,815 A | 4/1997 | Maier et al. |
| 5,627,658 A | 5/1997 | Connors et al. |
| 5,630,081 A | 5/1997 | Rybicki et al. |
| 5,631,946 A | 5/1997 | Campana, Jr. et al. |
| 5,632,018 A | 5/1997 | Otorii |
| 5,634,053 A | 5/1997 | Noble et al. |
| 5,644,788 A | 7/1997 | Courtright et al. |
| 5,647,002 A | 7/1997 | Brunson |
| 5,652,884 A | 7/1997 | Palevich |
| 5,664,207 A | 9/1997 | Crumpler et al. |
| 5,666,530 A | 9/1997 | Clark et al. |
| 5,666,553 A | 9/1997 | Crozier |
| 5,680,542 A | 10/1997 | Mulchandani et al. |
| 5,682,524 A | 10/1997 | Freund et al. |
| 5,684,990 A | 11/1997 | Boothby |
| 5,689,654 A | 11/1997 | Kikinis et al. |
| 5,692,039 A | 11/1997 | Brankley et al. |
| 5,696,903 A | 12/1997 | Mahany |
| 5,701,423 A | 12/1997 | Crozier |
| 5,701,469 A | 12/1997 | Brandli et al. |
| 5,704,029 A | 12/1997 | Wright, Jr. |
| 5,706,211 A | 1/1998 | Beletic et al. |
| 5,706,502 A | 1/1998 | Foley et al. |
| 5,706,507 A | 1/1998 | Schloss |
| 5,710,918 A | 1/1998 | Lagarde et al. |
| 5,713,019 A | 1/1998 | Keaten |
| 5,715,403 A | 2/1998 | Stefik |
| 5,717,925 A | 2/1998 | Harper et al. |
| 5,721,908 A | 2/1998 | Lagarde et al. |
| 5,721,914 A | 2/1998 | DeVries |
| 5,727,202 A | 3/1998 | Kucala |
| 5,729,549 A | 3/1998 | Kostreski et al. |
| 5,729,704 A | 3/1998 | Stone et al. |
| 5,729,735 A | 3/1998 | Meyering |
| 5,742,905 A | 4/1998 | Pepe et al. |
| 5,745,360 A | 4/1998 | Leone et al. |
| 5,752,186 A | 5/1998 | Malackowski et al. |
| 5,752,246 A | 5/1998 | Rogers et al. |
| 5,754,938 A | 5/1998 | Herz et al. |
| 5,757,916 A | 5/1998 | MacDoran et al. |
| 5,758,088 A | 5/1998 | Bezaire et al. |
| 5,758,150 A | 5/1998 | Bell et al. |
| 5,758,322 A | 5/1998 | Rongley |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Nielsen et al. |
| 5,778,361 A | 7/1998 | Nanjo et al. |
| 5,781,614 A | 7/1998 | Brunson |
| 5,781,901 A | 7/1998 | Kuzma |
| 5,781,906 A | 7/1998 | Aggarwal et al. |
| 5,787,430 A | 7/1998 | Doeringer et al. |
| 5,787,441 A | 7/1998 | Beckhardt |
| 5,790,425 A | 8/1998 | Wagle |
| 5,790,790 A | 8/1998 | Smith et al. |
| 5,790,974 A | 8/1998 | Tognazzini |
| 5,793,413 A | 8/1998 | Hylton et al. |
| 5,794,210 A | 8/1998 | Goldhaber et al. |
| 5,799,318 A | 8/1998 | Cardinal et al. |
| 5,802,312 A | 9/1998 | Lazaridis et al. |
| 5,802,454 A | 9/1998 | Goshay et al. |
| 5,802,518 A | 9/1998 | Karaev et al. |
| 5,802,524 A | 9/1998 | Flowers et al. |
| 5,806,074 A | 9/1998 | Souder et al. |
| 5,809,242 A | 9/1998 | Shaw et al. |
| 5,809,415 A | 9/1998 | Rossmann |
| 5,818,437 A | 10/1998 | Grover et al. |
| 5,819,172 A | 10/1998 | Campana, Jr. et al. |
| 5,819,274 A | 10/1998 | Jackson, Jr. |
| 5,819,284 A | 10/1998 | Farber et al. |
| 5,822,324 A | 10/1998 | Kostresti et al. |
| 5,822,747 A | 10/1998 | Graefe et al. |
| 5,826,269 A | 10/1998 | Hussey |
| 5,831,664 A | 11/1998 | Wharton et al. |
| 5,832,483 A | 11/1998 | Barker |
| 5,832,489 A | 11/1998 | Kucala |
| 5,832,500 A | 11/1998 | Burrows |
| 5,835,087 A | 11/1998 | Herz et al. |
| 5,835,722 A | 11/1998 | Bradshaw et al. |
| 5,838,252 A | 11/1998 | Kikinis |
| 5,838,768 A | 11/1998 | Sumar et al. |
| 5,838,973 A | 11/1998 | Carpenter-Smith |
| 5,845,278 A | 12/1998 | Kirsch et al. |
| 5,852,775 A | 12/1998 | Hidary |
| 5,852,820 A | 12/1998 | Burrows |
| 5,857,201 A | 1/1999 | Wright, Jr. et al. |
| 5,862,223 A | 1/1999 | Walker et al. |
| 5,867,665 A | 2/1999 | Butman et al. |
| 5,867,817 A | 2/1999 | Catallo et al. |
| 5,870,759 A | 2/1999 | Bauer et al. |
| 5,884,323 A | 3/1999 | Hawkins et al. |
| 5,889,845 A | 3/1999 | Staples et al. |
| 5,890,147 A | 3/1999 | Peltonen et al. |
| 5,892,909 A | 4/1999 | Grasso et al. |
| 5,898,780 A | 4/1999 | Liu et al. |
| 5,898,917 A | 4/1999 | Batni et al. |
| 5,903,723 A | 5/1999 | Beck et al. |
| 5,907,618 A | 5/1999 | Gennaro et al. |
| 5,909,689 A | 6/1999 | Van Ryzin |
| 5,913,032 A | 6/1999 | Schwartz et al. |
| 5,924,096 A | 7/1999 | Draper et al. |
| 5,928,325 A | 7/1999 | Shaughnessy et al. |
| 5,928,329 A | 7/1999 | Clark et al. |
| 5,937,161 A | 8/1999 | Mulligan et al. |
| 5,940,813 A | 8/1999 | Hutchings |
| 5,943,676 A | 8/1999 | Boothby |
| 5,948,066 A | 9/1999 | Whalen et al. |
| 5,951,636 A | 9/1999 | Zerber |
| 5,960,394 A | 9/1999 | Gould et al. |
| 5,960,406 A | 9/1999 | Rasansky et al. |
| 5,961,590 A | 10/1999 | Mendez et al. |
| 5,963,642 A | 10/1999 | Goldstein |
| 5,964,833 A | 10/1999 | Kikinis |
| 5,968,131 A | 10/1999 | Mendez et al. |
| 5,974,238 A | 10/1999 | Chase, Jr. |
| 5,974,327 A | 10/1999 | Agrawal et al. |
| 5,978,837 A | 11/1999 | Foladare et al. |
| 5,978,933 A | 11/1999 | Wyld et al. |
| 5,987,440 A | 11/1999 | O'Neil et al. |
| 6,000,000 A | 12/1999 | Hawkins et al. |
| 6,003,070 A | 12/1999 | Frantz |
| 6,006,197 A | 12/1999 | d'Eon et al. |
| 6,006,274 A | 12/1999 | Hawkins et al. |
| 6,016,478 A | 1/2000 | Zhang et al. |
| 6,016,520 A | 1/2000 | Facq et al. |
| 6,018,762 A | 1/2000 | Brunson et al. |
| 6,023,700 A | 2/2000 | Owens et al. |

| | | | |
|---|---|---|---|
| 6,023,708 A | 2/2000 | Mendez et al. |
| 6,029,238 A | 2/2000 | Furukawa |
| 6,034,621 A | 3/2000 | Kaufman |
| 6,035,104 A | 3/2000 | Zahariev |
| 6,044,372 A | 3/2000 | Rothfus et al. |
| 6,044,381 A | 3/2000 | Boothby et al. |
| 6,047,051 A | 4/2000 | Ginzboorg et al. |
| 6,047,327 A | 4/2000 | Tso et al. |
| 6,052,563 A | 4/2000 | Macko |
| 6,052,735 A | 4/2000 | Ulrich et al. |
| 6,057,855 A | 5/2000 | Barkans |
| 6,065,055 A | 5/2000 | Hughes et al. |
| 6,073,138 A | 6/2000 | de l'Etraz et al. |
| 6,073,142 A | 6/2000 | Geiger et al. |
| 6,073,165 A | 6/2000 | Narasimhan et al. |
| 6,085,166 A | 7/2000 | Beckhardt et al. |
| 6,085,192 A | 7/2000 | Mendez et al. |
| 6,088,677 A | 7/2000 | Spurgeon |
| 6,101,320 A | 8/2000 | Schuetze et al. |
| 6,101,480 A | 8/2000 | Conmy et al. |
| 6,101,531 A | 8/2000 | Eggleston et al. |
| 6,112,181 A | 8/2000 | Shear et al. |
| 6,119,014 A | 9/2000 | Alperovich et al. |
| 6,119,171 A | 9/2000 | Alkhatib |
| 6,125,369 A | 9/2000 | Wu et al. |
| 6,125,388 A | 9/2000 | Reisman |
| 6,128,627 A | 10/2000 | Mattis et al. |
| 6,130,898 A | 10/2000 | Kostreski et al. |
| 6,131,096 A | 10/2000 | Ng et al. |
| 6,131,116 A | 10/2000 | Riggins et al. |
| 6,134,432 A | 10/2000 | Holmes et al. |
| 6,138,013 A | 10/2000 | Blanchard et al. |
| 6,138,124 A | 10/2000 | Beckhardt |
| 6,138,128 A | 10/2000 | Perkowitz et al. |
| 6,138,146 A | 10/2000 | Moon et al. |
| 6,141,664 A | 10/2000 | Boothby |
| 6,151,606 A | 11/2000 | Mendez |
| 6,157,630 A | 12/2000 | Adler et al. |
| 6,161,140 A | 12/2000 | Moriya |
| 6,167,379 A | 12/2000 | Dean et al. |
| 6,167,435 A | 12/2000 | Druckenmiller et al. |
| 6,170,014 B1 | 1/2001 | Darago et al. |
| 6,173,312 B1 | 1/2001 | Atarashi et al. |
| 6,173,446 B1 | 1/2001 | Khan et al. |
| 6,175,831 B1 | 1/2001 | Weinreich et al. |
| 6,178,419 B1 | 1/2001 | Legh-Smith et al. |
| 6,181,935 B1 | 1/2001 | Gossman et al. |
| 6,185,184 B1 | 2/2001 | Mattaway et al. |
| 6,195,533 B1 | 2/2001 | Tkatch et al. |
| 6,198,696 B1 | 3/2001 | Korpi |
| 6,198,922 B1 | 3/2001 | Baynham |
| 6,201,469 B1 | 3/2001 | Balch et al. |
| 6,202,085 B1 | 3/2001 | Benson et al. |
| 6,205,448 B1 | 3/2001 | Kruglikov et al. |
| 6,212,529 B1 | 4/2001 | Boothby et al. |
| 6,219,694 B1 | 4/2001 | Lazaridis et al. |
| 6,221,877 B1 | 4/2001 | Aronov et al. |
| 6,223,187 B1 | 4/2001 | Boothby et al. |
| 6,226,686 B1 | 5/2001 | Rothschild et al. |
| 6,233,341 B1 | 5/2001 | Riggins |
| 6,243,705 B1 | 6/2001 | Kucala |
| 6,246,875 B1 | 6/2001 | Seazholtz et al. |
| 6,247,135 B1 | 6/2001 | Feague |
| 6,249,808 B1 | 6/2001 | Seshadri |
| 6,256,666 B1 | 7/2001 | Singhai |
| 6,263,201 B1 | 7/2001 | Hashimoto et al. |
| 6,263,340 B1 | 7/2001 | Green |
| 6,269,369 B1 | 7/2001 | Robertson |
| 6,272,545 B1 | 8/2001 | Flanagin et al. |
| 6,275,850 B1 | 8/2001 | Beyda et al. |
| 6,275,858 B1 | 8/2001 | Bates et al. |
| 6,289,212 B1 | 9/2001 | Stein et al. |
| 6,289,214 B1 | 9/2001 | Backstrom |
| 6,292,904 B1 | 9/2001 | Broomhall et al. |
| 6,295,541 B1 | 9/2001 | Bodnar et al. |
| 6,300,947 B1 | 10/2001 | Kanevsky |
| 6,304,881 B1 | 10/2001 | Halim et al. |
| 6,308,201 B1 | 10/2001 | Pivowar et al. |
| 6,317,594 B1 | 11/2001 | Gossman et al. |
| 6,320,943 B1 | 11/2001 | Borland |
| 6,324,541 B1 | 11/2001 | de l'Etraz et al. |
| 6,324,542 B1 | 11/2001 | Wright, Jr. et al. |
| 6,324,544 B1 | 11/2001 | Alam et al. |
| 6,324,587 B1 | 11/2001 | Trenboath et al. |
| 6,327,586 B1 | 12/2001 | Kislel |
| 6,336,117 B1 | 1/2002 | Massarani |
| 6,336,138 B1 | 1/2002 | Caswell et al. |
| 6,351,767 B1 | 2/2002 | Batchelder et al. |
| 6,356,937 B1 | 3/2002 | Montville et al. |
| 6,363,051 B1 | 3/2002 | Eslambolchi et al. |
| 6,363,352 B1 | 3/2002 | Dailey et al. |
| 6,370,566 B2 | 4/2002 | Discolo et al. |
| 6,377,810 B1 | 4/2002 | Geiger et al. |
| 6,380,959 B1 | 4/2002 | Wang et al. |
| 6,389,422 B1 | 5/2002 | Doi et al. |
| 6,389,455 B1 | 5/2002 | Fuisz |
| 6,389,457 B2 | 5/2002 | Lazaridis et al. |
| 6,397,057 B1 | 5/2002 | Malackowski et al. |
| 6,397,230 B1 | 5/2002 | Carmel et al. |
| 6,401,104 B1 | 6/2002 | LaRue et al. |
| 6,401,112 B1 | 6/2002 | Boyer et al. |
| 6,401,113 B2 | 6/2002 | Lazaridis et al. |
| 6,405,197 B2 | 6/2002 | Gilmour |
| 6,411,696 B1 | 6/2002 | Iverson et al. |
| 6,415,031 B1 | 7/2002 | Colligan et al. |
| 6,418,308 B1 | 7/2002 | Heinonen et al. |
| 6,421,669 B1 | 7/2002 | Gilmour et al. |
| 6,421,781 B1 | 7/2002 | Fox et al. |
| 6,430,602 B1 | 8/2002 | Kay et al. |
| 6,438,585 B2 | 8/2002 | Mousseau et al. |
| 6,438,612 B1 | 8/2002 | Ylonen et al. |
| 6,442,589 B1 | 8/2002 | Takahashi et al. |
| 6,442,637 B1 | 8/2002 | Hawkins et al. |
| 6,446,118 B1 | 9/2002 | Gottlieb |
| 6,463,463 B1 | 10/2002 | Godfrey et al. |
| 6,463,464 B1 | 10/2002 | Lazaridis et al. |
| 6,487,557 B1 | 11/2002 | Nagatomo |
| 6,487,560 B1 | 11/2002 | LaRue et al. |
| 6,490,353 B1 | 12/2002 | Tan |
| 6,496,802 B1 | 12/2002 | van Zoest et al. |
| 6,499,054 B1 | 12/2002 | Hesselink et al. |
| 6,505,214 B1 | 1/2003 | Sherman et al. |
| 6,516,327 B1 | 2/2003 | Zondervan et al. |
| 6,526,433 B1 | 2/2003 | Chang et al. |
| 6,526,506 B1 | 2/2003 | Lewis |
| 6,529,908 B1 | 3/2003 | Piett et al. |
| 6,532,446 B1 | 3/2003 | King |
| 6,535,892 B1 | 3/2003 | LaRue et al. |
| 6,546,005 B1 | 4/2003 | Berkley et al. |
| 6,549,939 B1 | 4/2003 | Ford et al. |
| 6,556,217 B1 | 4/2003 | Makipaa et al. |
| 6,593,944 B1 | 7/2003 | Nicolas et al. |
| 6,601,026 B2 | 7/2003 | Appelt et al. |
| 6,615,253 B1 | 9/2003 | Bowman-Amuah |
| 6,618,710 B1 | 9/2003 | Zondervan et al. |
| 6,621,892 B1 | 9/2003 | Banister et al. |
| 6,622,157 B1 | 9/2003 | Heddaya et al. |
| 6,625,621 B2 | 9/2003 | Tan et al. |
| 6,636,482 B2 | 10/2003 | Cloonan et al. |
| 6,639,693 B1 | 10/2003 | Ejiri et al. |
| 6,640,097 B2 | 10/2003 | Corrigan et al. |
| 6,640,244 B1 | 10/2003 | Bowman-Amuah |
| 6,640,249 B1 | 10/2003 | Bowman-Amuah |
| 6,643,650 B1 | 11/2003 | Slaughter et al. |
| 6,643,688 B1 | 11/2003 | Fuisz |
| 6,647,384 B2 | 11/2003 | Gilmour |
| 6,650,890 B1 | 11/2003 | Irlam et al. |
| 6,662,016 B1 | 12/2003 | Buckham et al. |
| 6,668,046 B1 | 12/2003 | Albal |
| 6,671,695 B2 | 12/2003 | McFadden |
| 6,671,700 B1 | 12/2003 | Creemer et al. |
| 6,671,702 B2 | 12/2003 | Kruglikov et al. |
| 6,671,757 B1 | 12/2003 | Multer et al. |
| 6,694,336 B1 | 2/2004 | Multer et al. |
| 6,697,807 B2 | 2/2004 | McGeachie |
| 6,701,378 B1 | 3/2004 | Gilhuly et al. |
| 6,707,801 B2 | 3/2004 | Hsu |
| 6,708,221 B1 | 3/2004 | Mendez et al. |

| | | |
|---|---|---|
| 6,714,965 B2 * | 3/2004 | Kakuta et al. ................. 709/204 |
| 6,721,787 B1 | 4/2004 | Hiscock |
| 6,727,917 B1 | 4/2004 | Chew et al. |
| 6,728,530 B1 | 4/2004 | Heinonen et al. |
| 6,728,786 B2 | 4/2004 | Hawkins et al. |
| 6,732,101 B1 | 5/2004 | Cook |
| 6,732,158 B1 | 5/2004 | Hesselink et al. |
| 6,735,591 B2 | 5/2004 | Khan |
| 6,741,232 B1 | 5/2004 | Siedlikowski et al. |
| 6,741,855 B1 | 5/2004 | Martin et al. |
| 6,742,015 B1 | 5/2004 | Bowman-Amuah |
| 6,742,059 B1 | 5/2004 | Todd et al. |
| 6,745,024 B1 | 6/2004 | DeJaco et al. |
| 6,745,326 B1 | 6/2004 | Wary |
| 6,756,882 B2 | 6/2004 | Benes et al. |
| 6,757,362 B1 | 6/2004 | Cooper et al. |
| 6,757,696 B2 | 6/2004 | Multer et al. |
| 6,757,708 B1 | 6/2004 | Craig et al. |
| 6,760,916 B2 | 7/2004 | Holtz et al. |
| 6,771,294 B1 | 8/2004 | Pulli et al. |
| 6,775,362 B1 | 8/2004 | Ransom |
| 6,779,019 B1 | 8/2004 | Mousseau et al. |
| 6,782,409 B1 | 8/2004 | Yoshida |
| 6,785,868 B1 | 8/2004 | Raff |
| 6,785,906 B1 | 8/2004 | Gaughan et al. |
| 6,799,190 B1 | 9/2004 | Boothby |
| 6,804,707 B1 | 10/2004 | Ronning |
| 6,816,849 B1 | 11/2004 | Halt, Jr. |
| 6,820,088 B1 | 11/2004 | Hind et al. |
| 6,820,204 B1 | 11/2004 | Desai et al. |
| 6,829,487 B2 | 12/2004 | Eiden et al. |
| 6,834,195 B2 | 12/2004 | Brandenberg et al. |
| 6,847,974 B2 | 1/2005 | Wachtel |
| 6,850,757 B2 | 2/2005 | Watanabe et al. |
| 6,859,212 B2 | 2/2005 | Kumar et al. |
| 6,867,774 B1 | 3/2005 | Halmshaw et al. |
| 6,868,447 B1 | 3/2005 | Slaughter et al. |
| 6,871,220 B1 | 3/2005 | Rajan et al. |
| 6,871,236 B2 | 3/2005 | Fishman et al. |
| 6,873,688 B1 | 3/2005 | Aarnio |
| 6,874,017 B1 | 3/2005 | Inoue et al. |
| 6,879,985 B2 | 4/2005 | Deguchi et al. |
| 6,886,030 B1 | 4/2005 | Easterbrook et al. |
| 6,892,070 B2 | 5/2005 | Warrier et al. |
| 6,892,196 B1 | 5/2005 | Hughes |
| 6,895,394 B1 | 5/2005 | Kremer et al. |
| 6,895,558 B1 | 5/2005 | Loveland |
| 6,898,427 B1 | 5/2005 | Griffith et al. |
| 6,922,547 B2 | 7/2005 | O'Neill et al. |
| 6,922,721 B1 | 7/2005 | Minborg |
| 6,925,477 B1 | 8/2005 | Champagne et al. |
| 6,931,529 B2 | 8/2005 | Kunzinger |
| 6,938,079 B1 | 8/2005 | Anderson et al. |
| 6,944,447 B2 | 9/2005 | Portman et al. |
| 6,944,662 B2 | 9/2005 | Devine et al. |
| 6,947,770 B2 | 9/2005 | Rydbeck |
| 6,957,397 B1 | 10/2005 | Hawkins et al. |
| 6,965,917 B1 | 11/2005 | Aloni et al. |
| 6,965,968 B1 | 11/2005 | Touboul |
| 6,966,058 B2 | 11/2005 | Earl et al. |
| 6,968,175 B2 | 11/2005 | Raivisto et al. |
| 6,970,879 B1 | 11/2005 | Gilmour |
| 6,972,682 B2 | 12/2005 | Lareau et al. |
| 6,973,299 B2 | 12/2005 | Apfel |
| 6,981,041 B2 | 12/2005 | Araujo et al. |
| 6,981,047 B2 | 12/2005 | Hanson et al. |
| 6,985,933 B1 | 1/2006 | Singhal et al. |
| 6,985,983 B2 | 1/2006 | Pellegrino et al. |
| 6,986,061 B1 | 1/2006 | Kunzinger |
| 6,987,734 B2 | 1/2006 | Hundemer |
| 6,990,472 B2 | 1/2006 | Rosenhaft et al. |
| 6,993,326 B2 | 1/2006 | Link, II et al. |
| 6,993,327 B2 | 1/2006 | Mathis |
| 6,996,627 B1 | 2/2006 | Carden |
| 6,999,753 B2 | 2/2006 | Beckmann et al. |
| 7,020,685 B1 | 3/2006 | Chen et al. |
| 7,024,491 B1 | 4/2006 | Hanmann et al. |
| 7,026,984 B1 | 4/2006 | Thandu et al. |
| 7,032,242 B1 | 4/2006 | Grabelsky et al. |
| 7,035,630 B2 | 4/2006 | Knowles |
| 7,046,993 B2 | 5/2006 | Haaramo et al. |
| 7,047,202 B2 | 5/2006 | Jaipuria et al. |
| 7,062,024 B2 | 6/2006 | Kreckel et al. |
| 7,069,308 B2 | 6/2006 | Abrams |
| 7,072,678 B2 | 7/2006 | Allison |
| 7,079,499 B1 | 7/2006 | Akhtar et al. |
| 7,080,371 B1 | 7/2006 | Arnaiz et al. |
| 7,082,316 B2 | 7/2006 | Eiden et al. |
| 7,085,365 B2 | 8/2006 | Kauppinen |
| 7,096,030 B2 | 8/2006 | Huomo |
| 7,100,821 B2 | 9/2006 | Rasti |
| 7,103,432 B2 | 9/2006 | Drader et al. |
| 7,120,692 B2 | 10/2006 | Hesselink et al. |
| 7,120,928 B2 | 10/2006 | Sheth |
| 7,130,839 B2 | 10/2006 | Boreham et al. |
| 7,136,645 B2 | 11/2006 | Hanson et al. |
| 7,139,555 B2 | 11/2006 | Apfel |
| 7,139,565 B2 | 11/2006 | Fiatal et al. |
| 7,140,549 B2 | 11/2006 | de Jong |
| 7,146,645 B1 | 12/2006 | Hellsten et al. |
| 7,149,780 B2 | 12/2006 | Quine et al. |
| 7,149,789 B2 | 12/2006 | Slivka et al. |
| 7,149,959 B1 | 12/2006 | Jones et al. |
| 7,162,241 B2 | 1/2007 | Kim et al. |
| 7,165,727 B2 | 1/2007 | de Jong |
| 7,172,118 B2 | 2/2007 | Urken |
| 7,181,228 B2 | 2/2007 | Boesch |
| 7,184,790 B2 | 2/2007 | Dorenbosch et al. |
| 7,185,362 B2 | 2/2007 | Hawkes et al. |
| 7,194,273 B2 | 3/2007 | Vaudreuil |
| 7,200,390 B1 | 4/2007 | Henager et al. |
| 7,203,733 B1 | 4/2007 | Bern |
| 7,206,806 B2 | 4/2007 | Pineau |
| 7,209,757 B2 | 4/2007 | Naghian et al. |
| 7,210,121 B2 | 4/2007 | Xia et al. |
| 7,219,139 B2 | 5/2007 | Martin et al. |
| 7,219,222 B1 | 5/2007 | Durbin et al. |
| 7,224,957 B2 | 5/2007 | Spector |
| 7,231,206 B2 | 6/2007 | Cudak et al. |
| 7,233,795 B1 | 6/2007 | Ryden |
| 7,234,111 B2 | 6/2007 | Chu et al. |
| 7,239,877 B2 | 7/2007 | Corneille et al. |
| 7,240,095 B2 | 7/2007 | Lewis |
| 7,242,680 B2 | 7/2007 | Gallant |
| 7,245,926 B2 | 7/2007 | Liao et al. |
| 7,257,391 B2 | 8/2007 | Burgess et al. |
| 7,257,639 B1 | 8/2007 | Li et al. |
| 7,259,666 B1 | 8/2007 | Hermsmeyer et al. |
| 7,260,552 B2 | 8/2007 | Riera Jorba et al. |
| 7,260,590 B1 | 8/2007 | Williams |
| 7,260,651 B2 | 8/2007 | Parrella, Sr. et al. |
| 7,272,830 B2 | 9/2007 | de Jong |
| 7,277,408 B2 | 10/2007 | Sorsa |
| 7,284,664 B1 | 10/2007 | Ivchenko et al. |
| 7,289,792 B1 | 10/2007 | Turunen |
| 7,289,964 B1 | 10/2007 | Bowman-Amuah |
| 7,289,971 B1 | 10/2007 | O'Neil |
| 7,293,107 B1 | 11/2007 | Hanson et al. |
| 7,295,853 B2 | 11/2007 | Jin et al. |
| 7,296,155 B1 | 11/2007 | Trostle et al. |
| 7,305,252 B2 | 12/2007 | Britt et al. |
| 7,305,700 B2 | 12/2007 | Boynton et al. |
| 7,310,350 B1 | 12/2007 | Shao et al. |
| 7,310,729 B2 | 12/2007 | Gordon et al. |
| 7,324,473 B2 | 1/2008 | Corneille et al. |
| 7,337,219 B1 | 2/2008 | Meenan et al. |
| 7,349,871 B2 | 3/2008 | Labrou et al. |
| 7,353,274 B1 | 4/2008 | Rouhi et al. |
| 7,359,720 B2 | 4/2008 | Hartmaier et al. |
| 7,373,386 B2 | 5/2008 | Gardner et al. |
| 7,373,661 B2 | 5/2008 | Smith et al. |
| 7,374,099 B2 | 5/2008 | de Jong |
| 7,376,701 B2 | 5/2008 | Bhargava et al. |
| 7,382,879 B1 | 6/2008 | Miller |
| 7,383,339 B1 | 6/2008 | Meenan et al. |
| 7,388,950 B2 | 6/2008 | Elsey et al. |
| 7,389,412 B2 | 6/2008 | Sharma et al. |
| 7,392,483 B2 | 6/2008 | Wong et al. |

| | | | | | | |
|---|---|---|---|---|---|---|
| 7,395,329 B1 | 7/2008 | Holt et al. | 8,116,214 B2 | 2/2012 | Backholm et al. | |
| 7,398,271 B1 | 7/2008 | Borkovsky et al. | 8,127,342 B2 | 2/2012 | Boynton et al. | |
| 7,430,609 B2 | 9/2008 | Brown et al. | 8,131,763 B2 | 3/2012 | Tuscano et al. | |
| 7,441,271 B2 | 10/2008 | Fiatal et al. | 8,166,164 B1 | 4/2012 | Luna et al. | |
| 7,443,847 B1 | 10/2008 | Albert et al. | 8,190,701 B2 | 5/2012 | Luna et al. | |
| 7,461,071 B2 | 12/2008 | Fitzpatrick | 8,194,680 B1 | 6/2012 | Brandwine et al. | |
| 7,465,231 B2 | 12/2008 | Lewin et al. | 8,204,953 B2 | 6/2012 | Luna et al. | |
| 7,469,125 B2 | 12/2008 | Nurmi | 8,209,709 B2 | 6/2012 | Fleming | |
| 7,472,424 B2 | 12/2008 | Evans et al. | 8,239,915 B1 | 8/2012 | Satish et al. | |
| 7,483,036 B2 | 1/2009 | Moore | 8,260,852 B1 | 9/2012 | Cselle | |
| 7,499,537 B2 | 3/2009 | Elsey et al. | 8,291,076 B2 | 10/2012 | Luna et al. | |
| 7,502,615 B2 | 3/2009 | Wilhoite et al. | 8,316,098 B2 | 11/2012 | Luna et al. | |
| 7,519,042 B2 | 4/2009 | Gorday et al. | 8,326,985 B2 | 12/2012 | Luna et al. | |
| 7,532,571 B1 | 5/2009 | Price et al. | 2001/0009025 A1 | 7/2001 | Ahonen | |
| 7,539,665 B2 | 5/2009 | Mendez | 2001/0010046 A1 | 7/2001 | Muyres et al. | |
| 7,548,947 B2 | 6/2009 | Karsriel et al. | 2001/0013069 A1 | 8/2001 | Shah | |
| 7,548,969 B2 | 6/2009 | Tripp et al. | 2001/0023414 A1 | 9/2001 | Kumar et al. | |
| 7,551,900 B2 | 6/2009 | Kang et al. | 2001/0032254 A1 | 10/2001 | Hawkins | |
| 7,567,575 B2 | 7/2009 | Chen et al. | 2001/0034225 A1 | 10/2001 | Gupte et al. | |
| 7,574,208 B2 | 8/2009 | Hanson et al. | 2001/0034244 A1 | 10/2001 | Calder et al. | |
| 7,575,171 B2 | 8/2009 | Lev | 2001/0037453 A1 | 11/2001 | Mitty et al. | |
| 7,584,294 B2 | 9/2009 | Plamondon | 2001/0039191 A1 | 11/2001 | Maierhofer | |
| 7,587,482 B2 | 9/2009 | Henderson et al. | 2001/0041566 A1 | 11/2001 | Xanthos et al. | |
| 7,587,608 B2 | 9/2009 | Haller et al. | 2001/0042009 A1 | 11/2001 | Montague | |
| 7,593,714 B2 | 9/2009 | Schultz et al. | 2001/0042099 A1 | 11/2001 | Peng | |
| 7,596,608 B2 | 9/2009 | Alexander et al. | 2001/0043148 A1* | 11/2001 | Stewart | 340/988 |
| 7,596,791 B2 | 9/2009 | Wei et al. | 2001/0052052 A1 | 12/2001 | Peng | |
| 7,613,792 B2 | 11/2009 | Zervas et al. | 2001/0053687 A1 | 12/2001 | Sivula | |
| 7,630,986 B1 | 12/2009 | Herz et al. | 2002/0002478 A1 | 1/2002 | Swart et al. | |
| 7,634,558 B1 | 12/2009 | Mangal et al. | 2002/0002591 A1 | 1/2002 | Ketola | |
| 7,643,818 B2 | 1/2010 | Backholm et al. | 2002/0004746 A1 | 1/2002 | Ferber et al. | |
| 7,644,166 B2 | 1/2010 | Appelman et al. | 2002/0007303 A1 | 1/2002 | Brookler et al. | |
| 7,647,047 B2 | 1/2010 | Moghaddam et al. | 2002/0013727 A1 | 1/2002 | Lee | |
| 7,650,416 B2 | 1/2010 | Wu et al. | 2002/0019225 A1 | 2/2002 | Miyashita | |
| 7,672,291 B2 | 3/2010 | Wang | 2002/0019812 A1 | 2/2002 | Board et al. | |
| 7,672,439 B2 | 3/2010 | Appelman et al. | 2002/0035556 A1 | 3/2002 | Shah et al. | |
| 7,680,281 B2 | 3/2010 | Fiatal et al. | 2002/0035617 A1 | 3/2002 | Lynch et al. | |
| 7,684,346 B2 | 3/2010 | Valli | 2002/0038253 A1 | 3/2002 | Seaman et al. | |
| 7,689,664 B2 | 3/2010 | Karlberg | 2002/0042875 A1 | 4/2002 | Shukla | |
| 7,693,555 B2 | 4/2010 | Srinivasan et al. | 2002/0049828 A1 | 4/2002 | Pekarek-Kostka | |
| 7,693,944 B2 | 4/2010 | Appelman et al. | 2002/0049857 A1 | 4/2002 | Farber et al. | |
| 7,694,008 B2 | 4/2010 | Chang et al. | 2002/0053078 A1 | 5/2002 | Holtz et al. | |
| 7,706,781 B2 | 4/2010 | Backholm et al. | 2002/0055351 A1 | 5/2002 | Elsey et al. | |
| 7,707,573 B1 | 4/2010 | Marmaros et al. | 2002/0059201 A1 | 5/2002 | Work | |
| 7,752,633 B1 | 7/2010 | Fleming | 2002/0059457 A1 | 5/2002 | Ballard et al. | |
| 7,757,956 B2 | 7/2010 | Koenck et al. | 2002/0068559 A1 | 6/2002 | Sharma et al. | |
| 7,769,395 B2 | 8/2010 | Fiatal et al. | 2002/0073207 A1 | 6/2002 | Widger et al. | |
| 7,769,400 B2 | 8/2010 | Backholm et al. | 2002/0077077 A1 | 6/2002 | Rezvani et al. | |
| 7,769,805 B1 | 8/2010 | Barnes et al. | 2002/0077084 A1 | 6/2002 | Zellner et al. | |
| 7,770,223 B2 | 8/2010 | Shevenell et al. | 2002/0078384 A1 | 6/2002 | Hippelainen | |
| 7,778,792 B2 | 8/2010 | Huang et al. | 2002/0087549 A1 | 7/2002 | Mostafa | |
| 7,783,757 B2 | 8/2010 | Plamondon | 2002/0087679 A1 | 7/2002 | Pulley et al. | |
| 7,796,742 B1 | 9/2010 | Sutaria et al. | 2002/0087883 A1 | 7/2002 | Wohlgemuth et al. | |
| 7,797,064 B2 | 9/2010 | Loomis et al. | 2002/0089542 A1 | 7/2002 | Imamura | |
| 7,809,818 B2 | 10/2010 | Plamondon | 2002/0091921 A1 | 7/2002 | Kunzinger | |
| 7,827,055 B1 | 11/2010 | Snodgrass et al. | 2002/0095319 A1 | 7/2002 | Swart et al. | |
| 7,827,597 B2 | 11/2010 | Boynton et al. | 2002/0095328 A1 | 7/2002 | Swart et al. | |
| 7,849,507 B1 | 12/2010 | Bloch et al. | 2002/0095391 A1 | 7/2002 | Swart et al. | |
| 7,853,563 B2 | 12/2010 | Alvarado et al. | 2002/0095399 A1 | 7/2002 | Devine et al. | |
| 7,877,703 B1 | 1/2011 | Fleming | 2002/0098855 A1 | 7/2002 | Hartmaier et al. | |
| 7,881,745 B1 | 2/2011 | Rao et al. | 2002/0099613 A1 | 7/2002 | Swart et al. | |
| 7,899,996 B1 | 3/2011 | Levin-Michael | 2002/0099809 A1 | 7/2002 | Lee | |
| 7,908,656 B1 | 3/2011 | Mu | 2002/0101975 A1 | 8/2002 | Tiburtius et al. | |
| 7,917,468 B2 | 3/2011 | Ariel et al. | 2002/0103934 A1 | 8/2002 | Fishman et al. | |
| 7,917,505 B2 | 3/2011 | van Gent et al. | 2002/0107944 A1 | 8/2002 | Bai et al. | |
| 7,921,167 B2 | 4/2011 | Shroff et al. | 2002/0107985 A1 | 8/2002 | Hwang et al. | |
| 7,930,416 B2 | 4/2011 | Miller et al. | 2002/0116499 A1 | 8/2002 | Enns et al. | |
| 7,933,929 B1 | 4/2011 | McClendon et al. | 2002/0116501 A1 | 8/2002 | Ho et al. | |
| 7,937,091 B2 | 5/2011 | Roman et al. | 2002/0120388 A1 | 8/2002 | Bullock | |
| 7,970,860 B2 | 6/2011 | Kline et al. | 2002/0120766 A1 | 8/2002 | Okajima et al. | |
| 7,996,487 B2 | 8/2011 | Snyder | 2002/0120779 A1 | 8/2002 | Teeple et al. | |
| 8,005,891 B2 | 8/2011 | Knowles et al. | 2002/0126701 A1 | 9/2002 | Requena | |
| 8,010,082 B2 | 8/2011 | Sutaria et al. | 2002/0128908 A1 | 9/2002 | Levin et al. | |
| 8,032,409 B1 | 10/2011 | Mikurak | 2002/0133504 A1 | 9/2002 | Vlahos et al. | |
| 8,064,583 B1 | 11/2011 | Sutaria et al. | 2002/0144109 A1 | 10/2002 | Benantar et al. | |
| 8,069,166 B2 | 11/2011 | Alvarado et al. | 2002/0146129 A1 | 10/2002 | Kaplan | |
| 8,074,162 B1 | 12/2011 | Cohen | 2002/0152379 A1 | 10/2002 | Gefwert et al. | |
| 8,078,158 B2 | 12/2011 | Backholm | 2002/0155848 A1 | 10/2002 | Suryanarayana | |
| 8,107,921 B2 | 1/2012 | Fiatal | 2002/0156839 A1 | 10/2002 | Peterson et al. | |

| Publication No. | Date | Inventor | | Publication No. | Date | Inventor |
|---|---|---|---|---|---|---|
| 2002/0158908 A1 | 10/2002 | Vaajala et al. | | 2004/0047356 A1 | 3/2004 | Bauer |
| 2002/0161587 A1 | 10/2002 | Pitts et al. | | 2004/0049579 A1 | 3/2004 | Ims et al. |
| 2002/0161925 A1 | 10/2002 | Munger et al. | | 2004/0049599 A1 | 3/2004 | Friend et al. |
| 2002/0161928 A1 | 10/2002 | Ndili | | 2004/0051715 A1 | 3/2004 | Brokenshire et al. |
| 2002/0164977 A1 | 11/2002 | Link, II et al. | | 2004/0054739 A1 | 3/2004 | Friend et al. |
| 2002/0167484 A1 | 11/2002 | Hatanaka et al. | | 2004/0064445 A1 | 4/2004 | Pfleging et al. |
| 2002/0174189 A1 | 11/2002 | Peng | | 2004/0064488 A1 | 4/2004 | Sinha |
| 2002/0186848 A1 | 12/2002 | Shaik | | 2004/0068579 A1 | 4/2004 | Marmigere et al. |
| 2002/0188940 A1 | 12/2002 | Breckner et al. | | 2004/0068698 A1 | 4/2004 | Wu et al. |
| 2002/0193094 A1 | 12/2002 | Lawless et al. | | 2004/0073476 A1 | 4/2004 | Donahue et al. |
| 2002/0194209 A1 | 12/2002 | Bolosky et al. | | 2004/0073651 A1 | 4/2004 | Beaulieu et al. |
| 2002/0198027 A1 | 12/2002 | Rydbeck | | 2004/0075675 A1 | 4/2004 | Raivisto et al. |
| 2003/0005151 A1 | 1/2003 | Ullman et al. | | 2004/0075695 A1 | 4/2004 | Chew et al. |
| 2003/0014491 A1* | 1/2003 | Horvitz et al. ............ 709/206 | | 2004/0078814 A1 | 4/2004 | Allen |
| 2003/0022662 A1 | 1/2003 | Mittal | | 2004/0080515 A1 | 4/2004 | Hagiwara |
| 2003/0023692 A1 | 1/2003 | Moroo | | 2004/0082346 A1 | 4/2004 | Skytt et al. |
| 2003/0023975 A1 | 1/2003 | Schrader et al. | | 2004/0098625 A1 | 5/2004 | Lagadec et al. |
| 2003/0028430 A1 | 2/2003 | Zimmerman | | 2004/0103147 A1 | 5/2004 | Flesher et al. |
| 2003/0028441 A1 | 2/2003 | Barsness et al. | | 2004/0107319 A1 | 6/2004 | D'Orto et al. |
| 2003/0046433 A1 | 3/2003 | Luzzatti et al. | | 2004/0110497 A1 | 6/2004 | Little |
| 2003/0046586 A1 | 3/2003 | Bheemarasetti et al. | | 2004/0120323 A1 | 6/2004 | Viikari et al. |
| 2003/0046587 A1 | 3/2003 | Bheemarasetti et al. | | 2004/0123095 A1 | 6/2004 | Marshall |
| 2003/0050041 A1 | 3/2003 | Wu | | 2004/0123304 A1 | 6/2004 | Black et al. |
| 2003/0051142 A1 | 3/2003 | Hidalgo et al. | | 2004/0127214 A1 | 7/2004 | Reddy et al. |
| 2003/0054810 A1 | 3/2003 | Chen et al. | | 2004/0128375 A1 | 7/2004 | Rockwell |
| 2003/0056096 A1 | 3/2003 | Albert et al. | | 2004/0133626 A1 | 7/2004 | Herrero et al. |
| 2003/0060188 A1 | 3/2003 | Gidron et al. | | 2004/0141011 A1 | 7/2004 | Smethers et al. |
| 2003/0063120 A1 | 4/2003 | Wong et al. | | 2004/0147248 A1 | 7/2004 | Will |
| 2003/0065738 A1 | 4/2003 | Yang et al. | | 2004/0147262 A1 | 7/2004 | Lescuyer et al. |
| 2003/0065739 A1 | 4/2003 | Shnier | | 2004/0148375 A1 | 7/2004 | Levett et al. |
| 2003/0065802 A1 | 4/2003 | Vitikainen et al. | | 2004/0151186 A1 | 8/2004 | Akama |
| 2003/0070061 A1 | 4/2003 | Wong et al. | | 2004/0158611 A1 | 8/2004 | Daniell et al. |
| 2003/0072451 A1 | 4/2003 | Pimentel et al. | | 2004/0167966 A1 | 8/2004 | Lee et al. |
| 2003/0078880 A1 | 4/2003 | Alley et al. | | 2004/0170257 A1 | 9/2004 | Gross et al. |
| 2003/0084165 A1 | 5/2003 | Kjellberg et al. | | 2004/0172481 A1* | 9/2004 | Engstrom ............ 709/239 |
| 2003/0088629 A1 | 5/2003 | Berkowitz et al. | | 2004/0176128 A1 | 9/2004 | Grabelsky et al. |
| 2003/0093691 A1 | 5/2003 | Simon et al. | | 2004/0177369 A1 | 9/2004 | Akins |
| 2003/0097381 A1 | 5/2003 | Detweiler et al. | | 2004/0179513 A1 | 9/2004 | Smith et al. |
| 2003/0100321 A1 | 5/2003 | Rao et al. | | 2004/0181550 A1 | 9/2004 | Warsta et al. |
| 2003/0100326 A1 | 5/2003 | Grube et al. | | 2004/0184475 A1 | 9/2004 | Meier |
| 2003/0117432 A1 | 6/2003 | Kautto-Kiovula et al. | | 2004/0186902 A1* | 9/2004 | Stewart ............ 709/217 |
| 2003/0120685 A1 | 6/2003 | Duncombe et al. | | 2004/0189610 A1 | 9/2004 | Friend |
| 2003/0125023 A1 | 7/2003 | Fishler | | 2004/0199497 A1 | 10/2004 | Timmons |
| 2003/0126216 A1 | 7/2003 | Avila et al. | | 2004/0199582 A1 | 10/2004 | Kucharewski et al. |
| 2003/0130984 A1 | 7/2003 | Quinlan et al. | | 2004/0199663 A1 | 10/2004 | Horvitz et al. |
| 2003/0145038 A1 | 7/2003 | Bin Tariq et al. | | 2004/0204085 A1 | 10/2004 | Vargas et al. |
| 2003/0146934 A1 | 8/2003 | Bailey et al. | | 2004/0205248 A1 | 10/2004 | Little et al. |
| 2003/0153338 A1 | 8/2003 | Herz et al. | | 2004/0205330 A1 | 10/2004 | Godfrey et al. |
| 2003/0154212 A1 | 8/2003 | Schrimer et al. | | 2004/0209602 A1 | 10/2004 | Joyce et al. |
| 2003/0156146 A1 | 8/2003 | Suomela et al. | | 2004/0210639 A1 | 10/2004 | Ben-Yoseph et al. |
| 2003/0157947 A1 | 8/2003 | Fiatal et al. | | 2004/0219940 A1 | 11/2004 | Kong et al. |
| 2003/0169262 A1 | 9/2003 | Lavelle et al. | | 2004/0229609 A1 | 11/2004 | Yamaguchi |
| 2003/0177281 A1 | 9/2003 | McQuillan et al. | | 2004/0230619 A1 | 11/2004 | Blanco et al. |
| 2003/0182420 A1 | 9/2003 | Jones et al. | | 2004/0233930 A1 | 11/2004 | Colby |
| 2003/0182431 A1 | 9/2003 | Sturniolo et al. | | 2004/0236792 A1 | 11/2004 | Celik |
| 2003/0187984 A1 | 10/2003 | Banavar et al. | | 2004/0242209 A1 | 12/2004 | Kruis et al. |
| 2003/0204605 A1 | 10/2003 | Hudson et al. | | 2004/0252816 A1 | 12/2004 | Nicolas |
| 2003/0208529 A1 | 11/2003 | Pendyala et al. | | 2004/0255126 A1 | 12/2004 | Reith |
| 2003/0208559 A1 | 11/2003 | Velline et al. | | 2004/0258231 A1 | 12/2004 | Elsey et al. |
| 2003/0210666 A1 | 11/2003 | Trossen et al. | | 2004/0259535 A1 | 12/2004 | Elsey et al. |
| 2003/0211845 A1 | 11/2003 | Lohtia et al. | | 2004/0259537 A1 | 12/2004 | Ackley |
| 2003/0217098 A1 | 11/2003 | Bobde et al. | | 2004/0260948 A1 | 12/2004 | Miyata et al. |
| 2003/0217142 A1* | 11/2003 | Bobde et al. ............ 709/224 | | 2004/0264396 A1 | 12/2004 | Ginzburg et al. |
| 2003/0223554 A1 | 12/2003 | Zhang | | 2004/0266364 A1 | 12/2004 | Nguyen et al. |
| 2003/0227487 A1 | 12/2003 | Hugh | | 2004/0268148 A1 | 12/2004 | Karjala et al. |
| 2003/0227745 A1 | 12/2003 | Khoo | | 2005/0002501 A1 | 1/2005 | Elsey et al. |
| 2003/0235308 A1 | 12/2003 | Boynton et al. | | 2005/0002508 A1 | 1/2005 | Elsey et al. |
| 2003/0236857 A1 | 12/2003 | Takase et al. | | 2005/0002509 A1 | 1/2005 | Elsey et al. |
| 2003/0236981 A1 | 12/2003 | Marmigere et al. | | 2005/0002510 A1 | 1/2005 | Elsey et al. |
| 2004/0002324 A1 | 1/2004 | Juntunen et al. | | 2005/0010694 A1 | 1/2005 | Ma et al. |
| 2004/0006630 A1 | 1/2004 | Friend et al. | | 2005/0015432 A1 | 1/2005 | Cohen |
| 2004/0010590 A1 | 1/2004 | Manzano | | 2005/0021750 A1 | 1/2005 | Abrams |
| 2004/0015504 A1 | 1/2004 | Ahad et al. | | 2005/0022000 A1 | 1/2005 | Inomata et al. |
| 2004/0024795 A1 | 2/2004 | Hind et al. | | 2005/0022182 A1 | 1/2005 | Mittal |
| 2004/0024892 A1* | 2/2004 | Creswell et al. ............ 709/230 | | 2005/0027591 A9 | 2/2005 | Gailey et al. |
| 2004/0027326 A1 | 2/2004 | Hays et al. | | 2005/0027716 A1 | 2/2005 | Apfel |
| 2004/0027375 A1 | 2/2004 | Ellis et al. | | 2005/0027869 A1 | 2/2005 | Johnson |
| 2004/0027378 A1 | 2/2004 | Hays et al. | | 2005/0033657 A1 | 2/2005 | Herrington et al. |
| 2004/0043770 A1 | 3/2004 | Amit et al. | | 2005/0033812 A1 | 2/2005 | McCarthy et al. |

| | | | | | | |
|---|---|---|---|---|---|---|
| 2005/0033926 A1 | 2/2005 | Dumont | | 2006/0031365 A1 | 2/2006 | Kay et al. |
| 2005/0037741 A1 | 2/2005 | Gilbert | | 2006/0031428 A1 | 2/2006 | Wikman |
| 2005/0038707 A1 | 2/2005 | Roever et al. | | 2006/0031785 A1 | 2/2006 | Raciborski |
| 2005/0038724 A1 | 2/2005 | Roever et al. | | 2006/0037071 A1 | 2/2006 | Rao et al. |
| 2005/0038863 A1 | 2/2005 | Onyon et al. | | 2006/0046686 A1 | 3/2006 | Hawkins et al. |
| 2005/0041793 A1 | 2/2005 | Fulton | | 2006/0047844 A1 | 3/2006 | Deng |
| 2005/0044144 A1 | 2/2005 | Malik et al. | | 2006/0048061 A1 | 3/2006 | Forlenza et al. |
| 2005/0055578 A1 | 3/2005 | Wright et al. | | 2006/0052091 A1 | 3/2006 | Onyon |
| 2005/0063544 A1 | 3/2005 | Uusitalo et al. | | 2006/0052137 A1 | 3/2006 | Randall et al. |
| 2005/0071489 A1 | 3/2005 | Parupudi et al. | | 2006/0059495 A1* | 3/2006 | Spector ................. 719/310 |
| 2005/0071674 A1 | 3/2005 | Chou et al. | | 2006/0063544 A1 | 3/2006 | Zhao et al. |
| 2005/0073982 A1 | 4/2005 | Corneille et al. | | 2006/0069686 A1* | 3/2006 | Beyda et al. ................ 707/10 |
| 2005/0076136 A1 | 4/2005 | Cho et al. | | 2006/0069687 A1 | 3/2006 | Cui et al. |
| 2005/0076241 A1 | 4/2005 | Appelman | | 2006/0069715 A1 | 3/2006 | Vayssiere |
| 2005/0086540 A1 | 4/2005 | Gunter et al. | | 2006/0069742 A1 | 3/2006 | Segre |
| 2005/0094625 A1 | 5/2005 | Bouat | | 2006/0069746 A1 | 3/2006 | Davis et al. |
| 2005/0097225 A1 | 5/2005 | Glatt et al. | | 2006/0073810 A1 | 4/2006 | Pyhalammi et al. |
| 2005/0097570 A1 | 5/2005 | Bomers | | 2006/0074951 A1 | 4/2006 | Beier et al. |
| 2005/0101307 A1 | 5/2005 | Brugge et al. | | 2006/0075028 A1 | 4/2006 | Zager et al. |
| 2005/0102257 A1 | 5/2005 | Onyon | | 2006/0084410 A1 | 4/2006 | Sutaria et al. |
| 2005/0102328 A1 | 5/2005 | Ring | | 2006/0085503 A1 | 4/2006 | Stoye et al. |
| 2005/0102351 A1 | 5/2005 | Jiang et al. | | 2006/0093026 A1 | 5/2006 | Montojo et al. |
| 2005/0108427 A1 | 5/2005 | van Datta | | 2006/0093135 A1 | 5/2006 | Fiatal et al. |
| 2005/0117606 A1 | 6/2005 | Kim | | 2006/0099969 A1 | 5/2006 | Staton et al. |
| 2005/0120082 A1 | 6/2005 | Hesselink et al. | | 2006/0099970 A1 | 5/2006 | Morgan et al. |
| 2005/0120084 A1 | 6/2005 | Hu et al. | | 2006/0112177 A1 | 5/2006 | Barkley et al. |
| 2005/0120181 A1 | 6/2005 | Arunagirinathan et al. | | 2006/0123042 A1 | 6/2006 | Xie et al. |
| 2005/0122333 A1 | 6/2005 | Sumanaweera et al. | | 2006/0132495 A1 | 6/2006 | Anderson |
| 2005/0124332 A1 | 6/2005 | Clark et al. | | 2006/0141962 A1 | 6/2006 | Forbes et al. |
| 2005/0125459 A1 | 6/2005 | Sutinen et al. | | 2006/0143464 A1 | 6/2006 | Ananthanarayanan et al. |
| 2005/0138111 A1 | 6/2005 | Aton et al. | | 2006/0149591 A1 | 7/2006 | Hanf et al. |
| 2005/0138176 A1 | 6/2005 | Singh et al. | | 2006/0149843 A1 | 7/2006 | Rhoads et al. |
| 2005/0144219 A1 | 6/2005 | Terada | | 2006/0149970 A1 | 7/2006 | Imazu |
| 2005/0147130 A1 | 7/2005 | Hurwitz et al. | | 2006/0155822 A1 | 7/2006 | Yang et al. |
| 2005/0154698 A1 | 7/2005 | Ikezawa et al. | | 2006/0161621 A1 | 7/2006 | Rosenberg |
| 2005/0154798 A1 | 7/2005 | Nurmi | | 2006/0165226 A1 | 7/2006 | Ernst et al. |
| 2005/0154836 A1 | 7/2005 | Steely et al. | | 2006/0166663 A1 | 7/2006 | Haehnichen et al. |
| 2005/0155027 A1 | 7/2005 | Wei | | 2006/0167969 A1 | 7/2006 | Andreev et al. |
| 2005/0164703 A1 | 7/2005 | Huynh | | 2006/0168043 A1 | 7/2006 | Eisenberger et al. |
| 2005/0164721 A1 | 7/2005 | Eric Yeh et al. | | 2006/0168164 A1 | 7/2006 | Lemson et al. |
| 2005/0165909 A1 | 7/2005 | Cromer et al. | | 2006/0179410 A1 | 8/2006 | Deeds |
| 2005/0170776 A1 | 8/2005 | Siorpaes | | 2006/0188864 A1 | 8/2006 | Shah |
| 2005/0183143 A1 | 8/2005 | Anderholm et al. | | 2006/0190428 A1 | 8/2006 | Jung et al. |
| 2005/0188038 A1 | 8/2005 | Yabe | | 2006/0190569 A1 | 8/2006 | Neil et al. |
| 2005/0193036 A1 | 9/2005 | Phillips et al. | | 2006/0190984 A1 | 8/2006 | Heard et al. |
| 2005/0193096 A1 | 9/2005 | Yu et al. | | 2006/0192014 A1 | 8/2006 | Hamilton et al. |
| 2005/0198170 A1 | 9/2005 | LaMay et al. | | 2006/0195570 A1 | 8/2006 | Zellner et al. |
| 2005/0203966 A1 | 9/2005 | Labrou et al. | | 2006/0209842 A1 | 9/2006 | Creamer et al. |
| 2005/0210104 A1 | 9/2005 | Torvinen | | 2006/0212531 A1 | 9/2006 | Kikkawa et al. |
| 2005/0210125 A1 | 9/2005 | Li | | 2006/0224629 A1 | 10/2006 | Alexander et al. |
| 2005/0222891 A1 | 10/2005 | Chan et al. | | 2006/0230394 A1 | 10/2006 | Forth et al. |
| 2005/0228812 A1* | 10/2005 | Hansmann et al. ............ 707/102 | | 2006/0240804 A1 | 10/2006 | Backholm et al. |
| 2005/0232295 A1 | 10/2005 | Young | | 2006/0240805 A1 | 10/2006 | Backholm et al. |
| 2005/0234860 A1 | 10/2005 | Roever et al. | | 2006/0242137 A1 | 10/2006 | Shah et al. |
| 2005/0235214 A1 | 10/2005 | Shimizu et al. | | 2006/0242210 A1 | 10/2006 | Ring |
| 2005/0246139 A1 | 11/2005 | Rivenbark et al. | | 2006/0242320 A1 | 10/2006 | Nettle et al. |
| 2005/0248526 A1 | 11/2005 | Twerdahl et al. | | 2006/0242607 A1 | 10/2006 | Hudson |
| 2005/0251555 A1 | 11/2005 | Little | | 2006/0252435 A1 | 11/2006 | Henderson et al. |
| 2005/0254443 A1 | 11/2005 | Campbell et al. | | 2006/0253456 A1 | 11/2006 | Pacholec et al. |
| 2005/0256880 A1 | 11/2005 | Nam Koong et al. | | 2006/0253605 A1 | 11/2006 | Sundarrajan et al. |
| 2005/0262220 A1 | 11/2005 | Ecklund et al. | | 2006/0259923 A1 | 11/2006 | Chiu |
| 2005/0273804 A1 | 12/2005 | Preisman | | 2006/0265595 A1 | 11/2006 | Scottodiluzio |
| 2005/0278307 A1 | 12/2005 | Battagin et al. | | 2006/0271884 A1 | 11/2006 | Hurst |
| 2005/0278641 A1 | 12/2005 | Mansour et al. | | 2006/0277265 A1 | 12/2006 | Backholm et al. |
| 2005/0278647 A1 | 12/2005 | Leavitt et al. | | 2006/0277271 A1 | 12/2006 | Morse et al. |
| 2005/0288006 A1 | 12/2005 | Apfel | | 2006/0294071 A1* | 12/2006 | Weare et al. ..................... 707/3 |
| 2006/0012672 A1 | 1/2006 | Schrader et al. | | 2006/0294223 A1 | 12/2006 | Glasgow et al. |
| 2006/0020525 A1 | 1/2006 | Borelli et al. | | 2006/0294388 A1 | 12/2006 | Abraham et al. |
| 2006/0020580 A1 | 1/2006 | Dettinger et al. | | 2007/0005738 A1 | 1/2007 | Alexion-Tiernan et al. |
| 2006/0020804 A1 | 1/2006 | Schleifer | | 2007/0006317 A1 | 1/2007 | Asami et al. |
| 2006/0020947 A1 | 1/2006 | Hallamaa et al. | | 2007/0011367 A1 | 1/2007 | Scott et al. |
| 2006/0021023 A1 | 1/2006 | Stewart et al. | | 2007/0019610 A1 | 1/2007 | Backholm et al. |
| 2006/0022048 A1 | 2/2006 | Johnson | | 2007/0021065 A1 | 1/2007 | Sengupta et al. |
| 2006/0026580 A1 | 2/2006 | Cabillic et al. | | 2007/0022118 A1 | 1/2007 | Layne |
| 2006/0029062 A1 | 2/2006 | Rao et al. | | 2007/0027775 A1 | 2/2007 | Hwang |
| 2006/0029063 A1 | 2/2006 | Rao et al. | | 2007/0027832 A1 | 2/2007 | Fiatal et al. |
| 2006/0029064 A1 | 2/2006 | Rao et al. | | 2007/0027886 A1 | 2/2007 | Gent |
| 2006/0031114 A1* | 2/2006 | Zommers ..................... 705/10 | | 2007/0027917 A1 | 2/2007 | Ariel |
| 2006/0031300 A1 | 2/2006 | Kock et al. | | 2007/0027920 A1 | 2/2007 | Alvarado |

| | | | | | | |
|---|---|---|---|---|---|---|
| 2007/0027921 A1 | 2/2007 | Alvarado | | 2008/0103877 A1 | 5/2008 | Gerken |
| 2007/0027930 A1 | 2/2007 | Alvarado | | 2008/0104666 A1 | 5/2008 | Dillaway |
| 2007/0033531 A1 | 2/2007 | Marsh | | 2008/0108298 A1 | 5/2008 | Selen et al. |
| 2007/0038567 A1 | 2/2007 | Allaire et al. | | 2008/0114881 A1 | 5/2008 | Lee et al. |
| 2007/0038931 A1 | 2/2007 | Allaire et al. | | 2008/0117922 A1 | 5/2008 | Cockrell et al. |
| 2007/0044041 A1 | 2/2007 | Beynon et al. | | 2008/0125225 A1 | 5/2008 | Lazaridis |
| 2007/0049258 A1 | 3/2007 | Thibeault | | 2008/0130663 A1 | 6/2008 | Fridman et al. |
| 2007/0060196 A1 | 3/2007 | Sharma | | 2008/0133326 A1 | 6/2008 | Goncalves et al. |
| 2007/0061393 A1 | 3/2007 | Moore | | 2008/0133641 A1 | 6/2008 | Gent |
| 2007/0067147 A1 | 3/2007 | Huang | | 2008/0133708 A1 | 6/2008 | Alvarado et al. |
| 2007/0067381 A1 | 3/2007 | Grant et al. | | 2008/0134292 A1 | 6/2008 | Ariel |
| 2007/0067424 A1 | 3/2007 | Raciborski et al. | | 2008/0140665 A1 | 6/2008 | Ariel |
| 2007/0070931 A1 | 3/2007 | Lewis et al. | | 2008/0140794 A1 | 6/2008 | Rybak |
| 2007/0072617 A1 | 3/2007 | Lewis et al. | | 2008/0148146 A1 | 6/2008 | Estrada et al. |
| 2007/0077949 A1 | 4/2007 | Henderson et al. | | 2008/0150704 A1 | 6/2008 | Igoe |
| 2007/0078857 A1 | 4/2007 | Punaganti | | 2008/0151817 A1 | 6/2008 | Fitchett et al. |
| 2007/0078964 A1 | 4/2007 | East et al. | | 2008/0154870 A1 | 6/2008 | Evermann et al. |
| 2007/0088852 A1 | 4/2007 | Levkovitz | | 2008/0155613 A1 | 6/2008 | Benya et al. |
| 2007/0105627 A1 | 5/2007 | Campbell | | 2008/0166999 A1 | 7/2008 | Guedalia et al. |
| 2007/0111764 A1 | 5/2007 | Park | | 2008/0167019 A1 | 7/2008 | Guedalia et al. |
| 2007/0116223 A1 | 5/2007 | Burke et al. | | 2008/0168145 A1 | 7/2008 | Wilson |
| 2007/0118620 A1 | 5/2007 | Cartmell et al. | | 2008/0178294 A1 | 7/2008 | Hu et al. |
| 2007/0123214 A1 | 5/2007 | Mock | | 2008/0180228 A1 | 7/2008 | Wakefield et al. |
| 2007/0130108 A1 | 6/2007 | Simpson, Jr. | | 2008/0183800 A1 | 7/2008 | Herzog et al. |
| 2007/0130217 A1 | 6/2007 | Linyard | | 2008/0192820 A1 | 8/2008 | Brooks et al. |
| 2007/0140193 A1 | 6/2007 | Dosa et al. | | 2008/0195819 A1 | 8/2008 | Dumont |
| 2007/0147317 A1 | 6/2007 | Smith et al. | | 2008/0198995 A1 | 8/2008 | McGary et al. |
| 2007/0147411 A1 | 6/2007 | Bijwaard et al. | | 2008/0201362 A1 | 8/2008 | Multer et al. |
| 2007/0150881 A1 | 6/2007 | Khawand et al. | | 2008/0201751 A1 | 8/2008 | Ahmed et al. |
| 2007/0156824 A1 | 7/2007 | Thompson | | 2008/0207182 A1 | 8/2008 | Maharajh et al. |
| 2007/0156842 A1 | 7/2007 | Vermeulen et al. | | 2008/0209491 A1 | 8/2008 | Hasek |
| 2007/0162514 A1 | 7/2007 | Civetta et al. | | 2008/0214148 A1 | 9/2008 | Ramer et al. |
| 2007/0167178 A1 | 7/2007 | Al-Harbi | | 2008/0216094 A1 | 9/2008 | Anderson et al. |
| 2007/0174433 A1 | 7/2007 | Mendez | | 2008/0220797 A1 | 9/2008 | Meiby et al. |
| 2007/0175998 A1 | 8/2007 | Lev | | 2008/0221715 A1 | 9/2008 | Krzyzanowski et al. |
| 2007/0198698 A1 | 8/2007 | Boyd et al. | | 2008/0232290 A1 | 9/2008 | Elzur et al. |
| 2007/0220080 A1 | 9/2007 | Humphrey | | 2008/0233983 A1 | 9/2008 | Park et al. |
| 2007/0220099 A1 | 9/2007 | Di Giorgio et al. | | 2008/0242370 A1 | 10/2008 | Lando et al. |
| 2007/0233855 A1 | 10/2007 | Brown et al. | | 2008/0256090 A1 | 10/2008 | Dietterich et al. |
| 2007/0237318 A1 | 10/2007 | McGary | | 2008/0263170 A1 | 10/2008 | Caron et al. |
| 2007/0240218 A1 | 10/2007 | Tuvell et al. | | 2008/0270379 A1 | 10/2008 | Ramakrishna |
| 2007/0245010 A1 | 10/2007 | Arn et al. | | 2008/0271123 A1 | 10/2008 | Ollis et al. |
| 2007/0249365 A1 | 10/2007 | Jendbro | | 2008/0273498 A1 | 11/2008 | Jalil et al. |
| 2007/0250591 A1 | 10/2007 | Milic-Frayling | | 2008/0281798 A1 | 11/2008 | Chatterjee et al. |
| 2007/0254631 A1 | 11/2007 | Spooner | | 2008/0288659 A1 | 11/2008 | Hasha et al. |
| 2007/0255848 A1 | 11/2007 | Sewall et al. | | 2008/0298386 A1 | 12/2008 | Fiatal |
| 2007/0264993 A1 | 11/2007 | Hughes | | 2008/0299956 A1 | 12/2008 | Bailey et al. |
| 2007/0267492 A1 | 11/2007 | Maclaine Pont | | 2008/0301231 A1 | 12/2008 | Mehta et al. |
| 2007/0276925 A1 | 11/2007 | La Joie et al. | | 2008/0301300 A1 | 12/2008 | Toub |
| 2007/0276926 A1 | 11/2007 | LaJoie et al. | | 2008/0313282 A1 | 12/2008 | Warila et al. |
| 2007/0288469 A1 | 12/2007 | Shenfield | | 2009/0006116 A1 | 1/2009 | Baker et al. |
| 2007/0290787 A1 | 12/2007 | Fiatal et al. | | 2009/0010204 A1 | 1/2009 | Pratt, Jr. et al. |
| 2007/0293207 A1 | 12/2007 | Guedalia et al. | | 2009/0010259 A1 | 1/2009 | Sirotkin |
| 2007/0293238 A1 | 12/2007 | Fiatal et al. | | 2009/0012841 A1 | 1/2009 | Saft et al. |
| 2007/0293958 A1 | 12/2007 | Stehle et al. | | 2009/0016526 A1 | 1/2009 | Fiatal et al. |
| 2007/0294295 A1 | 12/2007 | Finkelstein et al. | | 2009/0019141 A1 | 1/2009 | Bush et al. |
| 2007/0294373 A1 | 12/2007 | Harrison | | 2009/0019485 A1 | 1/2009 | Ellis et al. |
| 2007/0294763 A1 | 12/2007 | Udezue et al. | | 2009/0019532 A1 | 1/2009 | Jacobsen et al. |
| 2007/0296701 A1 | 12/2007 | Pope et al. | | 2009/0024794 A1 | 1/2009 | Iyer et al. |
| 2007/0299918 A1 | 12/2007 | Roberts | | 2009/0027222 A1 | 1/2009 | Larsson et al. |
| 2008/0001717 A1 | 1/2008 | Fiatal | | 2009/0031006 A1 | 1/2009 | Johnson |
| 2008/0008095 A1 | 1/2008 | Gilfix | | 2009/0049482 A1 | 2/2009 | Auerbach et al. |
| 2008/0009344 A1 | 1/2008 | Graham et al. | | 2009/0052372 A1 | 2/2009 | Durazzo et al. |
| 2008/0016236 A1 | 1/2008 | Beverly et al. | | 2009/0054034 A1 | 2/2009 | Backholm et al. |
| 2008/0032718 A1 | 2/2008 | Suresh | | 2009/0055353 A1 | 2/2009 | Meema |
| 2008/0034031 A1 | 2/2008 | Weisbrot et al. | | 2009/0059950 A1 | 3/2009 | Gao et al. |
| 2008/0037787 A1 | 2/2008 | Boynton et al. | | 2009/0063647 A1 | 3/2009 | Backholm et al. |
| 2008/0059308 A1 | 3/2008 | Gerken | | 2009/0070526 A1 | 3/2009 | Tetrick et al. |
| 2008/0059398 A1 | 3/2008 | Tsutsui | | 2009/0075683 A1 | 3/2009 | Backholm et al. |
| 2008/0061142 A1 | 3/2008 | Howcroft et al. | | 2009/0077263 A1 | 3/2009 | Koganti et al. |
| 2008/0068519 A1 | 3/2008 | Adler et al. | | 2009/0077326 A1 | 3/2009 | Motohashi |
| 2008/0072324 A1 | 3/2008 | Repasi et al. | | 2009/0081944 A1 | 3/2009 | Yavuz et al. |
| 2008/0077506 A1 | 3/2008 | Rampell et al. | | 2009/0094317 A1 | 4/2009 | Venkitaraman |
| 2008/0077571 A1 | 3/2008 | Harris et al. | | 2009/0100416 A1 | 4/2009 | Brown et al. |
| 2008/0085719 A1 | 4/2008 | Kuchibhotla et al. | | 2009/0110179 A1 | 4/2009 | Elsey et al. |
| 2008/0085724 A1 | 4/2008 | Cormier et al. | | 2009/0119266 A1 | 5/2009 | Fitzpatrick |
| 2008/0086379 A1 | 4/2008 | Dion et al. | | 2009/0125523 A1 | 5/2009 | Fitzpatrick |
| 2008/0091773 A1 | 4/2008 | Hameen-Anttila | | 2009/0144632 A1 | 6/2009 | Mendez |
| 2008/0098120 A1 | 4/2008 | Johnson et al. | | 2009/0147008 A1 | 6/2009 | Do et al. |

| | | |
|---|---|---|
| 2009/0149203 A1 | 6/2009 | Backholm et al. |
| 2009/0156178 A1 | 6/2009 | Elsey et al. |
| 2009/0157792 A1 | 6/2009 | Fiatal |
| 2009/0164433 A1 | 6/2009 | R. et al. |
| 2009/0164560 A1 | 6/2009 | Fiatal |
| 2009/0165115 A1 | 6/2009 | Toumura et al. |
| 2009/0172565 A1 | 7/2009 | Jackson et al. |
| 2009/0181641 A1 | 7/2009 | Fiatal |
| 2009/0182500 A1 | 7/2009 | Dicke |
| 2009/0187939 A1 | 7/2009 | Lajoie |
| 2009/0191903 A1 | 7/2009 | Fiatal |
| 2009/0193130 A1 | 7/2009 | Fiatal |
| 2009/0193338 A1 | 7/2009 | Fiatal |
| 2009/0215504 A1 | 8/2009 | Lando |
| 2009/0221326 A1 | 9/2009 | Roussel et al. |
| 2009/0228545 A1 | 9/2009 | Mendez et al. |
| 2009/0241180 A1 | 9/2009 | Fiatal |
| 2009/0248670 A1 | 10/2009 | Fiatal |
| 2009/0248696 A1 | 10/2009 | Rowles et al. |
| 2009/0248794 A1 | 10/2009 | Helms et al. |
| 2009/0248878 A1 | 10/2009 | Tran et al. |
| 2009/0249482 A1 | 10/2009 | Sarathy |
| 2009/0252136 A1 | 10/2009 | Mahany et al. |
| 2009/0254589 A1 | 10/2009 | Nair et al. |
| 2009/0254971 A1 | 10/2009 | Herz et al. |
| 2009/0264138 A1 | 10/2009 | Kang et al. |
| 2009/0282125 A1 | 11/2009 | Jeide et al. |
| 2009/0282130 A1 | 11/2009 | Antoniou et al. |
| 2009/0286531 A1 | 11/2009 | Bhatt et al. |
| 2009/0287750 A1 | 11/2009 | Banavar et al. |
| 2009/0299817 A1 | 12/2009 | Fok et al. |
| 2009/0307133 A1 | 12/2009 | Holloway et al. |
| 2009/0318171 A1 | 12/2009 | Backholm et al. |
| 2009/0323678 A1 | 12/2009 | Wang |
| 2009/0325565 A1 | 12/2009 | Backholm |
| 2009/0327390 A1 | 12/2009 | Tran et al. |
| 2010/0042691 A1 | 2/2010 | Maguire |
| 2010/0049872 A1 | 2/2010 | Roskind |
| 2010/0057924 A1 | 3/2010 | Rauber et al. |
| 2010/0069127 A1 | 3/2010 | Fiennes |
| 2010/0077035 A1 | 3/2010 | Li et al. |
| 2010/0077083 A1 | 3/2010 | Tran et al. |
| 2010/0083255 A1 | 4/2010 | Bane et al. |
| 2010/0087167 A1 | 4/2010 | Tsurutome et al. |
| 2010/0088722 A1 | 4/2010 | Jiang |
| 2010/0093273 A1 | 4/2010 | Hohl |
| 2010/0115050 A1 | 5/2010 | Sultenfuss et al. |
| 2010/0118190 A1 | 5/2010 | Salfati et al. |
| 2010/0131593 A1 | 5/2010 | Kihara et al. |
| 2010/0131617 A1 | 5/2010 | Osborne et al. |
| 2010/0146107 A1 | 6/2010 | Fiatal |
| 2010/0149975 A1 | 6/2010 | Tripathi et al. |
| 2010/0174735 A1 | 7/2010 | Fiatal |
| 2010/0174939 A1 | 7/2010 | Vexler |
| 2010/0186011 A1 | 7/2010 | Magenheimer |
| 2010/0192212 A1 | 7/2010 | Raleigh |
| 2010/0203876 A1 | 8/2010 | Krishnaswamy |
| 2010/0207870 A1 | 8/2010 | Cho |
| 2010/0211651 A1 | 8/2010 | Guedalia et al. |
| 2010/0212010 A1 | 8/2010 | Stringer et al. |
| 2010/0214984 A1 | 8/2010 | Cho et al. |
| 2010/0227594 A1 | 9/2010 | DeVries |
| 2010/0228863 A1 | 9/2010 | Kawauchi |
| 2010/0229096 A1 | 9/2010 | Maiocco et al. |
| 2010/0238915 A1 | 9/2010 | Cayla et al. |
| 2010/0250706 A1 | 9/2010 | Burckart et al. |
| 2010/0250986 A1 | 9/2010 | Black et al. |
| 2010/0251366 A1 | 9/2010 | Baldry |
| 2010/0268757 A1 | 10/2010 | Fisher |
| 2010/0274983 A1 | 10/2010 | Murphy et al. |
| 2010/0279662 A1 | 11/2010 | Kuusinen et al. |
| 2010/0293335 A1 | 11/2010 | Muthiah et al. |
| 2010/0299223 A1 | 11/2010 | Crouch |
| 2010/0313018 A1 | 12/2010 | Jorgensen |
| 2010/0315535 A1 | 12/2010 | Nurit et al. |
| 2010/0319054 A1 | 12/2010 | Mehta et al. |
| 2010/0322124 A1 | 12/2010 | Luoma et al. |
| 2010/0323664 A1 | 12/2010 | Sivaram et al. |
| 2010/0325306 A1 | 12/2010 | Vimpari et al. |
| 2011/0028129 A1 | 2/2011 | Hutchison et al. |
| 2011/0035799 A1 | 2/2011 | Handler |
| 2011/0040718 A1 | 2/2011 | Tendjoukian et al. |
| 2011/0065419 A1 | 3/2011 | Book et al. |
| 2011/0065424 A1 | 3/2011 | Estevez et al. |
| 2011/0066646 A1 | 3/2011 | Danado et al. |
| 2011/0099363 A1 | 4/2011 | Boynton et al. |
| 2011/0113109 A1 | 5/2011 | LeVasseur et al. |
| 2011/0119134 A1 | 5/2011 | Zivkovic et al. |
| 2011/0126060 A1 | 5/2011 | Grube et al. |
| 2011/0138102 A1 | 6/2011 | Glikson et al. |
| 2011/0138402 A1 | 6/2011 | Fleming |
| 2011/0153816 A1 | 6/2011 | Lloyd et al. |
| 2011/0153937 A1 | 6/2011 | Annamalaisami et al. |
| 2011/0158239 A1 | 6/2011 | Mohaban |
| 2011/0165889 A1 | 7/2011 | Fiatal et al. |
| 2011/0177847 A1 | 7/2011 | Huang |
| 2011/0179138 A1 | 7/2011 | Van Geest et al. |
| 2011/0179377 A1 | 7/2011 | Fleming |
| 2011/0182220 A1 | 7/2011 | Black et al. |
| 2011/0184827 A1 | 7/2011 | Hubert |
| 2011/0185355 A1 | 7/2011 | Chawla et al. |
| 2011/0189997 A1 | 8/2011 | Tiwari et al. |
| 2011/0190014 A1 | 8/2011 | Fiatal |
| 2011/0191474 A1 | 8/2011 | Fiatal |
| 2011/0201304 A1 | 8/2011 | Sutaria et al. |
| 2011/0207436 A1 | 8/2011 | van Gent et al. |
| 2011/0208810 A1 | 8/2011 | Li et al. |
| 2011/0213800 A1 | 9/2011 | Saros et al. |
| 2011/0213898 A1 | 9/2011 | Fiatal et al. |
| 2011/0214182 A1 | 9/2011 | Adams et al. |
| 2011/0238772 A1 | 9/2011 | Fiatal |
| 2011/0246950 A1 | 10/2011 | Luna et al. |
| 2011/0252088 A1 | 10/2011 | Fiatal |
| 2011/0264622 A1 | 10/2011 | Vargas et al. |
| 2011/0264731 A1 | 10/2011 | Knowles et al. |
| 2011/0294463 A1 | 12/2011 | Fiatal |
| 2011/0294464 A1 | 12/2011 | Fiatal |
| 2011/0296050 A1 | 12/2011 | Cherukuri |
| 2011/0296120 A1 | 12/2011 | Khan |
| 2011/0296415 A1 | 12/2011 | Khan et al. |
| 2011/0302154 A1 | 12/2011 | Snyder |
| 2012/0005276 A1 | 1/2012 | Guo et al. |
| 2012/0008536 A1 | 1/2012 | Tervahauta et al. |
| 2012/0022980 A1 | 1/2012 | Angelone |
| 2012/0023190 A1 | 1/2012 | Backholm et al. |
| 2012/0023226 A1 | 1/2012 | Petersen et al. |
| 2012/0023236 A1 | 1/2012 | Backholm et al. |
| 2012/0030280 A1 | 2/2012 | Wang et al. |
| 2012/0030750 A1 | 2/2012 | Bhargava et al. |
| 2012/0054386 A1 | 3/2012 | Hanes |
| 2012/0072910 A1 | 3/2012 | Martin et al. |
| 2012/0077482 A1 | 3/2012 | Backholm |
| 2012/0078725 A1 | 3/2012 | Maitra et al. |
| 2012/0078996 A1 | 3/2012 | Shah |
| 2012/0096092 A1 | 4/2012 | Davidge et al. |
| 2012/0108225 A1 | 5/2012 | Luna et al. |
| 2012/0110109 A1 | 5/2012 | Luna et al. |
| 2012/0110110 A1 | 5/2012 | Luna et al. |
| 2012/0110111 A1 | 5/2012 | Luna et al. |
| 2012/0110112 A1 | 5/2012 | Luna et al. |
| 2012/0110118 A1 | 5/2012 | Luna et al. |
| 2012/0110171 A1 | 5/2012 | Luna et al. |
| 2012/0110173 A1 | 5/2012 | Luna et al. |
| 2012/0110174 A1 | 5/2012 | Wootton et al. |
| 2012/0110275 A1 | 5/2012 | Ganti et al. |
| 2012/0130973 A1 | 5/2012 | Tamm et al. |
| 2012/0131095 A1 | 5/2012 | Luna et al. |
| 2012/0131184 A1 | 5/2012 | Luna et al. |
| 2012/0135726 A1 | 5/2012 | Luna et al. |
| 2012/0140750 A1 | 6/2012 | Yan et al. |
| 2012/0149352 A1 | 6/2012 | Backholm et al. |
| 2012/0151044 A1 | 6/2012 | Luna et al. |
| 2012/0157170 A1 | 6/2012 | Backholm et al. |
| 2012/0158837 A1 | 6/2012 | Kaul |
| 2012/0158908 A1 | 6/2012 | Luna et al. |
| 2012/0170496 A1 | 7/2012 | Yang et al. |
| 2012/0170569 A1 | 7/2012 | Al-Khudairi |
| 2012/0173616 A1 | 7/2012 | Luna et al. |

| | | | |
|---|---|---|---|
| 2012/0174220 A1 | 7/2012 | Rodriguez | |
| 2012/0176968 A1 | 7/2012 | Luna | |
| 2012/0178414 A1 | 7/2012 | Fiatal | |
| 2012/0179801 A1 | 7/2012 | Luna et al. | |
| 2012/0185597 A1 | 7/2012 | Luna | |
| 2012/0185918 A1 | 7/2012 | Backholm et al. | |
| 2012/0210121 A1 | 8/2012 | Boynton et al. | |
| 2012/0226767 A1 | 9/2012 | Luna et al. | |
| 2012/0227059 A1 | 9/2012 | Fleming | |
| 2012/0246333 A1 | 9/2012 | Fiatal | |
| 2012/0254417 A1 | 10/2012 | Luna | |
| 2012/0271903 A1 | 10/2012 | Luna | |
| 2012/0271908 A1 | 10/2012 | Luna et al. | |
| 2012/0278431 A1 | 11/2012 | Luna | |
| 2012/0278432 A1 | 11/2012 | Luna | |
| 2012/0278886 A1 | 11/2012 | Luna | |
| 2012/0284356 A1 | 11/2012 | Luna | |
| 2012/0289239 A1 | 11/2012 | Luna et al. | |
| 2012/0290675 A1 | 11/2012 | Luna et al. | |
| 2012/0290717 A1 | 11/2012 | Luna | |
| 2012/0317370 A1 | 12/2012 | Luna | |

FOREIGN PATENT DOCUMENTS

| | | | |
|---|---|---|---|
| EP | 1278390 A1 | 1/2003 | |
| EP | 1422899 A1 | 5/2004 | |
| EP | 1466261 A1 | 10/2004 | |
| EP | 1466435 A1 | 10/2004 | |
| EP | 1482702 A1 | 12/2004 | |
| EP | 1815634 A1 | 8/2007 | |
| EP | 1815652 A1 | 8/2007 | |
| EP | 1817883 A1 | 8/2007 | |
| FI | 17152 B1 | 6/2006 | |
| FI | 118288 B1 | 9/2007 | |
| FI | 119581 B1 | 12/2008 | |
| JP | 4154233 A | 5/1992 | |
| JP | 10-336372 A | 12/1998 | |
| JP | 2001-218185 A | 8/2001 | |
| JP | 2001-350718 A | 12/2001 | |
| JP | 2001-356973 A | 12/2001 | |
| JP | 2005-515664 A | 5/2005 | |
| JP | 2009-207177 A | 9/2009 | |
| JP | 4386732 | 12/2009 | |
| KR | 2001-0018568 A | 3/2001 | |
| KR | 2006-0068186 A | 6/2006 | |
| KR | 2007-0071858 A1 | 7/2007 | |
| KR | 10-0765238 B1 | 10/2007 | |
| KR | 2007-0102091 A1 | 10/2007 | |
| KR | 2007-0117874 A | 12/2007 | |
| KR | 2009-0077515 A | 7/2009 | |
| KR | 2010-0064605 A | 6/2010 | |
| WO | WO-97/41661 A2 | 11/1997 | |
| WO | WO-98/24257 A1 | 6/1998 | |
| WO | WO-98/58322 A2 | 12/1998 | |
| WO | WO-01/30130 A2 | 5/2001 | |
| WO | WO-03/007570 A1 | 1/2003 | |
| WO | WO-03/058483 A1 | 7/2003 | |
| WO | WO-03/058879 A1 | 7/2003 | |
| WO | WO-03/065701 A1 | 8/2003 | |
| WO | WO-03/098890 A1 | 11/2003 | |
| WO | WO 2004/017591 A2 | 2/2004 | |
| WO | WO-2004045171 A1 | 5/2004 | |
| WO | WO-2005/015925 A2 | 2/2005 | |
| WO | WO-2005/020108 A1 | 3/2005 | |
| WO | WO-2006/045005 A2 | 4/2006 | |
| WO | WO-2006/045102 A2 | 4/2006 | |
| WO | WO-2006/053952 A1 | 5/2006 | |
| WO | WO-2006/053954 A1 | 5/2006 | |
| WO | WO-2006/058967 A1 | 6/2006 | |
| WO | WO-2007/015725 A2 | 2/2007 | |
| WO | WO-2007/015726 A1 | 2/2007 | |
| WO | WO 2007/127878 A1 | 11/2007 | |
| WO | WO-2007/149526 A2 | 12/2007 | |
| WO | WO-2007/149540 A2 | 12/2007 | |
| WO | WO 2008061042 A2 | 5/2008 | |
| WO | WO 2010/068842 A1 | 6/2010 | |
| WO | WO-2011126889 A2 | 10/2011 | |
| WO | WO 2012/018430 A1 | 2/2012 | |
| WO | WO 2012/018431 A1 | 2/2012 | |
| WO | WO 2012/018477 A2 | 2/2012 | |
| WO | WO 2012/018479 A2 | 2/2012 | |
| WO | WO 2012/018556 A2 | 2/2012 | |
| WO | WO 2012/024030 A2 | 2/2012 | |
| WO | WO 2012/060995 A2 | 5/2012 | |
| WO | WO 2012/060996 A2 | 5/2012 | |
| WO | WO 2012/060997 A2 | 5/2012 | |
| WO | WO 2012/061430 A2 | 5/2012 | |
| WO | WO 2012/061433 A2 | 5/2012 | |
| WO | WO 2012/061437 A1 | 5/2012 | |
| WO | WO 2012/071283 A1 | 5/2012 | |
| WO | WO 2012/071384 A2 | 5/2012 | |
| WO | WO 2012/094675 A2 | 7/2012 | |
| WO | WO 2012/145533 A2 | 10/2012 | |
| WO | WO 2012/145541 A2 | 10/2012 | |
| WO | WO 2012/149216 A2 | 11/2012 | |
| WO | WO 2012/149434 A2 | 11/2012 | |
| WO | WO 2012/161751 A1 | 11/2012 | |

OTHER PUBLICATIONS

Milgram, Stanley, "The Small-World Problem," Psychology Today (1967), pp. 60-67.
Kleinberg, Jon, "The Small-World Phenomenon: An Algorithmic Perspective," Cornell Computer Science Technical Report (1999).
Phillips, Joshua et al., "Modeling the Intelligence Analysis Process for Intelligent User Agent Development," Research and Practice in Human Resource Management 9(1), 59-73.
Microsoft Computer Dictionary (5th Ed.): synchronization.
Microsoft Computer Dictionary (5th Ed.): access.
Lotus NotesPump Miscellaneous Paper (date unknown).
NotesPump 1.0 Release Notes (date unknown).
Lotus Notes—Notes Administration Help Screen Shot (Date Unknown).
Chapter 13-1, "Anatomy of a Note ID," (date unknown).
About NotesPump (date unknown).
Lotus Development Corporation, "Lotus Quick Reference for SmartIcons, Lotus Notes Release 3.1," (date unknown).
Lotus Development Corporation, "Lotus Quick Reference for Windows and Presentation Manager, Lotus Notes Release 3," (date unknown).
Lotus Development Corporation, "Lotus Quick Reference for Macintosh, Lotus Notes Release 3.0," (date unknown).
Lotus Development Corporation, "Lotus Quick Reference for Application Developers, Lotus Notes Release 3," (date unknown).
Lotus Development Corporation, "Lotus Customer Support Service, Lotus Notes Customer Support Guides," (date unknown).
Lotus Software Agreement for "Notes 4.0 NA DKTP Client UPG," Part No. 38985, (date unknown).
Lotus Development Corporation, Lotus Notes 4.0, "Lotus Customer Support, North American Guide," (date unknown).
Lotus Development Corporation, Lotus Notes 4.1 Starter Pack, "Lotus Customer Support, North American Guide," (date unknown).
Lotus Development Corporation, "LotusScript Classes for Notes Release 4," (date unknown).
Allchin, James E., "An Architecture for Reliable Decentralized Systems," UMI Dissertation Services, Copyright 1983.
Lotus Development Corporation, "Lotus Notes Release 3.1: The Groupware Standard, Administrator's Guide—Server for NetWare, OS/2, and UNIX," 1989.
Lotus Development Corporation, "Lotus Notes Release 3.1: The Groupware Standard, Site and Systems Planning Guide," 1991.
Wilcox, Adam A., "PC Learning Labs Teaches Lotus Notes 3.0: The Quick and Easy Way to Learn," Ziff-Davis Press, 1993.
Lotus Development Corporation, "Lotus Notes Release 3.3: Start Here, Workstation Install for Windows, OS/2 and Macintosh," 1993.
Augun, Audry, "Integrating Lotus Notes with Enterprise Data," "Lotus Notes Advisor," Advisor Publications, Jul. /Aug. 1996, pp. 22-25.
"Lotus Notes Advisor," Advisor Publications, Aug. 1996.
IBM Corporation, "Secrets to Running Lotus Notes: The Decisions No One Tells You How to Make," Oct. 1996.
"Lotus Notes Advisor," Advisor Publications, Oct. 1996.

Opyt, Barbara, et al., "Use the Internet as Your Lotus Notes WAN," "Lotus Notes Advisor," Advisor Publications, Nov./Dec. 1996, pp. 17-20.
"Lotus Notes Advisor," Advisor Publications, Dec. 1996.
Swedeen, Bret, et al., "Under the Microscope: Domino Replication," "LDD Today," Oct. 1, 1998.
Lotus Development Corporation, "Lotus Inside Notes: The Architecture of Notes and the Domino Server," 2000.
"The History of Notes and Domino," Lotus Developer Domain, Lotus, Sep. 29, 2003.
Federal Information Processing Standards Publication 180-2, Aug. 1, 2002.
Federal Information Processing Standards Publication 197, Nov. 26, 2001.
Lotus Development Corporation, "Lotus Notes Release 3.1: Administrator's Guide—Server for Windows," 1993.
Lotus Development Corporation, "Lotus Notes Release 3.1: The Groupware Standard, Customer Services Application Guide," 1994.
Lotus Development Corporation, "Lotus Notes Release 3.1: The Groupware Standard, Getting Started with Application Development," 1994.
Lotus Development Corporation, "Lotus Notes Release 3.1: The Groupware Standard, Network Driver Documentation," 1994.
Kornblith, Polly R., "Lotus Notes Answers: Certified Tech Support," Covers Lotus Notes Release 3, Osborne McGraw-Hill, 1994.
Freeland, Pat and Londergan, Stephen, "Lotus Notes 3/3.1 for Dummies (TM)," IDG Books Worldwide, 1994.
Gewirtz; David, "Lotus Notes 3 Revealed! Your Guide to Managing Information and Improving Communication Throughout Your Organization," Prima Publishing, 1994.
Shafran, Andrew B., "Easy Lotus Notes for Windows (TM)," Que (R) Corporation, 1994.
Lotus Development Corporation, "Lotus Notes Release 3.3: The Groupware Standard, Administration," 1994.
McMullen, Melanie, Editor, "Network Remote Access and Mobile Computing," Miller Freeman Inc., 1994.
Lot us Development Corporation, "Lotus Notes Internet Cookbook for Notes Release 3," Jan. 16, 1996.
IntelliLink Corporation, "IntelliLink (R) for Windows User's Guide," Version 3.0, 1994.
Lotus Development Corporation, "Lotus Notes Release 4: InterNotes Web Navigator Administrator's Guide," 1995.
Lotus Development Corporation, "Lotus InterNotes Release 4 Web Publisher: InterNotes Web Publisher Guide," 1995.
Lotus Development Corporation, "Lotus Notes Release 4 Install Guide for Servers," 1995.
Lotus Development Corporation, "Lotus Notes Release 4.1 Release Notes," 1995.
Lotus Development Corporation, "Lotus Notes Release 4 Migration Guide," 1995.
Lotus Development Corporation, "Lotus Notes Release 4 Database Manager's Guide," 1995.
Lotus Development Corporation, "Lotus Notes Release 4 Install Guide for Workstations," 1995.
Lotus Development Corporation, "Lotus Step by Step: A Beginner's Guide to Lotus Notes," 1995.
Lotus Development Corporation, "Lotus Notes Release 4.5, Network Configuration Guide," 1995.
Netscape Communications Corporation, "Installation Guide, Netscape Mail Server, Version 2.0 for Unix," 1995.
Netscape Communications Corporation, "User's Guide, Netscape Mail Server, Version 2.0," 1995.
Netscape Communciations Corporation, "Administrator's Guide, Netscape Mail Server, Version 2.0," 1995.
Pyle, Hugh, "The Architecture of Lotus Notes," Lotus Notes Advisor, Advisor Publications, Premiere Issue 1995, pp. 18-27.
"Lotus Notes Advisor," Advisor Publications, Jun. 1995.
IBM, "The Architecture of Lotus Notes," White Paper, No. 114654, modified date: May 31, 1995.
Lotus Development Corporation, "Lotus Notes Knowledge Base," "What is the Notes Replicator," Jul. 5, 1995.
"Lotus Notes Advisor," Advisor Publications, Aug. 1995.
Grous, Paul J., "Creating an Managing a Web Site with Lotus' InterNotes Web Publisher," "The View Technical Journal for Lotus Notes (R) Software," vol. 1, Issue 4, Sep./Oct. 1995, pp. 3-18.
"Lotus Notes Advisor," Advisor Publications, Oct. 1995.
Cole, Barb, "Lotus airs Notes-to-database integration tool," www.looksmart.com, Oct. 2, 1995.
Lotus Development Corporation, "Lotus Notes Knowledge Base," "Lotus Announces Lotus NotesPump 1.0," Oct. 31, 1995.
Lotus Development Corporation, "Lotus Notes Knowledge Base," Lotus NotesPump 1.0 Q & A, Oct. 31, 1995.
Lotus Development Corporation, Lotus Notes Knowledge Base, "Lotus NotesPump: Database Integration for Lotus Notes," Oct. 31, 1995.
Lotus Development Corporation, "Lotus Notes Knowledge Base," "How to Set Up "Firewall" Protection for a Notes Domain," Nov. 6, 1995.
Pyle, Lisa, "A Jump Start to the Top Ten R3-to-R4 Migration Considerations," "Lotus Notes Advisor," Advisor Publications, vol. 1, No. 5, Nov./Dec. 1995, pp. 3-20.
"Lotus Notes Advisor," Advisor Publications, Dec. 1995.
Lotus Development Corporation, "Lotus Notes Release 4 Install Guide for Workstations," First Revision, 1996.
Lotus Development Corporation, "Lotus Notes Release 4 Programmer's Guide Part 1," 1995.
Lotus Development Corporation, Lotus Notes Release 4 Programmer's Guide Part 2, 1995.
Lotus Development Corporation, "Lotus Notes Release 4 Administrator's Guide," 1995.
Lotus Development Corporation, "Lotus Notes Release 4 Deployment Guide," 1995.
Lotus Development Corporation, "Lotus Notes Release 4 Application Developer's Guide," 1995.
Lotus Development Corporation, "Lotus Notes Release 4 InterNotes Web Navigator User's Guide," 1995.
Lotus Development Corporation, "Lotus Notes Release 4 Release Notes," 1995.
Lotus Development Corporation, "Lotus Notes Release 4.5 Install Guide for Workstations," 1995.
Lotus Development Corporation, "Release Notes, Lotus Notes Release 3.30, Windows, OS/2, and Macintosh," 1995.
Brown, Kevin, et al., "Mastering Lotus(R) Notes (R)," SYBEX Inc., 1995.
Lotus Development Corporation, "Lotus Step by Step: A Beginner's Guide to Lotus Notes," First Revision, 1996.
Freeland, Pat and Londergan, Stephen, "Lotus Notes Release 4 for Dummies(TM)," IDG Books Worldwide, 1996.
Kreisle, Bill, "Teach yourself . . . Lotus Notes 4," MIS:Press, 1996.
Marmel, Elain, "Easy Lotus(R) Notes Release 4.0," Que Corporation, 1996.
Lotus Development Corporation, "Lotus Notes Server Up and Running!, Release 4," 1996.
Falkner, Mike, "How to Plan, Develop and Implement Lotus Notes in Your Organization," Wiley Computer Publishing, John Wiley and Sons., Inc., 1996.
Lamb, John P., et al., "Lotus Notes Network Design," McGraw-Hill, 1996.
Tamura, Randall A., et al., "Lotus Notes 4 Unleashed," Sams Publishing, 1996.
Dahl, Andrew, "Lotus Notes 4 Administrator's Survival Guide," Sams Publishing, 1996.
Netscape Communications Corporation, "Administrator's Guide, Netscape News Server, Version 2.0," 1996.
Bedell., Doug, "I Know Someone Who Knows Kevin Bacon: Meeting Your New Best Friends; Six Degrees Widens Your Contacts . . . " Dallas Morning News, Oct. 27, 1998.
"The Social Semantic Desktop", by Decker et al., DERI Technical Report May 2, 2004.
"A Multi-Dimensional, Unified User Model for Cross-System Personalization", by Niederee et al., AVI'04, May 25, 2004, Gallipoli, Italy.
Android Developers, "Date," 10 pages, Oct. 27, 2011.
"CR 3483 to Release 8 TS 25.331, Rev. 2," 3GPP TSG-RAN2 Meeting #64, Prague, Czech Republic, 11 pages, Nov. 10-14, 2008.

"CR 4100 to Release 8 TS 25.331, Rev. 1," 3GPP TSG-RAN WG2 Meeting #69, San Francisco, U.S., 6 pages, Feb. 22-26, 2010.
GSM Association, "Network Efficiency Task Force Fast Dormancy Best Practices," V1.0, 21 pages, May 26, 2010.
Qualcomm, "System Parameter Recommendations to Optimize PS Data User Experience and UE Battery Life," 80-W1112-1, Revision B, 9 pages, Mar. 2007.
International Application No. PCT/US2005/038135, International Preliminary Report on Patentability, 9 pages, Oct. 31, 2011.
Balaban, Bob, "This Is Not Your Father's Basic: LotusScript in Notes Release 4," The View, vol. 1, Issue 5, 32 pages, Nov.-Dec. 1995.
Bergman, Lawrence D. et al., "Programming-By-Demonstration for Behavior-Based User Interface Customization," IBM Research Report, RC23116, 5 pages, Feb. 20, 2004.
B'Far, Reza et al., "Designing Effective User Interfaces for Wireless Devices," Publication Unknown, 14 pages, Date Unknown—published prior to Feb. 23, 2006.
European Patent Application No. EP 03705704.9, Supplementary European Search Report, 4 pages, Jun. 9, 2010.
European Patent Application No. EP 03707338.4, Supplementary European Search Report, 2 pages, Apr. 18, 2011.
Gameline, Advertisement, 1 page, 1982.
Haas, Zygmunt J. et al., "Mobile-TCP: An Asymmetric Transport Protocol Design for Mobile Systems," IEEE, pp. 1054-1058, 1997.
Haas, Zygmunt J. et al., "The Design and Performance of Mobile TCP for Wireless Networks," Journal of High Speed Networks, vol. 10, pp. 187-207, 2001.
Hardy, Ed, "Microsoft Proposes Two New Thumb-Driven User Interfaces," Brighthand Consulting, Inc., 2 pages, 2003.
ImTOO, "ImTOO iPod Movie Converter," 3 pages, Nov. 9, 2005.
International Application No. PCT/US2003/000618, International Search Report, 1 page, Apr. 4, 2003.
International Application No. PCT/US2003/000624, International Search Report, 2 pages, May 13, 2003.
International Application No. PCT/US2005/037702, International Preliminary Examination Report, 6 pages, Nov. 20, 2007.
International Application No. PCT/US2005/037702, International Search Report, 1 page, Nov. 5, 2007.
International Application No. PCT/US2005/037702, Written Opinion, 6 pages, Nov. 5, 2007.
International Application No. PCT/US2005/038135, International Search Report, 2 pages, Aug. 8, 2008.
International Application No. PCT/US2005/038135, Written Opinion, 8 pages, Aug. 8, 2008.
International Application No. PCT/FI2005/050424, International Search Report, 4 pages, Mar. 2, 2006.
International Application No. PCT/FI2005/050426, International Search Report, 3 pages, Mar. 1, 2006.
International Application No. PCT/FI2005/050441, International Search Report, 3 pages, Mar. 1, 2006.
International Application No. PCT/US2006/023426, International Search Report, 1 page, Feb. 21, 2007.
International Application No. PCT/US2006/023427, International Search Report, 1 page, Oct. 12, 2006.
International Application No. PCT/US2007/014462, International Search Report, 1 page, Jul. 2, 2008.
International Application No. PCT/US2007/014497, International Search Report, 1 page, Aug. 25, 2008.
Japanese Patent Application No. 2003-558726, Office Action, 2 pages, Jun. 10, 2008.
Karlson, Amy K. et al., "AppLens and LaunchTile: Two Designs for One-Handed Thumb Use on Small Devices," Proceedings of CHI 2005, 10 pages, Apr. 2-7, 2005.
Kent, S. et al., "Security Architecture for the Internet Protocol," RFC 2401, The Internet Society, 62 pages, Nov. 1998.
Koeppel, Dan, "GUIs Just Want to Have Fun," Wired Magazine, Issue 8.10, 12 pages, Oct. 2000.
Lotus Development Corporation, "Lotus Notes Server for Windows," Release 3.3, 7 pages, 1994.
MacGregor, Rob et al., "The Domino Defense: Security in Lotus Notes and the Internet," IBM Corporation, 183 pages, Dec. 1997.
Maltz, David A. et al., "MSOCKS: An Architecture for Transport Layer Mobility," IEEE, pp. 1037-1045, 1998.
Mason, Luke, "Windows XP: New GUI Design Shows Skin Is In," TechRepublic, 4 pages, Apr. 4, 2001.
Miller, Victor S., "Use of Elliptic Curves in Cryptography," Advances in Cryptology—CRYPTO '85 Proceedings, vol. 218, pp. 417-426, 1985.
Myers, Brad A. et al., "Extending the Windows Desktop Interface With Connected Handheld Computers," WSS'00 Proceedings of the 4th Conference on USENIX Windows Systems Symposium, vol. 4, 10 pages, 2000.
Myers, Brad A. et al., "User Interfaces That Span Hand-Held and Fixed Devices," CHI'2001 Workshop on Distributed and Disappearing User Interfaces in Ubiquitous Computer, 4 pages, 2001.
Nokia, "Developer Platforms," 3 pages, 2005.
Ortiz, C. Enrique, "An Introduction to the Symbian OS™ Platform for Palm OS® Developers," Metrowerks Corp., 21 pages, 2002.
Ringel, Meredith et al., "iStuff: A Scalable Architecture for Lightweight, Wireless Devices for Ubicomp User Interfaces," Proceedings of UbiComp 2002, 2 pages, 2002.
Signorini, Eugene, "SEVEN's Service-Based Wireless Solutions Enable Enterprises to Untether E-Mail," Wireless/Mobile Enterprise & Commerce, 16 pages, Oct. 2004.
U.S. Appl. No. 60/663,463, File History, 113 pages, Mar. 18, 2005.
International Application No. PCT/US2011/044974, International Search Report, 15 pages, Jun. 1, 2012.
International Application No. PCT/US2012/021459, International Search Report, 10 pages, Jun. 1, 2012.
Wikipedia, Definition for "General Packet Radio Service," 7 pages, downloaded on May 31, 2012.
Newton's Telecom Dictionary, 20th edition, Mar. 2004.
Braden, R., "Requirements for Internet Hosts—Application and Support," RFC 1123, 80 pages, Oct. 1989.
Elz, R. et al., "Clarifications to the DNS Specification," RFC 2181, 12 pages, Jul. 1997.
European Patent Application No. EP 05815115.0, Supplementary European Search Report, 7 pages, Nov. 17, 2011.
International Application No. PCT/US2011/030534, International Search Report, 10 pages, Dec. 29, 2011.
International Application No. PCT/US2011/037932, International Search Report, 9 pages, Jan. 2, 2012.
International Application No. PCT/US2011/037943, International Search Report, 11 pages, Jan. 2, 2012.
International Application No. PCT/US2011/043322, International Search Report, 9 pages, Feb. 9, 2012.
International Application No. PCT/US2011/043328, International Search Report, 12 pages, Feb. 27, 2012.
International Application No. PCT/US2011/043409, International Search Report, 11 pages, Feb. 9, 2012.
International Application No. PCT/US2011/056474, International Search Report, 9 pages, May 4, 2012.
International Application No. PCT/US2011/056476, International Search Report, 12 pages, May 24, 2012.
International Application No. PCT/US2011/056478, International Search Report, 11 pages, May 31, 2012.
International Application No. PCT/US2011/058840, International Search Report, 10 pages, Apr. 26, 2012.
International Application No. PCT/US2011/058843, International Search Report, 11 pages, May 16, 2012.
International Application No. PCT/US2011/058848, International Search Report, 10 pages, Apr. 10, 2012.
International Application No. PCT/US2011/061512, International Search Report, 10 pages, May 10, 2012.
International Application No. PCT/US2012/022121, International Search Report, 11 pages, May 14, 2012.
Mockapetris, P., "Domain Names—Concepts and Facilities," RFC 1034, 43 pages, Nov. 1987.
Mockapetris, P., "Domain Names—Implementation and Specification," RFC 1035, 43 pages, Nov. 1987.
Perez, Sarah, "Onavo's Data-Compressing Mobile App Raises $10 Million Series B From Horizons, Motorola Ventures," 2 pages, Jan. 24, 2012.
Qualcomm Incorporated, "Managing Background Data Traffic in Mobile Devices," 16 pages, Jan. 2012.

Seven Networks, Inc., "Seven Optimizing the Mobile Ecosystem," www.seven.com/products.traffic_optimization.php, 1 page, May 29, 2012.

Adwankar, Sandeep et al., "Universal Manager: Seamless Management of Enterprise Mobile and Non-Mobile Devices," Proceedings of the 2004 IEEE International Conference on Mobile Data Management, 12 pages, 2004.

Amato, Guiseppe et al., "Detection of Images With Adult Content for Parental Control on Mobile Devices," Mobility, 5 pages, 2009+A182.

Blefari-Melazzi, N. et al., "Autonomic Control and Personalization of a Wireless Access Network," Computer Networks, vol. 51, pp. 2645-2676, 2007.

de la Iglesia, Didac Gil et al., "Enhancing Mobile Learning Activities by the Use of Mobile Virtual Devices—Some Design and Implementation Issues," 2010 International Conference on Intelligent Networking and Collaborative Systems, IEEE Computer Society, pp. 137-144, 2010.

Eronen, "TCP Wake-Up: Reducing Keep-Alive Traffic in Mobile IPv4 and Ipsec NAT Traversal," NRC-TR-2008-002, Nokia, 10 pages, Jan. 31, 2008.

Fukushima, Yukinobu et al., "Planning Method of Robust WDM Networks Against Traffic Changes," IEIC Technical Report, vol. 103, No. 1, pp. 11-16, 2003.

International Application No. PCT/US2011/061795, International Search Report & Written Opinion, 10 pages, Jul. 31, 2012.

International Application No. PCT/US2012/020669, International Search Report & Written Opinion, 10 pages, Sep. 12, 2012.

International Application No. PCT/US2012/034288, International Search Report & Written Opinion, 15 pages, Nov. 23, 2012.

International Application No. PCT/US2012/034297, International Search Report & Written Opinion, 11 pages, Nov. 26, 2012.

International Application No. PCT/US2012/034300, International Search Report & Written Opinion, 9 pages, Nov. 23, 2012.

International Application No. PCT/US2012/035292, International Search Report & Written Opinion, 11 pages, Nov. 28, 2012.

International Application No. PCT/US2012/035300, International Search Report & Written Opinion, 9 pages, Nov. 28, 2012.

International Application No. PCT/US2012/035608, International Search Report & Written Opinion, 9 pages, Nov. 28, 2012.

International Application No. PCT/US2012/035617, International Search Report & Written Opinion, 9 pages, Oct. 10, 2012.

Johnsen, Lotte, Master's Thesis for "Content Distribution in Ad Hoc Networks," Norwegian University of Science and Technology, Department of Telematics, 158 pages, Spring 2006.

Kanter, Theo et al., "Smart Delivery of Multimedia Content for Wireless Applications," Computer Science, vol. 1818, pp. 70-81, 2000.

Kino, Toru, "Infrastructure Technology for Cloud Services," Fujitsu Sci. Tech. J., vol. 47, No. 4, pp. 434-442, Oct. 2011.

LeBrun, Jason et al., "Bluetooth Content Distribution Stations on Public Transit," ACM, 3 pages, 2006.

Newton, Harry, "Newton's Telecom Dictionary," 20th Edition, pp. 67, 127, 542, Mar. 2004.

Openet Telecom, "Taming Signaling: Addressing the Signaling Storm," Openet Labs Technical White Paper, 11 pages, 2012.

Parker, Tammy, "SK Telecom Aims to License, Standardize Smart Push," FierceBroadbandWireless, 4 pages, Aug. 26, 2012.

Paul, Sanjoy et al., "The Cache-And-Forward Network Architecture for Efficient Mobile Content Delivery Services in The Future Internet," First ITU-T Kaleidoscope Academic Conference for Innovations in NGN—Future Network and Services, 7 pages, May 12-13, 2008.

Zhang, Qi et al., "Cloud Computing: State-Of-The-Art and Research Challenges," J Internet Serv Appl, vol. 1, pp. 7-18, 2010.

* cited by examiner

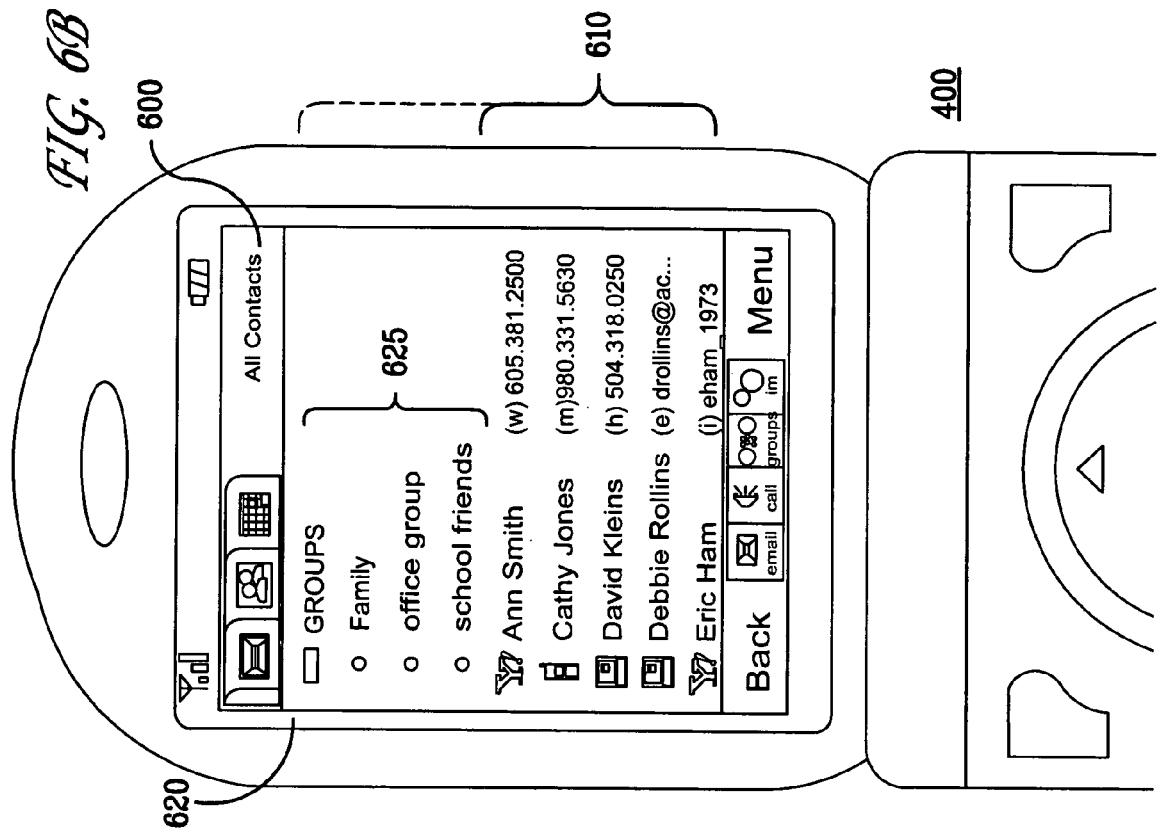
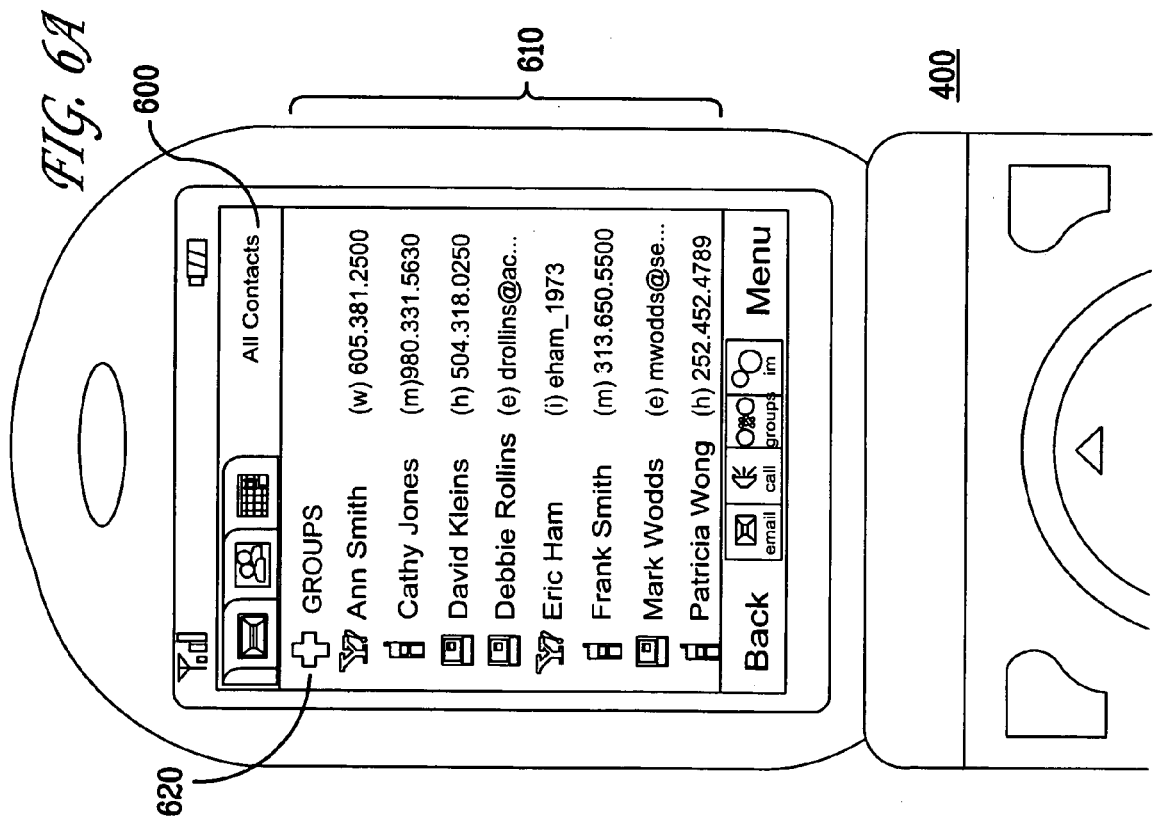

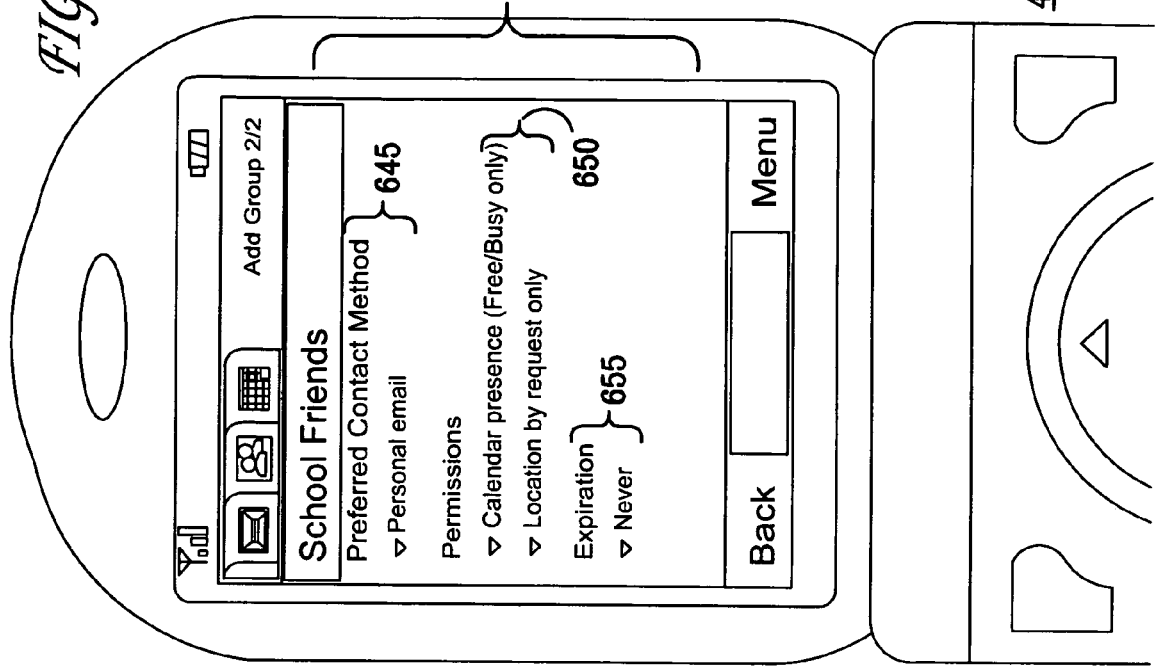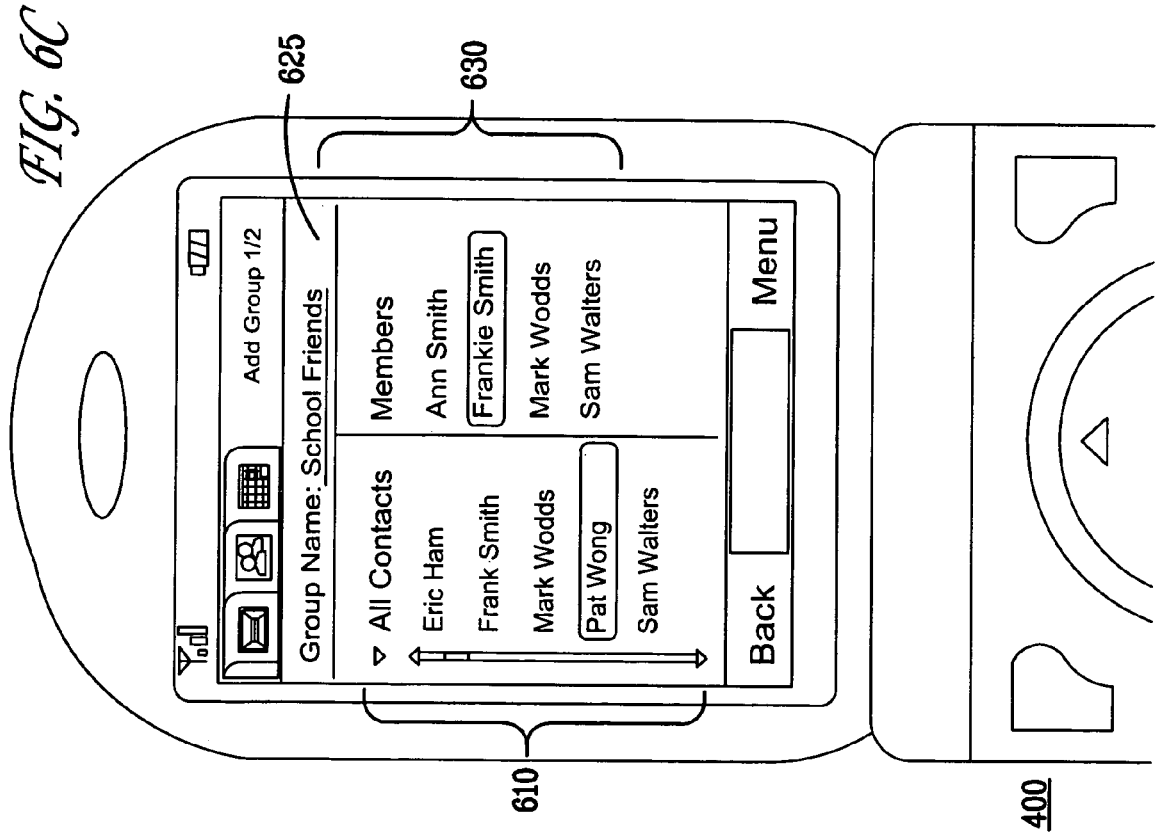

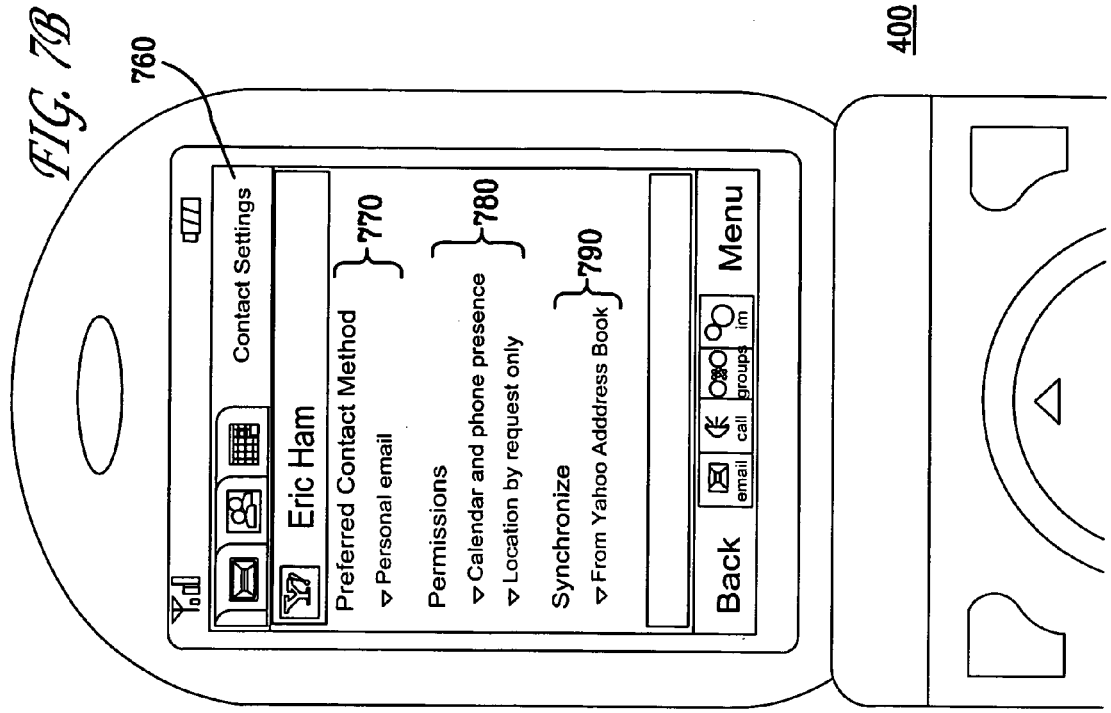
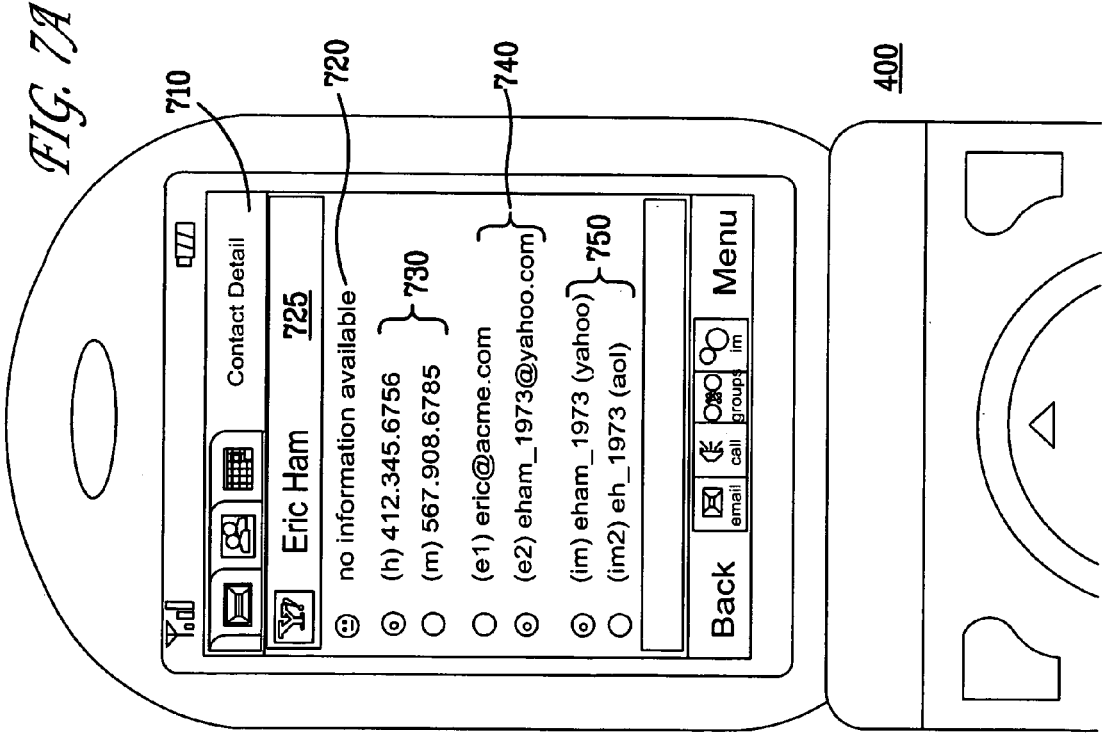

CONTEXT AWARE DATA PRESENTATION

CROSS-REFERENCE TO RELATED APPLICATIONS

The present application is a continuation application and claims the priority benefit of U.S. patent application Ser. No. 11/217,203 entitled "Universal Data Aggregation" and filed Aug. 31, 2005 now U.S. Pat. No. 7,853,563, which claims the priority benefit of U.S. provisional patent application No. 60/704,781 filed Aug. 1, 2005 and entitled "Networked Personal Information Management," the disclosures of both applications are incorporated herein by reference.

The present application is related to U.S. patent application Ser. No. 10/339,368 filed Jan. 8, 2003 and entitled "Connection Architecture for a Mobile Network." The present application is also related to U.S. patent application Ser. No. 10/339,369 filed Jan. 8, 2003 and entitled "Secure Transport for Mobile Communication Network." These related applications are commonly assigned and are incorporated herein by reference.

The present application is also related to U.S. patent application Ser. No. 11/229,340 filed Sep. 16, 2005 and entitled "Linking of Personal Information Management Data" and U.S. patent application Ser. No. 11/303,048 filed Dec. 14, 2005 and entitled "Publishing Data in an Information Community."

BACKGROUND OF THE INVENTION

1. Field of the Invention

The present invention relates to control and utilization of personal information management (PIM) data such as calendar and contact information in the context of personal and professional activities. More specifically, the present invention relates to control and utilization of PIM data in the context of mobile devices such as smart phones and PDAs.

2. Description of Related Art

Presently available groupware applications and other related collaboration products that facilitate shared work and access to documents and information (e.g., data pools) are, to a certain extent, 'closed networks.' That is, certain information cannot be shared amongst users of different groupware products because the protocols setting forth the rules and standards by which communication of data takes place are different. For example, an individual using Microsoft® Outlook® as an e-mail client via a Microsoft® Exchange® Server can exchange e-mail messages with an individual using a Lotus® Notes client via an IBM® Lotus® Domino Server. Those same users cannot, however, access the contact or calendar data of one another due to protocol differences between an Exchange® Server and a Domino Server.

There have been some software applications that have attempted to bridge the protocol gap such as the Trillian instant messaging (IM) client from Cerulean Studios. Trillian is a multi-protocol chat client that supports AOL® Instant Messenger, ICQ®, MSN® Messenger, Yahoo!® Messenger and IRC through a single interface by enabling simultaneous connections to existing instant messaging networks via a direct connection to whatever servers actually power the messaging network. Trillian, however, cannot share most types of corporate or personal data as it is limited to Instant Messaging.

There is a need in the art for a system that allows for the aggregation and access of all types of PIM data in a centralized matter notwithstanding network protocols or other proprietary limitations of particular PIM data resources. Through the aggregation of this data in a centralized manner, the PIM data can then be manipulated or utilized by a particular user or shared amongst a family of users in order to allow for more informed personal and professional relationships. Through the aggregation and sharing of PIM data without regard for protocol and/or proprietary limitations, larger communities may be built between individuals and businesses.

SUMMARY OF THE INVENTION

The present invention provides more productive control over PIM data by aggregating data from multiple sources and enabling the bridging of information communities and organizations.

The present invention provides for the aggregation of corporate data from enterprise data depositories such as Microsoft® Exchange® and IBM® Lotus® Domino servers and Internet Service Providers (ISPs) such as Yahoo!® and MSN® as well as the data aggregation platform with regard to user permissions and preferred contact methods.

The present invention provides for the aggregation of presence information from corporate applications such as Lotus® Sametime and Microsoft® IM in addition to ISP communities such as AOL® and Yahoo!®.

The present invention provides for the aggregation of status information from a mobile device profile.

The present invention provides for the aggregation of physical location information from an operator network or device via GPS.

The present invention provides for the aggregation of user contact information via incoming e-mail messages and telephone contacts.

BRIEF DESCRIPTION OF THE DRAWINGS

FIGS. 6A-6F are exemplary embodiments of groups lists as enabled by an exemplary groups module on an exemplary data aggregation and management platform.

FIG. 7A is an exemplary view of aggregated contact information for a particular contact.

FIG. 7B is an exemplary view of various preferences and permissions of the user identified in FIG. 7A.

DETAILED DESCRIPTION OF AN EXEMPLARY EMBODIMENT

Figure 1:
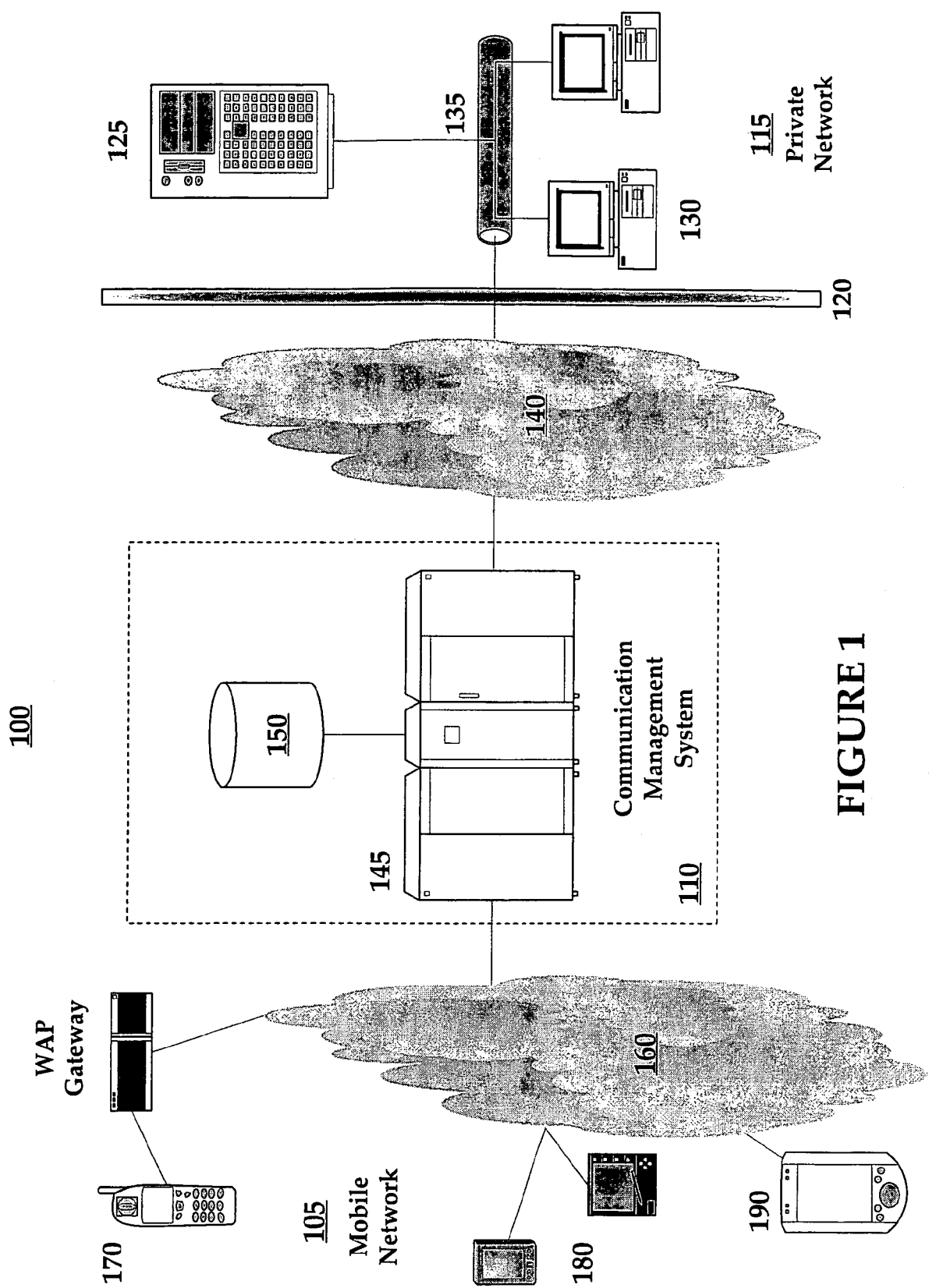
FIG. 1 is an illustration of an exemplary communication network architecture comprising a mobile network, a communication management system and a private network.

FIG. 1 illustrates an exemplary communication network architecture 100. Communication network architecture 100 comprises a mobile network 105, a communication management system 110 and a private network 115. Communication management system 110 generally manages communications between the mobile network 105 and the private network 115.

A network should be generally understood as a group of associated devices (e.g., computing devices) that are coupled to one another via a communications facility. For example, mobile network 105 is illustrative of an exemplary group of mobile computing devices such as mobile phones, smart phones, PDAs, tablet PCs and WI-FI equipped laptops. Private network 115 is illustrative of an enterprise server and various workstation clients such as that found in any number of corporate entities and businesses. Private network 115 may also be embodied as a single computer (e.g., a home computer) coupled to a series of other computing devices via an Internet connection as provided by an ISP. Mobile network 105, communication management system 110 and private network 115 may also be reflective of a network in that they relate a variety of computing devices coupled to one another via a variety of communications channels (e.g., mobile telephone base stations, Internet and so forth). In that regard, networks should be interpreted as being inclusive rather than exclusive.

Private network 115 may be separated from the communication management system 110, mobile network 105 and any other networks by a firewall 120. Firewall 120 is traditionally a set of software applications located at a network gateway server (not shown) to protect the resources of the private network 115 (e.g., corporate or private data) from unauthorized users and/or malicious data entities (e.g., viruses and spy-ware) that might exist outside the private network 115. Firewall 120 may also be a security policy used with the aforementioned software application. Firewall 120, in the case of a personal computer (PC), may be software directly implemented on the PC.

The mobile network 105 comprises a variety of mobile devices that may communicate over the Internet through, for example, a wireless or landline mobile network. A variety of mobile networks and communications channels for enabling Internet access are well known in the art.

Private network 115 may be any enterprise network, individual user network, or local computer system that maintains data for one or more users. In an exemplary embodiment, the private network 115 may comprise an enterprise server 125 configured to be accessed by multiple PCs 130. In one example, the enterprise server 125 may be a Microsoft® Exchange® server and the PCs 130 may access data such as electronic mail (e-mail) on the enterprise server 125 through a client software application (not shown) such as Microsoft® Outlook®. The enterprise server 125 can store e-mail mailboxes, contact lists, calendars, tasks, notes, or any other type of local data or electronic documents (e.g., word processing documents, PowerPoint® presentations, Excel spreadsheets). PCs 130 are coupled to the enterprise server 125 over a Local Area Network (LAN) 135, which is coupled to a Wide Area Network (WAN) 140 such as the Internet.

In some embodiments, PCs 130 may operate independently of enterprise server 125 (e.g., a home personal computer or a business enterprise without an enterprise server 125). PC 130 may comprise or be coupled to memory (not shown) to store e-mail mailboxes, contact lists, calendars, tasks, notes, or any other type of local data or electronic document that might otherwise be stored on enterprise server 125. In these embodiments, a personal client application (not shown) may also provide for communication with a management server 145 or a Personal Client Server (PCS) (not shown) coupled to the management server 145. This latter configuration would be functionally similar to an enterprise client (not shown) at the enterprise server 125 configured to allow communication with the management server 145. The particularities of a given communications architecture implementation are left to the requirements of a user, their particular network and available communications hardware and software. In that regard, the present disclosure's reference to a PCS should not be interpreted as an operational necessity but an alternative embodiment of the present invention.

Communication management system 110 comprises at least one management server 145 configured to manage transactions between mobile devices in the mobile network 105 and the private network 115. A user database 150, which may be coupled to or directly integrated with management server 145, comprises configuration information for different users. For example, the user database 150 may comprise login data for users in the private network 115 and/or mobile network 105.

Communication management system 110 may further comprise one or more Smart Device Servers (SDS) (not shown) and/or one or more of the aforementioned PCS (not shown) in addition to any other specially configured equipment that might be necessary to enable communications between the mobile network 105 and private network 115 in addition to communications with the communication management system 110. Optional SDS (not shown), for example, manages communications with particular smart mobile devices 190 (e.g., smart phones like the Treo 600) whereas an optional PCS (not shown) may manage communications with personal clients (not shown) that may reside on PC 130.

Mobile devices in the mobile network 105 may comprise cellular phones 170 comprising Wireless Application Protocol (WAP) interfaces configured to communicate with management server 145 through a WAP gateway. Other mobile devices may include tablet PCs, PDAs and Internet kiosks 180 or any smart mobile device 190 operating as a communication start/end-point.

Communication channels 160 are any communication pathways that allow the aforementioned mobile devices to communicate between the mobile network 105 with the Internet and/or any other communications network. For example, communications channel 160 may be a landline, cellular channels, 802.11 wireless channels, or satellite channels.

In an independent PC configuration, the personal client application (not shown) installed on the PC 130 establishes a data connection between the PC 130 and management server 145 over the appropriate networks (e.g., LAN 135 and WAN 140) as well as any necessary intermediate hardware or software applications that might further be necessary such as an optional PCS (not shown). The data connection between the PC 130 and management server 145, in one embodiment, is initiated by the personal client as an outbound connection, which is then authenticated by the management server 145. For example, the personal client on PC 130 may present authentication information to the management server 145, which the management server 145 may attempt to reconcile with information in the user database 150. A similar connection process occurs in the context of an enterprise server 125 with an enterprise client and a related data connection.

If the management server 145 authenticates the personal client or enterprise client, the data connection is established through firewall 120 (if applicable) to establish access with the communication management system 110, which is outside the private network 115. Management server 145, after having established the data connection, may provide connection sharing information or other communication configuration parameters as might be related to an associated mobile device in the mobile network 105.

Management server 145 and the related client at the enterprise server 125 or PC 130 may then enter a quiescent mode until a transaction (e.g., the arrival of data at the server 125 or PC 130) that requires the transfer of data between the private network 115 and mobile network 105 (e.g., pushing of e-mail). In some embodiments, if the data connection is inadvertently terminated, the client at the enterprise server 125 or PC 130 will automatically reestablish a data connection with the management server 145.

The data connection may be maintained even when there is no exchange of data between the management server 145 and mobile network 105 and an associated mobile device. In one embodiment, the data connection is a Transmission Control Protocol/Internet Protocol (TCP/IP) connection although any connection protocol may be used that provides connectivity between the private network 115 and communication management system 110. Alternative embodiments may utilize a proxy server and/or a Secure Socket Layer (SSL) for the purposes of maintaining the security of information transmitted between the private network 115 and communication management system 110.

After establishing the data connection, a mobile data connection may be established between the mobile device in the mobile network 105 and the management server 145. The mobile data connection may, in some embodiments, be established prior to and/or maintained notwithstanding the presence of a data connection between the private network 115 and communication management system 110. For example, a mobile device in mobile network 105 may seek to establish and maintain a connection as soon as a communication channel 160 is available that facilitates establishing that connection. The mobile data connection may further be subject to polling (e.g., accessing the communication management system 110 on a regularly scheduled basis); manual synchronization and/or the generation of or request for data at the mobile device.

The mobile connection, in some embodiments, may also be initiated by the communication management system as a result of the arrival of data at the enterprise server 125 or PC 130 that needs to be delivered to the mobile device 170 via the communication management system 110 and appropriate communication channel 160 (e.g., arrival of e-mail to be pushed to the mobile device).

After the mobile connection is established, the mobile device 170 may access e-mail and other PIM data at the enterprise server 125 or PC 130 via an enterprise client or personal client, respectively. In some embodiments, the use of an optional SDS (not shown) to establish connectivity between the communication management system 110 and a smart device 190 may be required as may an optional PCS (not shown) for establishing connectivity between communication management system 110 and PC 130.

Mobile device connection, as noted, may be initiated by a mobile device in the mobile network 105. For example, a mobile user's username and password for accessing the communication management system 110 may be established in user database 150 when the user enrolls with the communication management system 110. The user would subsequently be required to provide this information when their mobile device attempts to automatically or manually accesses the communication management system 110. A username/password combination is not necessarily required to access the management system 110 as other security credentials may be utilized to establish access.

For example, an authentication token may be established on the mobile device following the device's providing of the proper security credentials (e.g., a user name and password). That authentication token may be recognized by the communication management system 110 with regard to establishing future access so that the re-entry of a username and password is not required for subsequent access. The authentication token may be permanent or set to expire after a certain period of time or a certain number of uses. Certificate mapping (using SSL certificates), Host-IP access control (white-listing and black-listing certain IP addresses or networks) and device location may also be used to establish access to the communication management system 110. In the latter example, the position of a device may be established by access to a particular base station (in the case of a cellular device) or a GPS-transceiver may identify the position of the device. If the device is out of a specified region, the communication management system 110 may deny access (e.g., a user designates denial of access if their mobile device is taken overseas or out of state as that location suggests it has been stolen).

Security credentials may also be provided through a combination of various mobile identifiers, for example, Mobile Identification Numbers (MIN), International Mobile Subscriber Identity (IMSI) and Electronic Serial Number (ESN). Additional layers of security may be provided through the use of a secure hash algorithm or a Virtual Private Network (VPN). Notwithstanding the particular access methodology, the credentials are ultimately verified by the management server 145 or some related software/hardware (e.g., optional SDS (not shown)) and possibly with further regard to user information stored in the user database 150.

Similar authentication methodologies may be utilized for establishing a data connection between the communication management system 110 and a computing device in the private network 115.

Once connectivity is established by the mobile device, the user may access e-mail, files or Personal Information Management (PIM) data residing at the enterprise server 125, PC 130 or communication management system 110 at the management server 145.

Management server 145 may be configured to reformat and render local data from the private network 115 according to the particularities of the user's mobile device in addition to functioning as a routing engine for data transactions between the mobile devices of the mobile network 105 and the private network 115.

Figure 2:
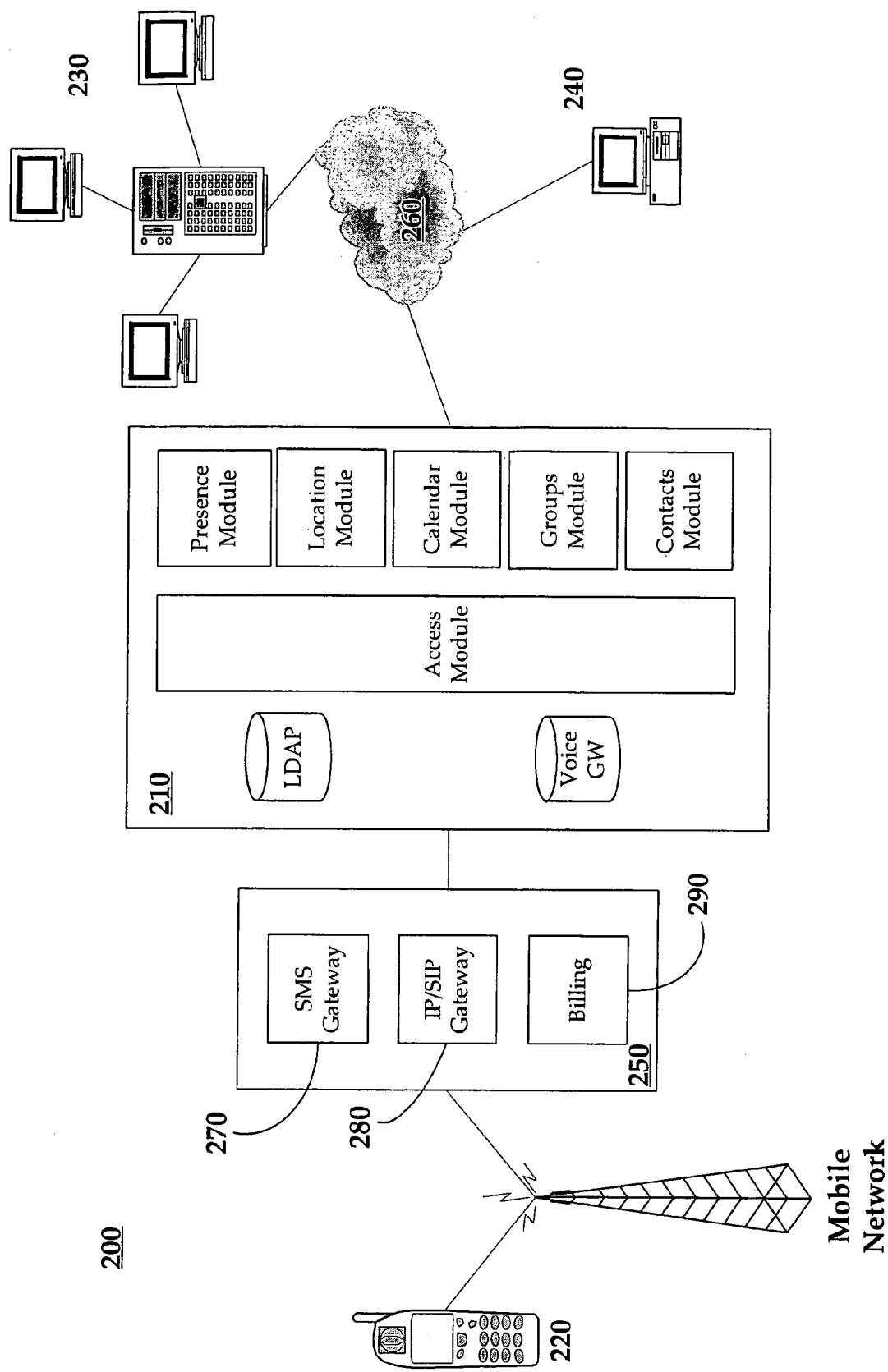
FIG. 2 is an illustration of an exemplary dynamic data aggregation and management system comprising an exemplary data aggregation server, an exemplary client device and various sources of Personal Information Management (PIM) data.

FIG. 2 is an illustration of a data aggregation and management system 200 comprising an exemplary dynamic data aggregation server 210, an exemplary client device 220 and various sources of PIM data including an enterprise server 230 and a PC 240. Various intermediate operations and services 250 are also shown. The intermediate operations and services 250 may be directly integrated as a part of data aggregation server 210, may stand alone as a third-party service accessible by data aggregation server 210 and/or device 220 or be remotely coupled to the data aggregation server 210 (e.g., physically separate from the physical architecture of the data aggregation server 210); for example, a switch or customer service center.

PC 240 may be a desktop PC coupled to the data aggregations server 210 by way of client connection software like SEVEN Personal Edition available from SEVEN Networks, Inc. of Redwood City, Calif. This client connection software may provide a secure link to data stored at the PC 240 such as e-mail, personal contacts and documents via and other PIM data. A client device 220 such as a smart phone or other mobile device may access this data via the data aggregation server 210 and/or a communications management system like that described in FIG. 1 and any variety of communication networks (e.g., wireless). PC 240 and its client connection software may be configured with certain features such as end-to-end encryption to ensure secure transmission of personal data or notification functionalities to inform a user that new content (e.g., e-mail) has arrived at the PC 240 and should be forwarded to client device 220 via, for example, a push operation through the data aggregation server 210 and/or a communications management system.

Enterprise server 230 may be a corporate enterprise server configured to manage e-mail, data and various applications. Enterprise server 230 (and PC 240) may utilize a firewall (not shown) like that described in FIG. 1. Although a firewall is described, a firewall is not necessary for the operation and interaction of the enterprise server 230 (or PC 240) with data aggregation server 210 and/or client device 220.

Enterprise server 230 is coupled to the data aggregation platform 210 via appropriate client server software, which, like the client software of PC 240, intermediately couples the enterprise server 230 to client device 220 via a data connection to the data aggregation server 210 and/or a communications management system like that described in FIG. 1. An example of such software is SEVEN Server Edition available from SEVEN Networks, Inc. of Redwood City, Calif. Additional software installed at the enterprise server 230 may provide various users (e.g., clients or workstations) the ability to interact with the enterprise server 230 and have access to application data (e.g., email).

Data aggregation server 210 comprises the various modules necessary to aggregate and management certain PIM data. Data aggregation server 210 may be directly integrated with the management server (145) of FIG. 1 or otherwise coupled to the communication management system (110) described in FIG. 1.

Data aggregation server 210 is optionally coupled to the enterprise server 230 and/or PC 240 via network 260. Network 260 further enables communications access to additional sources of PIM data like those described in FIG. 5 below. Access to an enterprise server 230 or PC 240 by the data aggregation server 210 is not required for the operation of the data aggregation server 210. The data aggregation server 210 may operate independently of an enterprise server 230 and PC 240 so long as certain information required by the data aggregation server 210 and an associated client device 220 is otherwise available (e.g., PIM data such as calendar and/or contact data). Coupling the data aggregation server 210 to PC 240 and/or enterprise server 230 merely provides additional or enhanced functionality that might otherwise be unavailable absent such a coupling.

Similarly, the e-mail redirection and data access functionality offered by connection software at PC 240 and enterprise server 230 may also operate independent of the data aggregation server 210. In an embodiment of the present invention, data aggregation server 210 and PC 240 and/or enterprise server 230 may operate in parallel without ever being 'aware' of the operation of the other. Another embodiment of the present invention, however, may integrate certain features of data aggregation server 210 with enterprise server 230 and/or PC 240 to provide for the aforementioned enhanced functionality.

Figure 5:
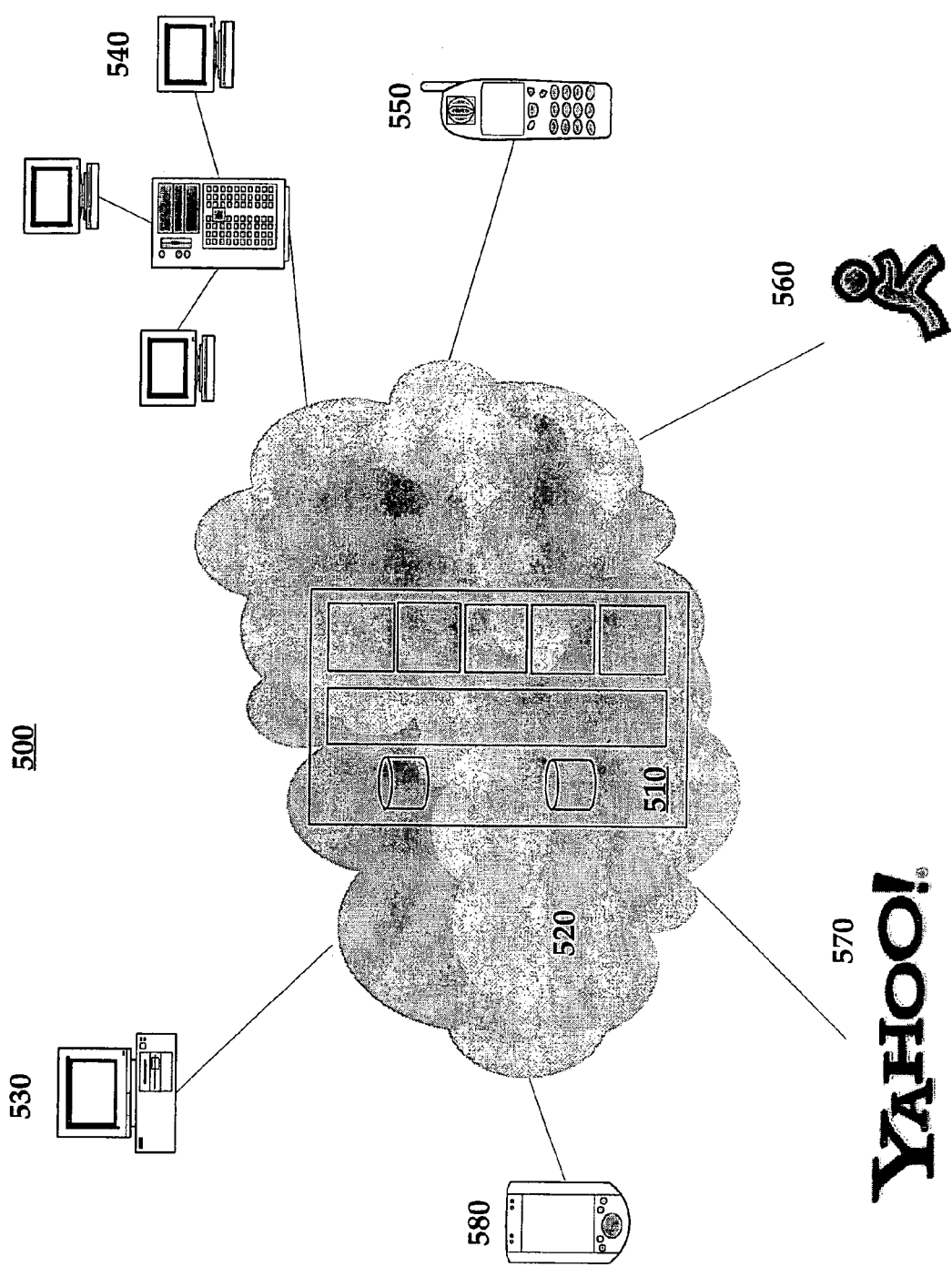
FIG. 5 is an illustration of exemplary networked relationships amongst a variety of sources of PIM data and a data aggregation server.

In an embodiment of the present invention, data aggregation server 210 may be operating on and/or integrated into with a service provider network (e.g., Cingular Wireless for wireless networking or AT&T Inc. for telecommunications such as digital subscriber lines (DSL)) as is further described in FIG. 5. Through integration or operational contact with a service provider's network, instant access to a community of millions of subscribers (i.e., the service provider's customers) is provided. This integration may also allow for access to additional features such as news, media content, maps and directions as well as e-mail, Short Messaging Service (SMS) and any other value-added features as made available by the service provider. The service provider's network and the data aggregation server 210 may operate independently of or in conjunction with enterprise server architecture 230 and/or PC 240.

As noted above, the data aggregation server 210 may also be integrated with the communication management system (110) and/or management server (145) of FIG. 1. In that regard, data aggregation server 210 may be a part of the management server (145), which may be an operational part of the communications management system (110) of FIG. 1. That communication management system (110) may be a part of the aforementioned service provider network and is further described in FIG. 5.

Figure 3:
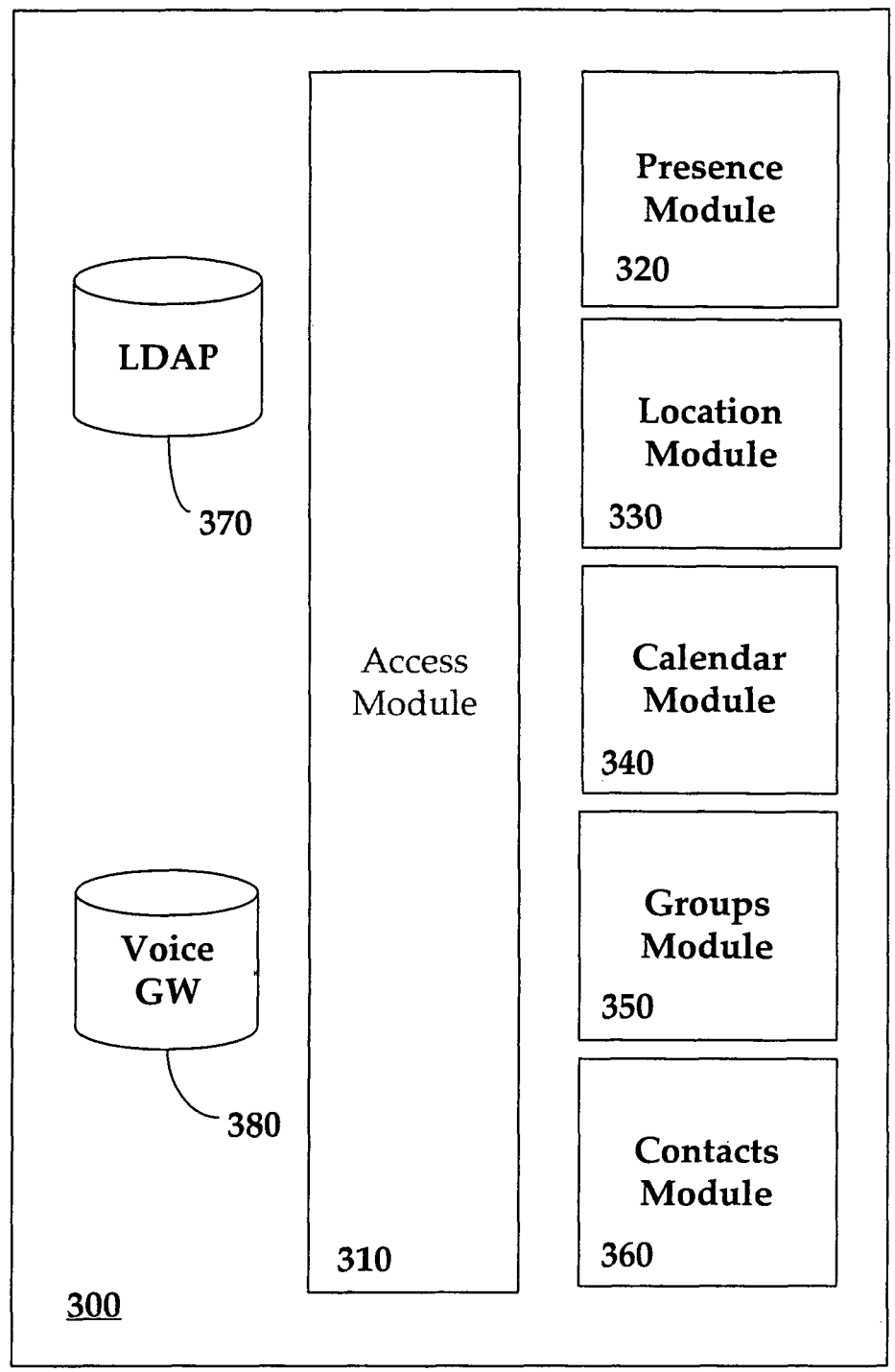
FIG. 3 is an exemplary data aggregation server providing for aggregation and management of PIM data.

Data aggregation server 210 may comprise various access controls, gateways and operational modules, which are described in detail in FIG. 3.

Intermediate operations and services 250 may comprise any variety of operations and services deemed necessary and/or desirable by a service provider. In FIG. 2, an SMS Gateway 270, IP/SIP Gateway 280 and Billing and Transaction Service 290 are illustrated. The inclusion of these particular operations and services is not to suggest their presence is a prerequisite for practice of the presently clamed invention.

SMS Gateway 270 may comprise a software and/or hardware utility enabling users to send and receive SMS messages on a GSM or PCS digital cellular network. SMS Gateway 270 may support a number of IP interfaces such as POP3 and SMTP for integration with an e-mail environment as well as HTTP/XML interfaces and SNMP traps for notification of events. SMS Gateway 270 may further support local programming interfaces such as Object Linking and Embedding (OLE), Dynamic Data Exchange (DDE) and Command Line Interface (CLI). SMS gateway 270 may be further coupled to an SMSC (not shown). A Push Gateway may be functionally integrated with SMS Gateway 270 and may further operate proxy applications such as a WAP Gateway for the translation of WAP requests into HTTP requests.

An IP/SIP Gateway 280 may operate in conjunction with an SIP Stack located in client device 220 to integrate the PSTN, which uses the Signaling System 7 protocol to offload PSTN data onto a wireless or broadband network.

Billing and transaction service 290 may be configured and/or utilized for calculating the minutes a user is on a network and/or the amount of bandwidth the user has consumed and how this usage pertains to a service plan and/or billing cycle. Other features that may be utilized by the user of client device 220 and subject to a service fee may be calculated by billing and transaction service 290 such as SMS, roaming and 411.

Client device 220, in an embodiment of the present invention, is a mobile device such as a cellular telephone configured to allow access to the data aggregation server 210 as well as data in enterprise server 230 and/or PC 240. Client device 220 may operate through intermediate operations and services 250 in order to access the data management server 210. Client device 220 may comprise various authentication controls and operational modules that interact with certain modules in the data aggregation server 210, the intermediate operations and service 250 as well as an enterprise server 230 and/or PC 240.

FIG. 3 is an exemplary data aggregation server 300 providing for the aggregations and management PIM data such as personal and professional contact and calendar information.

A module, as referenced in the present invention, is a collection of routines that perform various system-level functions and may be dynamically loaded and unloaded by hardware and device drivers as required. The modular software components described herein may also be incorporated as part of a larger software platform or integrated as part of an application specific component.

The modules of the present invention, in one embodiment, actively seek out data. That is, the modules recognize the existence of certain data connections to PIM data and other informational stores at mobile devices, desktop PCs, enterprise servers and any computing device coupled to the data aggregation server 300. Client software may be utilized at these different data stores to enable the access to information and to provide for certain authorization/access exchanges as are discussed in, for example, the context of access module 310. The data aggregation server 300, via the appropriate module (e.g., presence module 320) and/or modules (e.g., presence module 320 in conjunction with access module 310) will attempt to contact a client or some other indicia (e.g., an IP address) reflecting the existence of PIM or other informational data and try to acquire the same.

In another embodiment of the present invention, the data aggregation server 300 (via its various modules) may actually attempt to establish a data connection when a connection is not in existence. For example, if an enterprise server closes a TCP/IP connection to preserve bandwidth, the data aggregation server 300 may attempt to (re)establish that data connection in order to acquire certain PIM or other informational data.

In yet another embodiment of the present invention, the aforementioned clients or other software associated with the data management server 300 may attempt to push PIM and other informational data directly to the data aggregation server 300. For example, a desktop PC may be configured with client software allowing for interaction with the data aggregation server 300. The desktop PC client may recognize the existence of certain PIM or other informational data such as calendar and contact information. In an embodiment of the present invention, that client may push the PIM and other informational data to the server.

Limitations may be imposed on the clients with regard to what information may and may not be pushed. For example, certain information may be designated of low importance/privacy and freely pushed to the data aggregation server 300. Other information may be designed of medium importance and require, for example, the authorization of a user before that information is pushed to the data aggregation server 300. Still further information may be designated high priority/importance and never be pushed to the data aggregation server 300 due to privacy concerns. Similar limitations may be imposed in a pull scenario wherein the various modules of the data aggregation server 300 seek out that information and pull the information from an associated information source such as a desktop PC.

In another embodiment of the present invention, a client operating at, for example, a desktop PC may push certain information to a mobile device. That mobile device may then push the same information to the data aggregation server 300. Similarly, that information may be pulled from the mobile device after having been pushed from the desktop PC.

The present invention does not intend to limit the means by which information is acquired (e.g., push or pull), the existence or non-existence of intermediaries (e.g., data pushed from a desktop PC to a mobile device to a data aggregation server 300) or any security policy that may or may not be in place with regard to the aggregation of PIM and other informational data. A single data aggregation server 300 may further utilize various data acquisition methods for different types of data. For example, the data aggregation server 300 may actively seek to acquire location information via a location module 330 but may accept the pushing of data as it pertains to calendar and/or contacts data.

The modules of the present invention, in addition to aggregating information, may also manage the data. That is, the modules may analyze certain data in order to generate further data as is discussed in the context of a location module 330 and presence module 320, below. The various modules of the present invention may further execute certain calls and commands as they pertain to storage and retrieval of aggregated data, which may be stored locally (e.g., at the data aggregation server 300), in a storage area network (SAN), at a remote location or in any other medium or apparatus suitable for storage of data and accessing the same. Management (e.g., storage) of data may also be executed by other modules of the data aggregation server 300 that are not otherwise shown.

Aggregated data may be further stored at a client device 220 whereby the data aggregation server 300 pushes relevant data (e.g., data pertaining to PIM data of the user) to the client device 220 upon availability of the relevant data or, alternatively, relevant data is acquired and pulled upon request of the user for particular data or updated data. In some instances, the data aggregation server 300 will maintain local storage of certain portions of data in order to allow certain modules to analyze certain data in order to generate further data.

Storage of the aggregated data may be subject to various security protocols that may be set by the origin of the data (e.g., a user may designate their PIM data to expire so many hours after acquisition or the data may be prohibited from storage on any device or a particular device for more than a particular period of time). Alternatively, an administrator of a particular network or a particular communications architecture (e.g., an enterprise server or a larger communications network) may implement various security limitations. Limitations and/or requirements of the storage of data may be subject to any variety of privacy, security and/or performance reasons.

By further example, in the case of contact information (e.g., names and addresses), the data aggregation server 300 may pull contact information from an Internet portal such as Yahoo!®, from a Microsoft®Exchange® Server and/or from an address book in a mobile device (e.g., client device 220). Alternatively, the client device 220, in conjunction with data aggregation server 300, may synchronize the aforementioned data sources. In this example, the data aggregation server 300 may only retain certain information (e.g., metadata) as that information passes through the server 300 and as that information pertains to identifying and developing potential links between various users of the data aggregation server 300.

In the case of calendar data, for example, that data may be pulled from various data sources (as described above) or may merely be synchronized (as also described above). The calendar data may be immediately pushed from one point (e.g. a desktop) to another (e.g., authorized users) wherein the data aggregation server 300 only retains information pertaining to open-meeting times for the purpose of scheduling or it may store nothing at all.

In the case of content such as pictures, blogs, photographs as may be acquired from Internet portals or websites on the World Wide Web, that content may be immediately pushed to authorized and/or requesting users as the size of the content would likely degrade performance of the data aggregation server 300.

Access module 310 comprises or is otherwise coupled to the software, routines, hardware and/or driver devices necessary to control who and what has access to the data aggregation server 300 and the PIM data and other information aggregated and managed by the data aggregation server 300. Access module 310 may be configured to grant or deny access based on, for example, who is making the access request (e.g., a particular user), where the request is coming from (e.g., location as may be determined by a base station or GPS), when the request is occurring (e.g., time of day), what is making the request (e.g., a mobile device) and how the connection is being made (e.g., SSL).

Access module 310 may utilize a user name/password combination to authenticate a user requesting access. A list of users and/or groups with access to the data aggregation server 300 may be created and stored in an LDAP database controlled by LDAP module 370. This database of groups and users may be installed locally or a reside at a remote machine, a storage area network or any other device/medium at any location so long as it is suited for the maintenance and access of user access data.

Access module 310 may further utilize SSL authentication whereby a user's identity if confirmed by a security certificate. If the certificate is from a trusted authority, then the certificate is mapped to a user's entry in a certificate mapping file. If the certificate maps correctly, access is granted subject to specific rules set for that particular user (e.g., access control lists and access control entries). If the certificate is not from a trusted authority or fails to map properly, authentication fails and access is denied.

Access module 310 may utilize other access control methodologies such as Host-IP access control wherein access is limited or denied to specific clients as specified by hostnames or IP addresses of allowed or blacklisted clients. Wildcard patterns may be used to control access as it pertains to, for example, entire networks.

Access module 310 may further interoperate with presence module 320, location module 330, calendar module 340, groups module 350 and/or contacts module 360 to allow for acquisition of PIM data and other information from multiple sources including desktop PCs, Internet Service Providers, web portals and work directories as is illustrated in FIG. 5 below.

Presence module 320 comprises or is otherwise coupled to the software, routines, hardware and/or driver devices necessary to identify the availability of various subscribers or users of the data aggregation server 300. That is, presence module 320 helps identify who is presently available and through which particular contact methodology they may be contacted.

For example, through application awareness (e.g., a calendar or calendar module 340), presence module 320 may determine that a user is presently in a meeting and therefore unavailable (i.e., not present). Alternatively, presence module 320 may, as a result of a manual setting by a user communicatively coupled to the data aggregation server 300 (e.g., a data connection from a desktop PC), determine that a user is available only through a particular contact methodology and display that information as is appropriate (e.g., available—present—via phone and e-mail).

A second user connected to the data aggregation server 300 via, for example, a mobile device may—as a result of information aggregated and made available by presence module 340—ascertain the present unavailability of a first user in their office (i.e., their presence PIM reflects they are out of the office) and, instead, contact that user on their cellular phone where their presence is currently and affirmatively identified.

Various types of presence may be reflected by the presence module 320. Instant messaging, e-mail, home phone, office phone, cellular phone, SMS, pager and any other form of communication device capable of reflecting availability or unavailability are within the scope of the type of presence information aggregated and managed by presence module 320.

Location module 330 comprises or is otherwise coupled to the software, routines, hardware and/or driver devices necessary to identify the physical location of a subscriber or user of the data aggregation server 300. Location module 330 may be utilized in the context of a GPS-enabled mobile device although such functionality is not necessary for the practice of the present invention.

For example, location module 330 may determine that a particular user is presently working at their computer in their office as a result of querying information managed by the presence module 320. Through other modules or applications (e.g., an address book), location module 330 may determine that the user's work address is located at 901 Marshall Street, Redwood City, Calif. In this way, the location module 330 may make intelligent determinations of data even though certain information may not be directly provided to or aggregated by the module. In this way, information can also be generated or aggregated without the requirement of the aforementioned GPS functionality.

Location module 330, through integration with a third-party system or built-in features present or coupled to the data aggregation platform 300, may also aggregate information to be utilized in the context of location information. For example, the location module 330 may aggregate the necessary data to provide text or visual directions to a particular user as it relates to aggregated location information.

Location module 330 may be further configured to make direct queries of users as to their location or to analyze information as provided by cellular base stations as to general locations of users.

Calendar module 360 comprises or is otherwise coupled to the software, routines, hardware and/or driver devices necessary to aggregate calendar and scheduling information of subscribers or users of the data aggregation server 300 and any metadata that may be associated with the same.

Calendar module 340 may seek to aggregate calendar information from a variety of sources of a particular user, for example a mobile device or handheld calendar and a calendar integrated with a desktop PC or enterprise server. The aggregation of calendar data by the calendar module 340 may aid in providing on-the-go synchronization of calendar information. As calendar information constantly changes and provides the greatest possibility for conflict (i.e., two disparate events at two different data stores for the same time period), an embodiment of the present invention continually aggregated calendar information for 'as soon as possible' availability and/or manipulation via calendar module 340.

The aggregation of calendar data may be provided as part of a specific request to view that information. For example, a user may seek to access calendar information at a desktop PC via their mobile device. That calendar information may be aggregated by the calendar module 340 in addition to being conveyed to the client via a pull operation to the data aggregation server 300 and a subsequent push to the mobile device client. In another embodiment, the calendar information may be pulled from the desktop PC or enterprise server all the way to the mobile device client with a copy of the calendar data being cached by the calendar module 340 as it passes through the data aggregation server 300, which may be integrated a communication management system like that described in FIG. 1.

Similarly, calendar data generated at a mobile device may be aggregated by the calendar module 340 via a pull command at the data aggregation server 300 or via a similar command issued by a desktop PC. Calendar data may also be pushed directly to the calendar module 340 as a result of certain behavior at the mobile client (e.g., the entry of new calendar information followed by a synchronization operation) or part of a regularly scheduled push aggregation operation to the data aggregation server 300. In this way, changes in calendar data that truly occur 'on the go' may be aggregated for subsequent synchronization and/or distribution as is appropriate.

Calendar module 340 may further interoperate with presence module 320 to help provide indicia of presence. For example, a presence indicator may normally be manually set by a user (e.g., 'I am Available' or 'I am Not Available'). In the event that a user fails to provide such a manual setting and the user is unavailable, the user's presence setting may be misleading thereby resulting in other users attempting to contact the user but to no avail thereby defeating one of the purposes of a presence indicator. When the calendar module 340 operates in conjunction with the presence module 320, certain calendar information as aggregated by the calendar module 340 may aid in generating a more accurate indicator of presence as provided by presence module 320. For example, the occurrence of a meeting in a calendar would indicate that a user is unavailable. The presence module 320 may then adjust in light of this aggregated calendar data and make an appropriate reflection of the same. When the meeting ends, presence indicators may be readjusted as is appropriate.

Like all of the PIM data aggregated by the present invention, certain information may be allocated a different degree of privacy or importance. For example, different meetings may be of different importance—that is, the meeting may be of critical importance (e.g., a major merger or acquisition) or of lesser importance (e.g., a company presentation on the new credit union membership). Based on metadata embedded in the calendar data (e.g., 'must attend' or 'important'), additional data is acquired by the calendar module 340, which may then be shared through data distribution or utilized by other modules of the present invention.

Metadata embedded in the calendar data and recognized by the calendar module 340 may also be utilized to reflect additional information not necessarily expressly provided by that calendar data (e.g., in a subject description). For example, calendar module 340, through data aggregation, may determine that while a meeting does not begin until 2.00 PM, because of a 'travel required' metadata indicator, any sharing of this calendar information would reflect that an attempt to schedule a meeting with that user during their 'travel time' would be ill advised despite the fact that the calendar might otherwise reflect availability. In some embodiments, metadata reflecting the need to travel and information relating to the address of the meeting (as expressly provided by the calendar entry or as may be obtained through other applications or aggregated information), may allow for the utilization of mapping technologies to provide a more accurate indicator of the exact travel time required and, as a result, more accurate information to be distributed by the data aggregation server 300.

Numerous metadata indicators may be available to be embedded in calendar data and acquired by the data aggregation server 300 via the calendar module 340, for example: none, important, business, personal, vacation, must attend, travel required, needs preparation, birthday, anniversary, phone call, free, tentative, busy, out of office. Additionally, in an embodiment, a user may be able to generate their own personalized metadata and provide associate rules with regard to the same.

The calendar module 340 of the present invention, in an embodiment, may aggregate information from both personal and professional calendars. The calendar module 340 of the present invention may further aggregate information pertaining to the availability of conference rooms or conferencing equipment. The calendar module 340 may manage aggregated calendar data and take into account time zone differences in calendar data as may later be distributed to users of the data aggregation server 300. For example, the calendar module 340 may make determinations that 1.00 PM calendar information for a user in California translates into different information when accessed by a user in the United Kingdom. Calendar module 360 may further interoperate with the presence module 320 to make determinations of locations and automatically make the appropriate time zone calculations and/or adjustments when aggregating and/or distributing information.

Groups module 350 comprises or is otherwise coupled to the software, routines, hardware and/or driver devices necessary to form groupings of different users or subscribers of the data aggregation server 300. Groups information acquired and generated by the groups module 350 may be explicit like a ListServ; for example, add user A to group X. Groups may also be implicit and generated as the result of intelligent determinations made by the groups module 350.

For example, the groups module 350 may determine that users A, E and G are all employed by Big Co. and will create (if the group does not already exist) and/or add users A, E and G to the Big Co. group list. The groups module 350 may further determine that users B, C and D are all graduates of State University and create and/or add them to the State University group list. The groups module 350 may further determine that users F, H and I are all members of Professional Organization and create and/or add them to the Professional Organizations list. Furthermore, the groups module 350 may determine that users J, K and L are all Family Members and add them to the Family Members list.

Users may be members of more than one group as generated by the groups module 350. For example, user J could be could be a Family Member and also an alumnus of State University thereby warranting their presence of both the Family Members and State University List. Users may be members of only one group. Users may not belong to any group.

Groups may be identified and/or generated as a result of acquiring data from various sources. For example, a Global Address List (GAL) may represent a comprehensive list of e-mail addresses, fax and telephone numbers, and mail stops for the employees and contractors for a particular company. In addition to being a raw source of contact data, the GAL could in and of itself be the basis for generation of a group (e.g., Company Group List).

Contact data aggregated by a contacts module 360 may be categorized and grouped by the groups module 350, may be manually entered (e.g., input by a user) or obtained through a synchronization operation. In any of these instances, the groups module 350 is configured to aggregate the new information and group it properly.

As noted, contact data as aggregated by the contacts module 360 may be implemented by the groups module 350. For example, if the groups module 350 determines that it has incomplete data for a member of a group or a contract entry in general, the groups module 350 may actively seek that member/user's absent information through, for example, accessing a GAL or even an LDAP database comprising user information or another operation in conjunction with the contacts module 360.

Contacts module 360 comprises or is otherwise coupled to the software, routines, hardware and/or driver devices necessary to aggregate contact information from different sources of contact data. While the most common sources of contact PIM data are address books or contacts lists, the contacts module 360 may aggregate data through intelligent operations wherein elements of contact information are identified and more complete information is aggregated for the purpose of generating a more accurate and complete contact profile.

For example, the contacts module 360 may determine that User A contacted the present subscriber via a telephone call but the name and e-mail address of User A is not available—only their phone number. The contacts module 360 would then seek that absent information from various sources such as local directories, username/password stores, the Internet, contact lists of other users, corporate personnel directories or any other sources of information that might link the phone number to more identifying information for use in a contacts profile. Similar queries could be made based on received and sent e-mails or any other indicia of contact or interaction by the user (e.g., SMS and instant message).

The contacts module 360 may further query other information networks and/or data aggregation platforms (e.g., a platform embedded in the network of a separate service provider but with whom the present service provider has an informational sharing agreement) to determine the identity of User A. The contacts module 360 could also directly query the user for the missing information through, for example, an SMS message requesting the information be entered at the mobile device or a desktop PC.

Contact information may also be acquired from various other applications. For example, and as noted above, the receipt of an otherwise unknown phone number can begin the acquisition of contact information such as name, physical address and other identifying contact information (e.g., company, title, etc.). Information may also be obtained from e-mail headers whereby a domain name (e.g., @company.com) may be traced to a particular company or from the body of an e-mail through an e-mail signature or footer. Similarly, instant messages—as a form of contact—may be utilized to generate a profile or parts thereof. Outgoing phone calls, e-mails and SMS messages can be used in a similar fashion.

Calendar data may also be used to acquire contact information as it pertains to, for example, a corporate/work address (e.g., 10 AM meeting at SEVEN Networks, Inc. at 901 Marshall Street, Redwood City, Calif. 94063) of a particular person. Based on that calendar data, the contacts module 360 may determine that the 10 AM with Person X was at Person X's place of employment: SEVEN Networks, Inc. and generate appropriate contact information and profile data concerning employer and business address. In this way, the employment and address information of Person X can be populated without an express input of that information into a particular user/contact profile having ever been made. Similarly, anniversaries, birthdays and other repeating and/or important dates can be associated with particular contacts.

Contact information—and another PIM data for that matter—may be obtained from other profiles of users of the data aggregation server 300 subject to privacy and security profiles. For example, User A may have a complete profile indicating name, phone number, address, employment and e-mail information. User B's profile may only designate employment information, specifically, the name of their employer.

The contacts module 360 of the data aggregation server 300 may, by matching the employment information of Users A and B, populate other fields in User B's profile. For example, User B's profile with regard to a general phone and fax number as well as corporate address can be populated as User B works for the same company as User A, that same information being fully present in the contact information/data profile for User A.

It is envisioned that in some embodiments of the present invention, various Internet spiders or web scraping technologies may be utilized by the contacts module 360 to further acquire presently unavailable information. In such an embodiment, a web scraping module (not shown) could further identify a particular contact/user profile and search various websites for information and news pertaining to that person. If it is determined, during spidering, that this particular person has changed jobs, been promoted or been subject to some other event of news-worthy importance, the contacts module 360 may update certain contacts information/profile data.

LDAP module 370 is a TCP/IP software protocol enabling users to locate organizations, individuals and other resources in an open or proprietary network (e.g., look-up queries). LDAP module 370 makes it possible for almost any application running on virtually any platform to obtain directory information, service data and public keys. LDAP module 370 may be based on the X.500 open standard whereby applications need not worry about the type or location of servers hosting the queried directories. LDAP module 370 may further identify user privileges on a network.

Voice gateway 380 terminates PSTN traffic from callers. Voice gateway 380 may comprise an automated speech recognition engine (not shown) to perform speech recognition; a dual tone multi-frequency (DTMF) module (not shown) for recognition of key tones; and audio playback and record components (not shown). Voice gateway 380 may further comprise a Voice Extensible Markup Language (VXML) interpreter (sometimes referred to as a voice interpreter) (not shown) for interpreting VXML markup, playing synthesized speech and/or listening for user responses in the instance of automated speech recognition.

Other modules may be introduced to the data aggregation server 300 so long as they do not interfere with the aggregation and management of PIM data from various sources such as an enterprise server or PC or those other sources as exemplified in FIG. 5 below.

Figure 4:
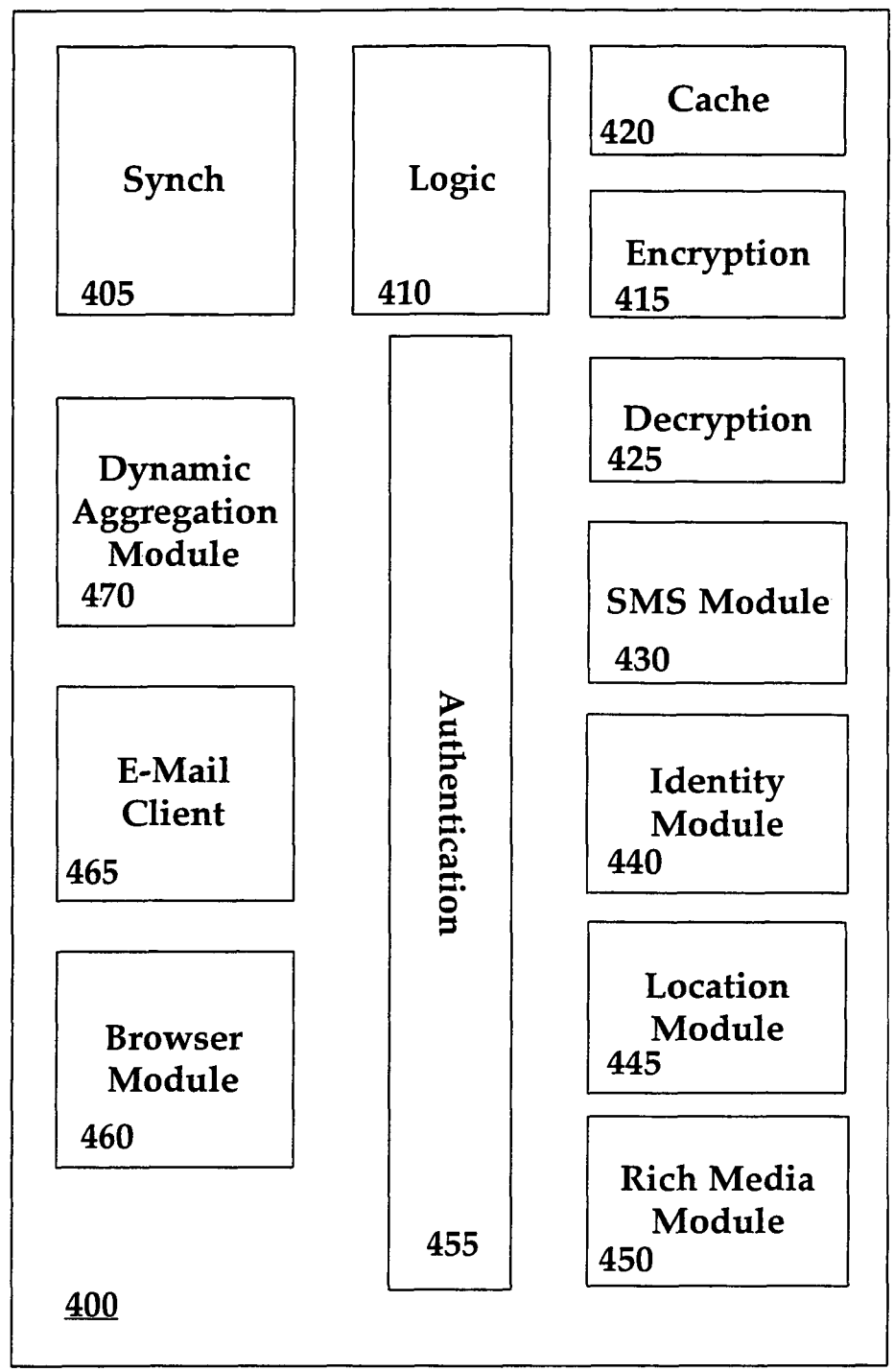
FIG. 4 is an exemplary client device allowing for access to and manipulation of dynamically aggregation personal and professional contact information.

FIG. 4 is an exemplary client device 400 (170) allowing for interaction with and manipulation of dynamically aggregated personal and professional contact information. Device 400 may be any variety of portable devices such as a SmartPhone, PDA, mobile device, tablet PC and so forth. Device 400 comprises various modules (e.g., synchronization module 405, logic module 410, etc.).

The present device 400 is exemplary; additional or differing embodiments of the present invention may lack certain modules (e.g., location module 445) and/or may comprise additional modules such as an enhanced user interface framework.

Synchronization module 405 comprises or is otherwise coupled to the software, routines, hardware and/or driver devices necessary for updating or backing up data on one device with a second device. The most common instance of synchronization occurs between a mobile device (e.g., a PDA or a SmartPhone) and a desktop computer running a desktop connector or coupled to a server hosting synchronization software.

While synchronization may be the result of a physical coupling of the mobile device to the desktop computer (e.g., through a desktop cradle and cable), the pervasiveness of wireless technology (e.g., CDMA2000, 1xRTT, FOMA, GSM/GPRS, UMTS, i-Mode, MOPERA, EDGE, WCDMA, Bluetooth and Wi-Fi) and related devices as well as improvements in encryption technology (e.g., AES 128-, 192- and 256-bit keys) now allow for synchronization to occur wirelessly while a user of the mobile device is away from their office. Physical presence of the synchronizing device with the synchronized device is no longer required.

Various improvements in 'push' and 'pull' technology further allow for more than mere 'backing up' of data through a synchronization operation but also to receive and retrieve data in real-time. For example, the aforementioned SEVEN Server Edition software is a server-based, behind-the-firewall mobile service that provides end-users with real-time access to corporate and personal data such as Microsoft Exchange, Lotus. Domino, IMAP4 and POP3 email; calendar; corporate directories; personal contacts; and documents.

Logic module 410 comprises or is otherwise coupled to the software, routines, hardware and/or driver devices necessary for data manipulation and control functions. In the case of hardware, logic module 410 is comprised of circuits that perform an operation. In the case of software, logic module 410 is the sequence of instructions in a program. Logic module 410 may be comprised of both hardware and software, only software or only hardware. As is known in the art, the hardware of logic module 410 may implement the software of logic module 410. Certain software in the logic module 410 may be implemented by other modules or hardware components of device 400.

Encryption module 415 and decryption module 425 are responsible for the encryption and decryption, respectively, of data exchanged between device 400 and communication management system 110, which may include data aggregation server 210. Encryption module 415 and decryption module 425 may, in some embodiments of the present invention, operate in conjunction with other modules such as authentication module 455 to allow for encryption of authentication information related to network and service access. Other embodiments of the present invention may utilize the encryption and decryption modules 415/425 for the purposes of exchanging data and information directly between mobile devices, for example, between Bluetooth enabled mobile devices.

An example of an encryption algorithm that may be utilized by encryption and decryption module 415 and 425, respectively, is the 128-bit Advanced Encryption Standard (AES), which is based on Federal Information Processing Standard (FIPS) 197. The disclosure of the FIPS 197 is incorporated herein by reference. Another encryption methodology within the scope of the present invention is the Diffie-Hellman (DH) secret-key negotiation (sometimes referred to as the Diffie-Hellman-Merkle key exchange). The algorithm for DH secret-key negotiation is disclosed in U.S. Pat. No. 4,200,770, the disclosure of which is incorporated herein by reference. DH secret-key negotiation is a cryptographic protocol that allows two parties to agree on a secret key for use over an insecure communications channel; the key can then be used to encrypt subsequent communications using a symmetric key cipher.

In an embodiment of the present invention, various data types are exchanged between the device 400 and communication management system 110, which may include dynamically aggregated data such as presence data. Such data, when being transmitted from device 400, may be encrypted by encryption module 415 using 128-bit AES or DH secret-key negotiation. Similar methodologies and algorithms may be used to decrypt information received by device 400 and decryption module 425.

In some embodiments of the present invention, encryption/decryption modules 415/425 may further prevent the storage or write-to-disk (e.g., proxy caching) of transmitted/received data to further improve security whereby no one but authorized users can read or access data.

Additional embodiments of the prevent invention may provide for the encryption module 415 to obliterate data stored on the device 400 or 'lock-down' the device 400 should a user of device 400 report device 400 stolen or initiate an obliteration or lock-down command from communication system 110, server 125 or PC 130.

Establishing end-to-end encryption may comprise the submission of security credentials upon initial registration of a device 400 with communication management system 110. These credentials may be used to later authenticate the user and provide access to appropriate data and resources at the communication management system 110. In an embodiment of the invention, these security credentials are not stored outside of the system 110 architecture, which provides for improved security.

In one embodiment of the present invention, during the registration process a unique, encrypted authentication token is exchanged between the mobile device 400 and communication system 110 whereby the user of the device 400 will be able to access resources at the communication system 110 without being required to submit credentials upon each subsequent login. Security credentials may be enabled by the user of the device 400 and/or communication system 110 or by an IT administrator who may set various security policies for the device 400, communication system 110 and related network.

For example, an administrator may implement a username/password policy whereby users are required to login using a name and password. Administrators may also enable or disable a browser mode wherein users may be able to access data not only through a mobile device 400 but also through a secure Internet web browser utilizing, for example, 128-bit SSL encryption. Certain policies (e.g., user name and password) may also be made time sensitive whereby a login expires every 'X' days. Administrators may also control the obliteration of data in devices 400 in the instance that a device 400 with access to behind-the-firewall data is lost or stolen.

In an embodiment of the present invention, encrypted data transmitted to and/or received from mobile device 400 may utilize digital signature algorithms such as SHA-1, a secure hash algorithm, as disclosed in FIPS 180-2, the disclosure of which is incorporated herein by reference. The use of a digital signature algorithm provides additional protection against the modification of data as it passes through a network, even though the data is independently encrypted (e.g., using AES).

In yet another embodiment of the present invention, encrypted data transmitted to and/or received from mobile device 400 may further utilize a multi-channel encryption protocol whereby a single block of data comprises multiple separately encrypted sections, each destined for a different endpoint. For example, a block of data may comprise a header section, which is accessed for routing purposes and a body section, which comprises several e-mail messages destined for the device 400. Each section of data may be encrypted with a separate key whereby the routing information may be decrypted without requiring access to the e-mail message data.

In still another embodiment of the present invention, a Virtual Private Network (VPN) may be utilized adding yet another layer of security on top of a SSL. These various embodiments may be implemented individually, collectively, or in a piece-meal fashion depending upon the particular security concerns of the data accessed and generated by device 400.

Application cache 420 comprises or is otherwise coupled to the software, routines, hardware and/or driver devices necessary for storing application data in memory as opposed to constantly looking up, loading, reading and executing the application data from another location. Application cache 420 helps improve the processing speed of device 400.

Application cache 420 may be configured so that every time data is instantiated or called, the data is time-stamped. A clean-up process will occasionally remove all instances of data that are beyond a certain age as reflected by the time-stamp. By time-stamping and removing stale data, there is increased certainty that the cache 420 and the data that would otherwise be called from its native environment are synchronized. Data stored in application cache 420 may, if necessary, be manually removed. Such manual deletion may be required in instances where data is in error or has otherwise been corrupted and is preventing proper synchronization.

SMS module 430 comprises or is otherwise coupled to the software, routines, hardware and/or driver devices necessary for initiating a synchronization operation in response to the receipt of an SMS message, which may include interaction with the synchronization module 405.

For example, an SMS message is sent from a mobile device or an SMS-gateway website and received at a network operator's Short Message Service Center (SMSC). The SMS message is then stored and forwarded from the SMSC to the recipient mobile device. If the recipient device is off or out of range, the SMS message is stored at the SMSC and delivered at the next possible opportunity or until it expires as determined by network and/or SMSC settings.

In addition to sending messages, SMS can be used to transport data to a handset; for example, ring tones and operator logos. In conjunction with the Wireless Application Protocol that allows for Internet access from a mobile device and the General Packet Radio Service, configuration data for a particular device can be delivered via an SMS message (e.g., allowing for remote configuration of a WAP browser by a service provider or mobile operator).

SMS messages may also be used to indicate the receipt of new voice mail or e-mail messages on a mobile device. SMS functionality is also of particular benefit in the context of data synchronization, especially real-time access to e-mail. Many email synchronization systems merely provide for a regularly scheduled synchronization (e.g., every 15 minutes) in order to limit the consumption of bandwidth and/or to preserve battery life on the client device. Such a synchronization schedule deprives the mobile client user of real-time access to their email as exemplified by the arrival of a critical message just seconds after the completion of a timed-synchronization operation.

The arrival of new data that meets user specified qualifications (e.g., sender, importance, subject content, message content, etc.) may result in the generation of an SMS message that is delivered to the mobile device. The SMS module 430, upon receipt and processing of the SMS message and any instructive or identifying data contained therein, may initiate a synchronization operation in conjunction with the synchronization module 405. For example, upon receipt of an SMS message from a server or other computer associated with device 400, the SMS module 430 may instruct the synchronization module 405 to begin a synchronization operation with the server or associated computer.

Initiation of the synchronization operation may be governed, however, by certain limitations of the device 400. For example, if the user of the device 400 is presently engaged in a telephone call, the synchronization operation will not take place. Further, if the user is engaged in a high-bandwidth operation (e.g., receiving streaming media) or is low on battery power, the device 400 may not effectuate the synchronization operation. Such governance may be under the control of SMS module 430, synchronization module 405 and/or other components of the device 400 (e.g., logic module 310).

Identity module 440 comprises or is otherwise coupled to the routines, hardware, driver devices and various device identification tools that may be used to control access to various communications networks and utilization of certain services by the device 400. For example, identity module 440 may be comprised of an Advanced Intelligent Network (AIN) sub-module (not shown) allowing for access to the AIN. The AIN is a switched voice and data network architecture comprising a variety of network elements allowing for open, interfaced, multi-vendor, telecommunication capabilities. Through these various capabilities, phone companies and service providers are able to define and customize, test and introduce service offerings such as multimedia messaging and cell routing. The AIN, by further example, allows a wireless user to make and receive phone calls while 'roaming.'

Optional location module 445 comprises or is otherwise coupled to the routines, hardware—including a GPS receiver (not shown)—and driver devices necessary for GPS functionality in a GPS-equipped device. Signals emitted by GPS satellites arrive at a GPS receiver in the device 400 whereby the GPS receiver can calculate its location in relation to GPS satellite transmissions through a process known as trilateration. Through trilateration, a GPS receiver measures the distance from the GPS satellite using travel time of the GPS satellite signals and thereby pinpoints the physical location of the GPS receiver.

Optional location module 445 may further comprise the Assisted Global Positioning System (A-GPS). A-GPS uses a combination of GPS satellites and cellular phone base stations to pinpoint location of the mobile device and its GPS receiver and to offer a determination of location that is more accurate than GPS alone. Mobile device GPS receivers, in correlation with an estimate of the mobile handset's location as determined by a cell-sector, can predict with greater accuracy the GPS signal the handset will receive and send that information to the mobile device handset. With this assistance, the size of the frequency search space is reduced and the time-to-first-fix (TTFF) of the signal is reduced from minutes to seconds. A-GPS handset receivers can also detect and demodulate signals that are weaker in magnitude than those required by a traditional GPS receiver. The interaction of A-GPS in a synchronized network or with an assistance server (not shown) in an asynchronous network is generally known in the art.

Rich media module 450 comprises or is otherwise coupled to the software, routines, hardware and/or driver devices necessary for enabling rich media in device 400. Rich media includes, but is not limited to, scalable vector graphics, streaming video, animation and Multimedia Messaging Service (MMS). MMS enables the creation, deliver and receipt of text messages that also include an image, audio, and/or video clip. MMS messages may be sent from one mobile device to another or to an e-mail address. MMS generally uses the Synchronized Multimedia Integration Language (SMIL) to define the layout of multimedia content. SMIL is a markup language allowing for the separate access of audio, video and images followed by their subsequent integration and playback as a synchronized multimedia presentation.

Authentication module 455 comprises or is otherwise coupled to the software, routines, hardware and/or driver devices necessary for authenticating device 400 with regard to the presence of device 400 on a particular network or access to particular services and/or access to data at remote location (e.g., a desktop computer or enterprise server via communication system 110). Authentication module 455 may work in conjunction with SIP Stack (not shown) and/or identity module 440 with regard to performing authentication routines and/or accessing to network services such as communication system 110. Authentication module 455 may, in some embodiments, further operate with one or more other modules present at device 400 such as synchronization module 405, and encryption and decryption modules 415 and 425. Authentication module 455 may further operate with server- or network-side applications such as an IP or SIP Gateway or access module.

Authentication module 455 may rely on pre-call validation wherein the MIN and ESN of the device 400 are verified before a call is processed (i.e., before a call is originated or received). Authentication module 455 may utilize a challenge/response process as governed by the Cellular Authentication and Voice Encryption (CAVE) algorithm. A mobile device seeking access to a particular network inputs several parameters into the CAVE algorithm and transmits the result to a Mobile Switching Center (MSC), which controls the switching elements of a cellular system; the MSC makes the same calculations and compares the results. If the results match then the device 400 is deemed authentic and to have legitimate access to the network; if the results do not reconcile with one another (e.g., in the instance of a cloned phone), device 400 is denied access.

Additional authentication methodologies may be utilized by authentication module 455 including Radio Frequency (RF) Fingerprinting. Just as no two human fingerprints are exactly identical, transmission characteristics vary slightly between individual cellular phones. Technical details such as phase noise and harmonic spectra can uniquely identify a particular cell phone transmitter. By checking this transmitter signature against a known good signature, an RF fingerprinting system can determine whether a cell phone trying to place a call is authentic or an impostor.

Browser module 460 comprises or is otherwise coupled to the software, routines, hardware and/or driver devices necessary for enabling web browsing in a mobile device, for example, HTML and XHTML browsers. Browser module 460 may operate in conjunction with rich media module 450 to the extent a browser enabled by the browser module 460 is utilized to access a web page comprising rich media, for example, streaming media.

Browser module 460 may utilize the Wireless Application Protocol, an open international standard for applications that use wireless communication and that allows for small, consumer-class wireless devices to access the Internet. As wireless devices do not need a complete web browser implementation to provide web access, a WAP gateway provided by a network service provider may act as a go-between with a Hyper Text Transfer Protocol (HTTP) server to reduce the amount of data that needs to be sent to the device 400 by offloading computational requirements from the phone to the gateway.

For example, through this offloading methodology, only the fundamental elements of a web page will be transmitted to device 400 whereby the total number of bytes of data transmitted is reduced. The gateway may identify these fundamental elements by identifying Wireless Markup Language (WML) or Wireless Extensible Markup Language (WXML) tags embedded in the web page accessed. Once non-essential data has been stripped from the web page, the page is sent to the wireless device using a lightweight transport stack such as the Uniform Datagram Protocol (UDP).

Use of the WAP architecture in browser module 460 may further comprise the utilization of sub-protocols such as the WAP application environment (WAE); the session-layer Wireless Session Protocol (WSP); the transaction-layer Wireless Transaction Protocol (WTP); the security-layer Wireless Transport Layer Security (WTLS); and/or the Wireless Datagram Protocol (WDP).

E-mail client 465 comprises or is otherwise coupled to the software, routines, hardware and/or driver devices necessary for enabling e-mail access in device 400. For example, e-mail client 465 allows for access to e-mail messages received in an e-mail architecture such as Microsoft Exchange 5.5 2000, 2003; Lotus Domino R5, R6, R6.5; IMPA4; and POP3 and IMAP-accessible Internet e-mail. In conjunction with other modules, for example the SMS/Push module 430 and encryption and decryption modules 415/425, e-mail client 465 may access e-mail as it arrives at a remote e-mail server or desktop computer that is integrated with or coupled to data aggregation server 210 through, for example, a push and/or pull synchronization function.

E-mail client 465 may also allow for traditional user-to-user electronic mail communications, for example, delivery of a message to an e-mail address associated with a particular mobile device rather than the address of a desktop computer where that message is subsequently forwarded to an associated mobile device.

E-mail client 465 may be a client developed for a specific mobile device or operating environment. E-mail client 465 may also be a platform portable client. E-mail client 465 may comprise additional functionalities beyond simple receipt/review and generation/delivery of e-mail. E-mail client 465 may further comprise address book functionality. Such address book/contact functionality and the related contact data (e.g., individuals, their e-mail addresses, phone number and other data) may be directly integrated with the e-mail client 465 or separate memory (not shown) in the device 400. The address book functionality/contact data may also be embodied in a sub- or secondary module coupled to the e-mail client 465 (not shown). In some embodiments, such address book functionality and contact data may be stored remotely, for example, at the communication system 110 or at a server or desktop computer coupled to the device 400 via the communication system 110 and a data connection (e.g., a wireless connection between the communication system 110 and device 400 as well as a related connection between communication system 110 and server 125 or PC 130).

The address book functionality and contact data may be utilized to create an interactive, networked experience in conjunction with, for example, dynamic aggregation module 470 as further discussed herein. Utilizing contact data may contribute to a community-like experience including enhanced presence, peer-to-peer communication and information sharing.

Dynamic aggregation module 470 comprises or is otherwise coupled to the software, routines, hardware and/or driver devices necessary for enabling access to and interaction with certain other modules at the device 400 (e.g., e-mail client 465) and data aggregation server 210 (e.g., presence module 320, location module 330, calendar module 340 and groups module 350) allowing for the dynamic aggregation of information from various users and/or data depositories and the utilization and display of that information for various functionalities, such as group calendaring functionality. Dynamic aggregation module 470 organizes, filters and presents information from multiple inputs concerning context, relationship and communication means.

FIG. 5 is an illustration of exemplary networked relationships 500 amongst a variety of sources of PIM data (530-580) and a data aggregation server 510 as may be found in the present invention.

Data aggregation server 510 is an aggregation server like that described in FIGS. 2 and 3 and as may be integrated with or otherwise communicatively coupled to a service provider communications network 520 (e.g., Cingular Wireless or AT&T Inc). The data aggregation server 510 is coupled to various sources of PIM data such as PCs 530, enterprise servers 540, mobile phones 550, instant messaging networks 560, ISPs 570 or other information sources such as PDAs or Smartphones 580.

While FIG. 5 reflects direct connections between the data aggregation server 510 (via service provider communications network 520) and these various sources of PIM data 530-580, this is not suggest the requirement or existence of a point-to-point or direct connection. For example, mobile phone 4550 will be connected to the data aggregation server 510 through not only the service provider communications network 520 in addition to a variety of base stations and other intermediate communications networks (not shown). Similarly, a computer network as provided by PC 530 or enterprise server 540 will comprise a series of routers between the source of information (e.g., the PC 530) and the data aggregation server 510. Similarly, an Internet portal 570 like Yahoo!® or an IM network 560 like that offered by America Online™ will comprise a series of gateways, servers and/or other intermediate software and/or hardware before becoming communicatively coupled with the local and wide area networks that will further couple the Internet portal 570 or IM network 560 to the data aggregation server 510 via the service provider communications networks 520.

PC 530 may be any type of home computing device; for example, a desktop computer or a laptop computer like PC 130 in FIG. 1. PC 530 may be coupled to data aggregation server 510 via an ISP such as AT&T Inc., which provides DSL service or a dial-up service provider such as America Online™. The present invention envisions the use of a variety of communication channels for communicating between a PIM data source and the data aggregation server 510, for example, the aforementioned DSL and dial-up services as well as satellite and wireless communications. Other communication mediums may be utilized as well, such as Bluetooth or InfraRed. No limitation as to the use of a particular communication medium is meant to be imposed by the present invention nor is there meant to be the requirement of a homogeneous communication link between the PIM data source and the data aggregation server 510 (e.g., there need not be—nor will there usually be—a single DSL link all the way between PC 530 and the actual data aggregation server 510).

PC 530 may be equipped with connection software allowing for the establishment of a data connection between the PC 530 and a communications management system (like that described in FIG. 1) whereby data may be synchronized with an associated mobile device (e.g., mobile device 550). Such a data connection may allow for the redirection of, for example, e-mail and mobile access to PIM data residing in a memory store at the PC 530.

Enterprise server 540 shares similarities to PC 530 with the exception that the enterprise server 540's architecture is more complex with regard to the introduction of not only the server but often a series of additional application servers, data stores and work stations that may resemble (or be the same as) a computing device like PC 530. Enterprise server 540 may be exemplified as a Microsoft® Exchange Server or a Lotus® Domino Server from IBM to manage the receipt, storage, delivery and access to e-mail as well as other application and PIM data. An enterprise server generally serves a larger group of users via a server-client relationship whereas a single PC (e.g., a home computer) generally serves an individual user. Enterprise server 540 may also comprise a software connector allowing for redirection and access to e-mail and other corporate data to an associated mobile device (e.g., mobile device 550) via a communications management system like that described in FIG. 1.

Mobile device 550 may be a cellular device allowing for Internet or other data access whereby a data connection with a communications management system (like that in FIG. 1) and/or data aggregation server 510 may be established. In an exemplary embodiment of the present invention, the network architecture and service provider communications networks 520 of a mobile service provider may be directly integrated with the data aggregation server 510 of the present invention. Data aggregation server 510 may also be integrated with other network operators (e.g., shared by a plurality of service providers) or communicatively coupled to another service provider communications network 520 comprising its own data aggregation server 510 (e.g., a data aggregation server in the Cingular Wireless network may be coupled to a data aggregation server in a Sprint Nextel network).

IM network 560 provides the necessary functionality (e.g., hardware and software) to allow for real-time, text-based conferencing over the Internet or another communications network between two or more people. Many IM providers now offer the integration of still-images, avatars, audio clips and, in some instances, video clips as a part of the IM experience. IM network 560 may also provide a series of contact lists or 'buddy lists' that function as a source of contact information (i.e., PIM data) utilized by the data aggregation server 510 and, more specifically, a groups module as described in FIG. 3. An example of an IM network service provider is America Online™. America Online™ provides instant messaging not only to America Online™ dial-up service subscribers but also as an independent application that may be downloaded and installed on a desktop computer (e.g., PC 530) or, as is increasingly common, a mobile device (e.g., mobile device 550).

Internet portal 570 may be a single point for the access of information over the Internet, specifically, the World Wide Web. Yahoo!® is an example of an Internet portal 570 that provides a comprehensive single point of access for, conceivably, any information the average individual would need from the World Wide Web; for example, a search engine, maps, news, weather, e-mail, calendaring, various other forms of PIM data and so forth. Consistent with being a single offering, Internet portal 570 may offer a variety of other services including instant messaging (e.g., Yahoo!® Messenger) or even Internet access (e.g., Yahoo!®/SBC® DSL). By logging on with a user ID and password, Internet portal 570 may also allow for the generation and customization of personal pages wherein the user can request the delivery of and direct the layout of particular information, including PIM data.

For example, a particular user may want headline news pertaining only to the San Francisco area but also desires weather reports in Sunnyvale, Calif., and San Francisco, Calif., as the user might live in one location and commute to the other for work. Similarly, the user may be a transplant from the East Coast and still actively follow sports teams on the East Coast. As such, the user may further organize their personal page to display sports scores concerning the Boston Bruins hockey team and the Boston Red Sox baseball team instead of information concerning the San Jose Sharks and San Francisco Giants, which might otherwise be logically be displayed in the context of news and weather for the San Francisco region.

As noted, certain of this information may be utilized in the context of identifying and generating PIM data aggregated by the data aggregation platform 510. For example, a personal calendar displayed on the user's personal page; an address book linked to the user's personal page and so on.

PDA 580 may be a portable device offering, for example, notepad and calendar/scheduling functionality. PDA 580 may have certain network functionality to allow for data exchanges with other PDAs or compatible devices as well as a larger communications network enabling synchronization with a home or work computer where a companion calendaring program may be installed. Many PDA functionalities have been incorporated into the likes of mobile device 550 or smart phones.

The various aggregation modules of the data aggregation server 510 may acquire data from these various information sources of PIM data through integration with a particular data source. For example, the data aggregation server 510 may be integrated or configured to access and operate with an instant messaging network 560 like that offered by America Online. That is, America Online and a service provider implementing the data aggregation server 510 may reach an agreement allowing access of the data aggregation server 510 to the instant messaging network 560 thereby providing near unfettered access and certain sharing of information between the two systems as a result of systematic design. Once the data aggregation server 510 is implemented/integrated with, for example, the instant messaging network 560, data aggregation may commence unabated as the data aggregation server 510 operates as if it is a normal operating presence in the network.

The various aggregation modules of the data aggregation server 510 may also act as a proxy with the proper user credentials to access a particular information network. For example, the data aggregation server 510 may be provided by certain user name and password information to access an Internet portal 570 like Yahoo!®. That is, a user of the services offered by the data aggregation server 510 would provide their user name and password to the data aggregation server 510, most likely during a registration or subsequent account update procedure. Thus, any time the data aggregation server 510 seeks to access the Yahoo!® Internet portal 570 to acquire information from, for example, an online/webpage calendar, the user's username and password will be provided to the Yahoo!® Internet portal 570 just as if the user were sitting in front of a keyboard and display and manually entering the information. Once access is granted to the Internet portal 570, aggregation of information may commence.

In some instances, various authentication tokens or cookies might be granted by various PIM data sources either as the result of a request to access certain PIM data or as a result of a correct username/password combination. Various security methodologies as discussed in the context of, for example, access module 310 (above) may also be applicable with regard to establishing credentialed relationships between the data aggregation platform 510 and various sources of PIM data.

It some instances, it is perceived that a combination of data aggregation methodologies may be necessary. For example, username and password for certain PIM data sources and system integration for others.

The data aggregation server 510 also provides for the aggregation of data from amongst different users of the service. For example, one user may provide his various user names and passwords in order to access certain PIM information stored in that particular users different PIM sources such as an instant messaging network 560 or an Internet portal 570. But aggregating one user's information does not help to create a network of information. In order to build a larger informational community, access to other user's PIM data is required. But while an instant messaging network5 may allow the data aggregation server 510 access based on system integration or username/password combinations (either directly or by proxy), any secure system will be unlikely to allow a first user to access a second user's information without some sort of permission.

While that permission may be explicitly granted by another user (e.g., User B grants User A to access their information at instant messaging network 560), such an arrangement is unlikely because of security and privacy concerns of both the instant messaging network 560 and the user. For example, a user may have no qualms about granting another user information about certain information on an instant messaging contacts list (e.g., professional colleagues with whom both users interact in the office) but will likely be hesitant to share information concerning family members or other personal relationships. Control of who receives what information can cause the implementation of an entire new layer of security or management software that the instant messaging network 560 may be hesitant to implement because of costs or other concerns.

Such a concern is the fact that most instant messaging network (like America Online) are not in the business of providing an open network. That is, these services provide an instant messaging service to individual users and subscribers and it is up to those individual users to determine who knows who is on their contacts list; that is, America Online will not provide that information to other users. While data representative of that information may be stored by the instant messaging service that service will likely make every effort to keep that list secure and private from all other users. The service provider offering means to share or network this contact or other PIM data is unlikely due to, at the least, privacy and business/commercial relations in the marketplace.

The present data aggregation server 510 overcomes this hesitancy of different PIM data sources to openly share information. For example, User A and User B are both members/users of the data aggregation server 510. User A may provide certain security information to the data aggregation server 510 in order to access the aforementioned instant messaging network 560. In this way, User A can aggregate PIM data from his instant messaging network account (e.g., members of his contacts lists, those members instant messaging IDs and so forth). User A will unlikely have immediate access to similar PIM information held in an account assigned to User B for at least the reasons discussed above. Notwithstanding, User B will have provided certain security information to the data aggregation server 510 to allow the collection of PIM data in his account.

While an instant messaging network 560 may not be obliged to provide a system for sharing PIM data amongst its users, the present data aggregation server 510 does provide such interactions. User A will set up certain permissions with the data aggregation server 510 to allow User B to access User A's PIM data. User B will provide similar permissions such that User A may access User B PIM data. The permissions system of the data aggregation server 510 also allows for setting of limitation on who may access what information. Therefore, User A may allow for User B to access his contacts information—but not his calendar information. Similarly, User B may allow User A access to his calendar information but not his presence information. Permissions may be assigned to individuals via, for example, contacts module 360 or to groups of individuals as may be determined by the groups module 350. In one embodiment of the present invention, a permissions module (not shown) may govern these relationships. In another embodiment, such permissions may be governed by the access module 310.

Sub-permission levels may also be set in the data aggregation server 510. For example, User A may be able to access User B's calendar information—but only particular aspects of his calendar information as may be governed by, for example, metadata. Similar limitations may be set with regard to other PIM data (e.g., access only to personal contacts and not professional contacts).

The shared PIM data (via permissions) of the data aggregation server 510 enables the creation of a growing network of contacts and relationships. For example, User A may know User B; User B, in turn, may know User C. As a result of this single-degree of separation, User A may now have access to User C's contact information. Additional permissions may be set with regard to how many degrees of separation information is shared (e.g., only with persons on my contact list or with persons on the contact lists of persons on my contact list).

Additional permissions may be imposed with regard to aggregating data to complete incomplete data records. For example, User A may have an entry for John Doe but no phone number for John Doe. User B, however, may know John Doe as well and have a complete data entry (e.g., name, phone, address, birthday, etc.). Permission settings may be established wherein the data aggregation server 510, on behalf of User A, accesses the data of User B to gather the remainder of this contact information (e.g., phone number). While User A may now have a complete data record for John Doe, he may be entirely unaware of the source of that information. That is, User A may now know that information was aggregated from PIM data of User B or that John Doe is on User B's contacts list.

Access to various PIM data of other users by the data aggregation server 510 occurs as a result of the operation and interaction of various modules within the data aggregation server 510.

In this way, certain protocol limitations may also be overcome in that it is not necessary for User A (who might be a Yahoo!) user to directly communicate with an America Online system for the purposes of acquiring information about User B. User B, instead, directly interacts with the America Online system and then User B shares that information with User A in a common protocol.

Notwithstanding the protocol particularities of certain networks or PIM data sources, the present invention may, in an embodiment, utilize whatever protocol is necessary to communicate with that network/PIM data source in a way that the particular network/PIM data source will understand communications from the various modules of the data aggregation server 510. For example, the present invention would communicate with the Yahoo!® Internet Portal with regard to e-mail using IMAP. The present invention would communicate with a Microsoft® Exchange® Server using MAPI and so on. Distribution of data, too, may require the use of multiple protocols. For example, TCP/IP for a standard data connection to, for example, a desktop computer but use of WAP for communicating with a wireless device. In that regard, the present invention may be multi-protocol based.

Figure 6F:
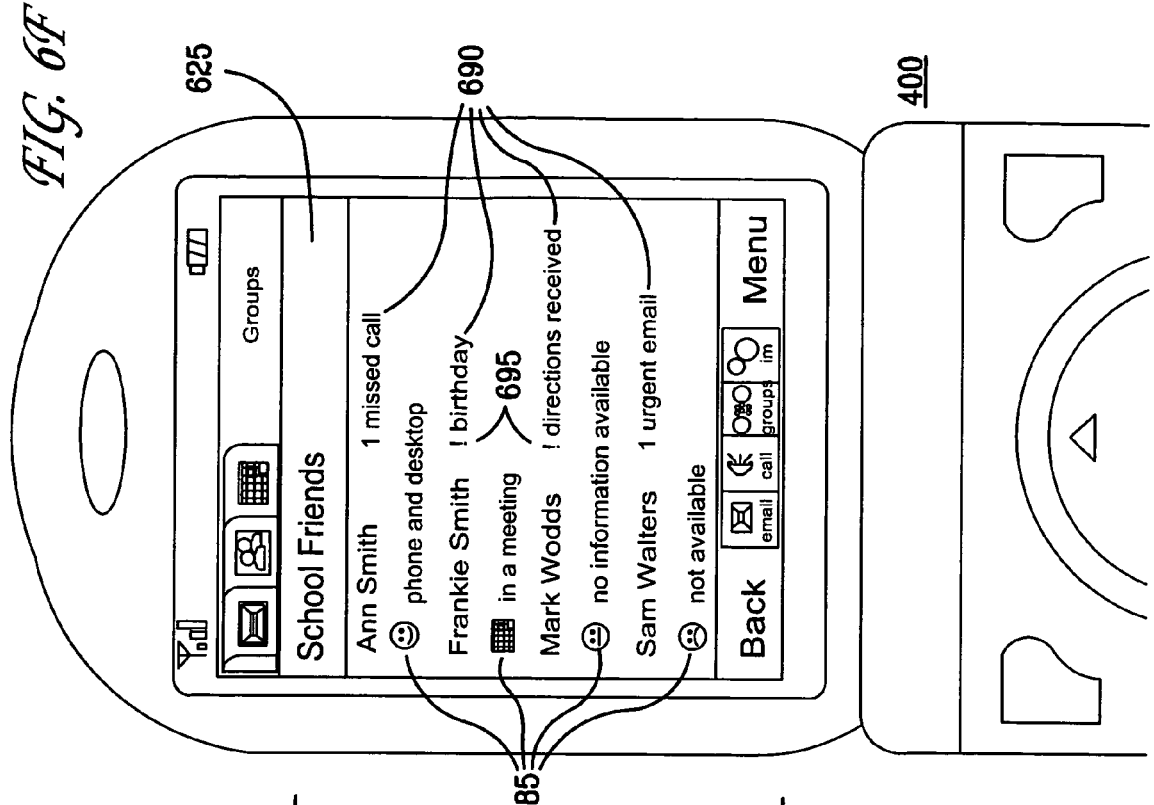

FIGS. 6A-6F are exemplary embodiments of a series of groups lists and functions as enabled by groups module 350 at server 300 (210). FIG. 6A is an exemplary device 400 like that illustrated in FIG. 4. Device 400, through dynamic aggregation module 470, has displayed all contacts 600 for the user of device 400. The list of contacts 610 includes a groups list 620. Groups list 620 in FIG. 6A is presently in a minimized status, which allows for the preservation of display space.

FIG. 6B is also an exemplary device 400 like that illustrated in FIG. 4 and referenced in FIG. 6A. The groups list 620 has, in FIG. 6B, been expanded to reflect individual group lists 625. In the present figure, individual group lists 625 include a Family List, an Office Group List and a School Friends List.

FIG. 6C is also an exemplary device 400 like that illustrated in FIG. 4 and referenced in FIGS. 6A and 6B. The expanded groups list 620 has, in the present illustration, been limited to a particular individual groups list 625, in this case the School Friends List. Individual groups lists 625 may be selected through five-way navigation, a built-in QWERTY keyboard, a stylus or any other data entry and selection method as is present in a particular device 400.

In FIG. 6C, the individual groups list 625—School Friends—reflects the members 630 of that particular individual groups list 625. All other contacts 610, including those presently a part of individual groups list 625, are concurrently displayed in a split-screen format. In some embodiments, only the members 630 will be displayed; other embodiments will allow for the display of members 630 as well as all other contacts 610 as is the case in the present display embodiment.

Through the concurrent display of all contacts 610 and members 630, a user may be able to add individuals from the all contacts list 610 to the members 630 list. In the present embodiment, the name 'Pat Wong' is highlighted. Through selection and verification of the intention to add 'Pat Wong' to members 630 list, the contact identity for Pat Wong will be replicated on the members 630 list of individual groups list 625.

FIG. 6D illustrates a setting screen 640 as it pertains to members 630 of an individual groups list 625. Setting screen 640 is used to set preferred contact methods 645, permissions 650 for a particular individual or particular members 630 and expiration dates 655 as they pertain to the present settings 640.

In the present setting screen 640, members 630 of the School Friends individual group list 625 are being informed of the present user's preferred contact method 645. In the present example, the preferred contact method 645 is the personal e-mail of the user. This means that members 630 of the individual groups list 625 'School Friends,' when accessing contact information on the data aggregation server 210, will be able to view the personal email address of the present user as well as related presence information with this address. Members 630, having been informed of preferred contact method 645, should contact the present user via the personal e-mail address as it is the preferred contact method 645.

Permissions 650 are the different levels of informational access granted to group members as they pertain to the particular user of the data aggregation server 210. For example, in the present settings 640, other members 630 of the present group 625 are allowed to view calendar information of the user but only as it pertains to free time and whether the present user is busy or unavailable. Location information of the user is also available but only following a request that must be approved by the user. Additional permissions may be set, such as presence (e.g. on-line or off-line for particular services) or different information as it pertains to calendar metadata (e.g., cannot miss appointments, birthdays, anniversaries and so forth). Permissions are limited only to the extent of information that may be aggregated by server 210. That is, as more information becomes available through data aggregation, new permissions will develop, evolve and be implemented through server 210 or manually at device 400.

Expiration 655 sets the date at which the present settings 640 expire. For example, a user may be engaged to work on a particular project with a particular group of colleagues. The user may want to have this particular group (perhaps known as Project Colleagues) to have access to certain contact information and permissions—but only while the project is ongoing. As such, the user can arrange—via expiration setting 655—for the various settings of the group to expire on, for example, the finish date of the project. Expiration dates may also be a temporal period (e.g., 2 weeks) instead of a particular date. In the present example, the expiration 655 has been set to 'never' in that the persons that the user went to school with will always be the persons the user went to school with and, at the present, sees no reasons to limit their access to his contact information for the foreseeable future.

Figure 6E:
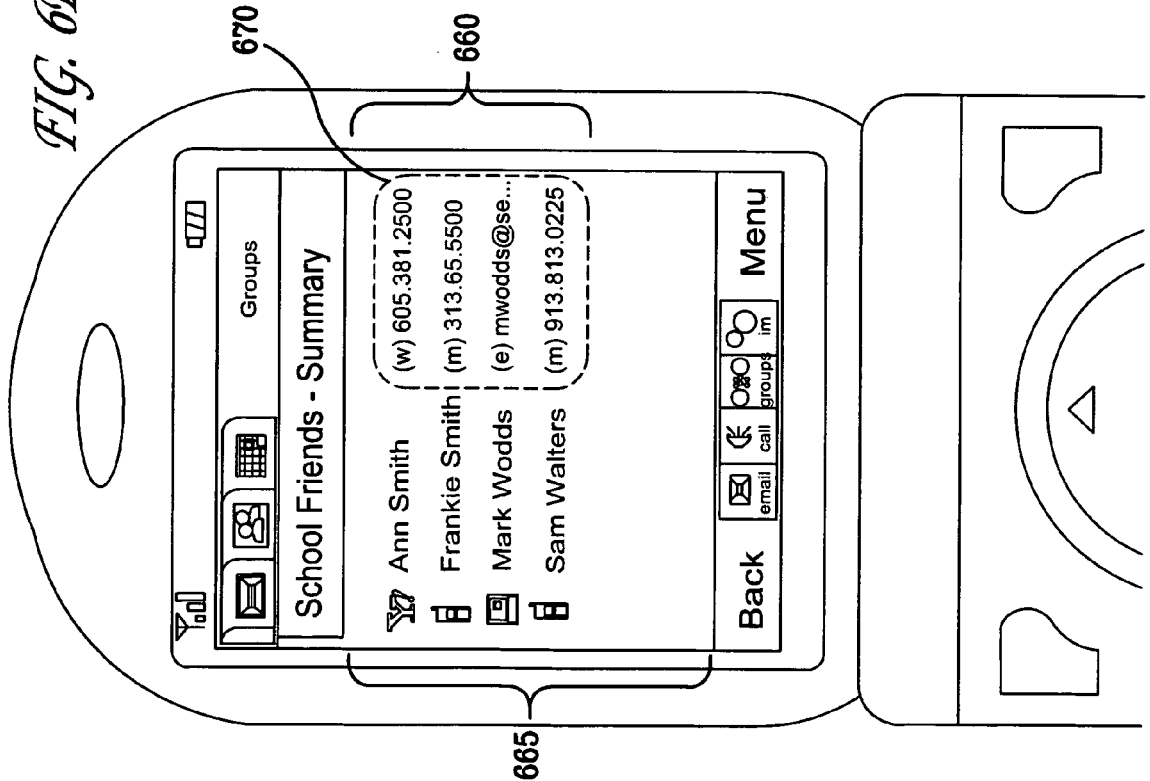

FIG. 6E is an exemplary display screen as enabled by groups module 350 and dynamic aggregation module 470. FIG. 6E is a summary screen 660 for the present group list 625 (School Friends). An indicator of presence 665 relative to the server 210 (and communication system 110) as well as preferred contact methodology 670 is displayed for each member 630 of the present group list 625.

For example, Ann Smith is presently connected to server 210/communication system 110 via Yahoo!® Messenger (665) but prefers being contacted at her work number (670). Similarly, Frankie Smith is connected to server 210/communication system 110 via a mobile device (e.g., a cell phone) (665) and prefers being contacted that way as well (670). Mark Wodds is connected to the server 210/communication system 110 via a desktop or laptop computing device (670) and prefers to be contacted via e-mail (670). Sam Walters is connected to the server 210/communication system 110 via a mobile device (665) and prefers to be contacted at that device as well (670).

References to 'connected to the platform/communication system' are not meant to be interpreted as a physical, hard connection. Instead, connected is used in the sense that a user has access to information at the server 210/communication system 110 and vice-versa. That connection may be the result of a direct point-to-point connection but is, most likely, the result of a data interchange through various routers and/or switches and base stations depending on the present mode of connection.

FIG. 6F is an exemplary status screen display as enabled by groups module 350 in conjunction with data aggregation module 470 and indicating the status of each particular user's presence status 685 and a contact status indicator 690.

For example, Ann Smith has a connection with server 210/communication system 110 via her phone and desktop (via Yahoo!® Messenger as seen in FIG. 6E). Ann Smith's mobile phone currently has an active connection with server 210/communication system 110 as does her Yahoo!® Messenger account. This active presence is indicated by the smiling emoticon (685).

Sam Walters, on the other hand, is not available as indicated by the frowning emoticon (685). Sam Walters is connected to the server 210/communication system 110 via a mobile phone (as was shown in FIG. 6E). Sam Walters' phone is at present, indicating his unavailability. This unavailability may be the result of his phone having been turned off, traveling out of range or having been manually set to an indicia that he is not available to be contacted at present.

Mark Wodds, however, has no presence information available (685). This may be a result of Mark Wodds having set his permissions to not display any information concerning his presence or the fact that server 210/communication system 110 may not be able to provide any presence information at the present time.

Frankie Smith, as a result of his presence settings, has allowed access to calendar information as is evidenced by the calendar icon (685). Notwithstanding, Frankie Smith is not available as he is presently in a meeting. This unavailability may be the result of Frankie Smith having manually set his device to evidence unavailability or because of a determination by Mr. Smith's device (through dynamic aggregation module 470 and calendar module 340) that he is presently unavailable due to his calendar indicating his presence in a meeting. Due to the fact that he is in a meeting, it may be presumed that Frankie Smith is unable to take calls. Certain calendar settings, however, may be adjusted to reflect that the meeting is of low priority or that such a meeting is informal and that he may be interrupted. Such an indication, however, may be displayed only to particular persons (e.g., immediate family who know only to contact him if it is a dire emergency) via the proper permission.

Presence status 685 need not be limited to a particular icon (e.g., an emoticon) or text message. Any means of communications (e.g., graphic, textual, color coding) may be used.

Each member 630 of the groups list 625 also evidences a contact status indicator 690. Contact status indicator 690 reflects recent or queued communications from a particular member 630 of the list 625 or an important event related to a member 630. For example, a queue may be set to the last five communications or to the most recent communication. Similarly, only particular types of communications may be displayed, for example, only telephone calls versus e-mails if a user happens to know that a member of the group only shares important communications by phone. Other types of communications, such as directions, or important events like anniversaries may also be displayed as may be derived from various contact data, such as calendar data.

For example, Ann Smith recently made a phone call to the present user as indicated by contact status indicator 690. That call went unanswered as is evidenced by the indicator '1 missed call.' If Ann Smith had called additional times, the indicator 690 may read '2 missed calls' or '3 missed calls.' In the present view, the missed call is reflected without an explanation point (!) as are certain indicators for other members (e.g., Frankie Smith's birthday indicator 690). The use of importance indicators may further aid in determining how recently the indicator 690 was received or the urgency (595) of the same (e.g., high, low or intermediate importance).

For example, the phone call of Ann Smith may have been received and missed. The missed call indicator 690, in this instance, may have initially displayed an '!' or other importance indicator 695 when the display was first reviewed as the result of a menu selection or flipping open a phone face. At this point, the user would have seen (or at least should have seen) the importance indicator 695. User may have elected not to have further investigated the nature of the missed call. If the user later opened his phone or accessed the current status display 680, that importance indicator 695 may have been removed (e.g., no exclamation point) in that the user knows that the call was received and missed. This way, the user can quickly determine which messages or events are new or have been updated since last checking the status screen 580.

By further example, Frankie Smith currently reflects a birthday in his contact status indicator 690. The fact that Frankie Smith has a birthday can be the result of user having manually entered a birthday reminder into his calendar or, alternatively, that information having been entered into the calendar of Frankie Smith who has chosen to share that level of calendar information with other members 630 of the group list 625 and that are connected to server 210/communication system 110.

The birthday indicator could also be the result of the user having accessed the calendar of another user. For example, the present user may not have the birthday of Frankie Smith in his calendar and Frankie Smith may not allow access to his calendar to reflect that it is his birthday. The present user, however, may have access to the calendar of Ann Smith who has set her permissions to allow other people to access this level of calendar information; her calendar may reflect the birthday of Frankie Smith. As Frankie Smith is a member 630 of the present group list 625, the groups module 350 and/or calendar module 340 may determine that this is information that the present user may find important and could provide the information about user Frankie Smith via another member 630—Ann Smith—of the group list 625. In some embodiments, the present user may specifically request such information or reject such information for further use when presented. Such a rejection may be in response to a prompt generated by device 400 through dynamic aggregation module 470.

In the case of Mark Wodds, his contact status indicator 690 reflects that directions have been received. The indicator 690 further reflects an explanation point for an importance indicator 695 suggesting that the directions to a particular location were recently received or at least received since the display was last viewed. Alternatively, the directions may have been provided in response to an urgent request for the same (e.g., directions to a meeting that is just about to start).

In the case of Sam Walters, there is an e-mail waiting to be read. The indicator 690 also reflects that this e-mail is urgent as may be indicated as the result of the sender of the e-mail, for example, setting a high importance feature in Microsoft Outlook or as determined from other metadata embedded in the e-mail message.

FIG. 7A is an exemplary view of aggregated contact information (contact detail 710) for a particular contact (Eric Ham) as may be generated by the dynamic aggregation module 470 of the present invention.

Presence indicator 720 reflects that no presence information is presently available for Eric Ham; this is reflected by the literal text: 'no information available' in addition to the frowning emoticon. The absence of information may be the result of Eric Ham's connection to the server 210/communication system 110 having been severed due to a service outage or his connection having been severed. Similarly, the present user may not have sufficient permission levels as granted by Eric Ham with regard to accessing his presence information. Eric Ham's means of establishing presence with server 210/communication system 110 is through Yahoo!® Messenger as indicated by indicator of presence 725.

Telephone contact entry 730 reflects different means of contacting Eric Ham by phone, for example, a home phone and a mobile phone. In the present contact detail 710, a preferred telephone number for contacting Eric Ham, that is, a home number, is designated. This designation may be set by the present user or as a result of a preferred contact method 770 as identified by Eric Ham and communicated to users with access to this information via server 210/communication system 110 and data aggregation module 470.

E-mail contact entry 740 reflects different means of contact Eric Ham by e-mail. For example, Eric Ham could be contacted via a personal account, a work account or a professional account (e.g., an account set-up through the ACM). In the present contact detail 710 screen display, e-mail address 2 (a personal account offered by Yahoo!®) is designated as the preferred means of contacting Eric Ham. This designation may be set by the present user or as a result of a preferred contact method 770 as identified by Eric Ham and communicated to users with access to this information via server 210/communication system 110 and data aggregation module 470.

Instant messaging entry 750 reflects different means of contacting Eric Ham by instant messenger. For example, Eric Ham could be contacted via a Yahoo!® instant messenger account as well as an America Online instant messenger account. In the present screen display, the Yahoo!® instant messaging account is designated as the preferred means of contacting Eric Ham via instant messenger. This designation may be set by the present user or as a result of a preferred contact method 770 as identified by Eric Ham and communicated to users with access to this information via server 210/communication system 110 and data aggregation module 470.

FIG. 7B is an exemplary view of various contact settings 760 of the present user as communicated to use Eric Ham and as may be utilized by the dynamic aggregation module 470 and server 210/communication system 110 of the present invention, including calendar module 340. This display is similar to the display illustrated in FIG. 6D with the exception that it pertain to a particular individual (Eric Ham) rather than a group 625 or members 630 of that group 625. Screen of mobile device 400 reflects preferred contact methods 770, particular permissions 780 for a particular user and synchronization settings 790 as they pertain to the present individual.

In the present contacts setting 760, Eric Ham is being informed that the present user's preferred contact method 770 is via personal e-mail. Similarly, this setting could be adjusted to reflect a corporate e-mail account, a work phone, a home phone or a cellular phone.

Permissions as to presence 780 are being set to allow for calendar and phone and locations by request only. That is, Eric Ham will be able—through a device 400 comprising a dynamic aggregation module 470 and accessing server 210/communication system 110—allowed to view calendar information of the present user. Eric Ham will also be able to view whether the present user is presently available by phone. Location information of the present user is also available but only following a request that must be approved by the present user. As in FIG. 6D, permissions 780 are limited only to the extent of information that is aggregated by server 210/communication system 110.

Synchronization 790 has been set with regard to allowing certain synchronization properties from a particular source, in the present example, a Yahoo! address book.

While the present invention has been described in connection with a series of preferred embodiment, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A data distribution system comprising:
a data aggregation server configured to aggregate Personal Information Management (PIM) data of a plurality of users,
the data aggregation server being further configured to automatically determine presence data of a user of the plurality of users by acquiring calendar information of the user from the PIM data; and
a groups module, the groups module configured to:
identify a common PIM data element amongst the plurality of users, and
create groupings of the plurality of users, the group characterized by the common PIM data element; and
wherein, the data aggregation server, is further configured to identify a contact method for the user based on the presence data for the user, the contact method being one through which the user is presently reachable;
publish the contact method for the user to other users in the plurality of users;
wherein, to identify the contact method, availability or unavailability of the user to be reached via different forms of communication, including availability or unavailability to be reached via different electronic devices is determined;
wherein the presence data further includes:
a physical or geographical location of the user determined from a mobile device of the user that is location aware;
wherein the data aggregation server is integrated into a wireless service provider network;
wherein the data aggregation server determines presence data from at least two different sources of personal information management (PIM) data.

2. The data distribution system of claim 1, wherein the PIM data includes calendar or contacts data.

3. The data distribution system of claim 1, wherein at least one of the two different sources of PIM data is a mobile device of the user.

4. The data distribution system of claim 2, wherein, the data aggregation server determines availability or unavailability of the user to be reached via the different contact methods including, email, Instant messaging, and SMS.

5. The data distribution system of claim 3, wherein at least one of the two different sources of PIM data is an enterprise server or a personal computer.

6. The data distribution system of claim 1, wherein wherein at least one of the two different sources of PIM data is an instant messaging network.

7. The data distribution system of claim 1, wherein at least one of the two different sources of PIM data is an Internet service provider.

8. The data distribution system of claim 1, wherein the presence data is further determined from metadata information embedded in the calendar data of the user, the metadata information including a priority or importance indicator of a calendar event represented by the calendar data.

9. The data distribution system of claim 1, wherein the presence data is determined from a manual setting specified by the user.

10. The data distribution system of claim 1, wherein the presence data of the user is determined from a cellular base station.

11. A method of grouping contact information:
aggregating personal information management (PIM) data in accordance with a security policy from multiple users at a computing device;
automatically determining presence data for a member of the multiple users from calendar information of the member in the PIM data;
based on the presence data, identifying a contact method for the member of the multiple users through which the member is presently reachable;
wherein, to identify the contact method, availability or unavailability of the user to be reached via different forms of communication, including availability or unavailability to be reached via different electronic devices is determined; and
distributing the contact method through which the member is presently reachable to the other members of the multiple users for display to the other members;
wherein the presence data further includes a physical or geographical location of the user determined from a mobile device of the user that is location aware;
wherein the presence data is determined from at least two different sources of personal information management (PIM) data.

12. The method of claim 11, wherein PIM data is acquired from at least one other source of PIM data based on membership with a particular group of users.

13. The method of claim 11, wherein the presence data of the user is further determined from a cellular base station.

14. The method of claim 11, wherein the presence data is determined in part using metadata information embedded in the calendar information of the user.

15. The method of claim 11, further comprising determining availability or unavailability of the user to be reached via different forms of communications,
including availability or unavailability to be reached via different communication modalities including one or more of, email, Instant messaging, or SMS.

16. The method of claim 11, wherein the metadata information including a priority or importance indicator of a calendar event represented by the calendar data.

17. The method of claim 11, wherein, the contact method is identified in part based on preferred contact methods specified by the member.

18. A system, comprising:
means for, accessing multiple sources of personal information management (PIM) data associated with multiple users using user-provided credentials;
means for, aggregating personal information management (PIM) data from the multiple sources;
means for, automatically determining presence data for a member of the multiple users from calendar information of the member in the PIM data;
wherein the presence data is further determined from metadata information embedded in the calendar data of the user, the metadata information including a priority or importance indicator of a calendar event represented by the calendar data;
means for, identifying a contact method for the member of the multiple users through which the member is presently reachable, based on the presence data;
wherein, to identify the contact method, availability or unavailability of the user to be reached via different forms of communication, including availability or unavailability to be reached via different electronic devices is determined;
means for, distributing the contact method through which the member is presently reachable to other members of the multiple users;

wherein the presence data further includes a physical or geographical location of the user determined from a mobile device of the user that is location aware.

19. The system of claim 18, wherein the presence data is determined in part by acquiring metadata information embedded in the calendar information of the user, the metadata information including personalized metadata generated by the user and associated rules.

20. The system of claim 18, wherein the presence data is determined in part by acquiring metadata information embedded in the calendar information of the user, the metadata information including a travel requirement indicator.

21. The system of claim 18, wherein the presence data is determined in part by acquiring metadata information embedded in the calendar information of the user, the metadata information including a business or personal event indicator.

22. A data distribution system comprising:
a data aggregation server configured to aggregate, based on a user-specific security policy, Personal Information Management (PIM) data of a plurality of users,
the data aggregation server being further configured to determine presence data of a user of the plurality of users from calendar information of the user from the PIM data;
a groups module, the groups module configured to:
identify a common PIM data element amongst the plurality of users, and
create groupings of the plurality of users, the grouping characterized by the common PIM data element; and
wherein, the data aggregation server, is further configured to identify a contact method for the user based on the presence data for the user, the contact method being one through which the user is presently reachable, wherein the contact method is configured by the user for each grouping that the user is a member of;
publish the contact method for the user to other users in the plurality of users;
wherein, to identify the contact method, availability or unavailability of the user to be reached via different forms of communication, including availability or unavailability to be reached via different electronic devices is determined;
wherein the presence data further includes a physical or geographical location of the user determined from a mobile device of the user that is location aware;
wherein the data aggregation server aggregates presence data from at least two different sources of personal information management (PIM) data, each source of the PIM data being accessed by the data aggregation server using user credentials obtained from the plurality of users;
wherein at least one of the two different sources of PIM data is an instant messaging network.

* * * * *